US009864405B2

(12) United States Patent
Trachtenberg et al.

(10) Patent No.: US 9,864,405 B2
(45) Date of Patent: Jan. 9, 2018

(54) SMART FRAME FOR A MOBILE DISPLAY DEVICE

(71) Applicants: Marc Trachtenberg, New York, NY (US); Francois Gariepy, Westmount (CA)

(72) Inventors: Marc Trachtenberg, New York, NY (US); Francois Gariepy, Westmount (CA)

(73) Assignee: Videri Inc., New York, NY (US)

( * ) Notice: Subject to any disclaimer, the term of this patent is extended or adjusted under 35 U.S.C. 154(b) by 215 days.

(21) Appl. No.: 14/213,810

(22) Filed: Mar. 14, 2014

(65) Prior Publication Data

US 2014/0313659 A1    Oct. 23, 2014

Related U.S. Application Data

(60) Provisional application No. 61/800,681, filed on Mar. 15, 2013, provisional application No. 61/917,067, filed on Dec. 17, 2013.

(51) Int. Cl.
*G06F 1/16* (2006.01)
*H04M 1/00* (2006.01)
(Continued)

(52) U.S. Cl.
CPC .......... *G06F 1/1628* (2013.01); *G06F 1/1626* (2013.01); *G06F 1/1632* (2013.01); *G06F 1/1637* (2013.01); *G06F 3/0484* (2013.01); *G06F 21/10* (2013.01); *G06F 21/602* (2013.01); *G09F 9/30* (2013.01); *G11B 27/00* (2013.01);
(Continued)

(58) Field of Classification Search
CPC .... G06F 1/1628; G06F 1/1637; G06F 1/1626; G06F 1/1632; G06F 3/0484; G06F 21/10; G06F 21/602; H04L 9/0819; H04N 21/2347; H04N 21/2541; H04N 21/254; H04N 21/25875; H04N 21/41407;
(Continued)

(56) References Cited

U.S. PATENT DOCUMENTS 6,898,283 B2 *   5/2005   Wycherley ............. H04B 1/401
                                                          379/428.01
6,920,338 B2 *   7/2005   Engstrom ........... H04M 1/0202
                                                          455/550.1

(Continued)

*Primary Examiner* — Nidhi Thaker
(74) *Attorney, Agent, or Firm* — Pryor Cashman LLP

(57) ABSTRACT

A frame for a mobile device with a memory and a processor running an application and a system for displaying digital content, comprising a frame assembly for the mobile device, comprising a processor, a media storage memory, a first body with a recess configured for receipt of a mobile device in the frame assembly, and a second body, configured to connect to the first body to enclose the mobile device. Preferably, at least one of the two sides comprises a connector, configured to connect with a corresponding connector of the mobile device, so that the processor of the frame is configured to communicate, through said connector, with the memory and processor of the mobile device. In an alternate embodiment, at least one of the two sides comprises a communication means, configured to communicate with the memory and processor of the mobile device through WiFi, Bluetooth, or the Internet.

25 Claims, 34 Drawing Sheets

(51) Int. Cl.

| | | |
|---|---|---|
| *H04L 29/06* | (2006.01) | |
| *G06F 21/60* | (2013.01) | |
| *G06F 3/0484* | (2013.01) | |
| *H04L 29/08* | (2006.01) | |
| *G06F 21/10* | (2013.01) | |
| *H04L 9/08* | (2006.01) | |
| *H04N 21/422* | (2011.01) | |
| *H04N 21/43* | (2011.01) | |
| *H04N 21/436* | (2011.01) | |
| *H04N 21/4627* | (2011.01) | |
| *H04N 21/835* | (2011.01) | |
| *G09F 9/30* | (2006.01) | |
| *H04N 5/63* | (2006.01) | |
| *H04N 5/64* | (2006.01) | |
| *H04N 21/2347* | (2011.01) | |
| *H04N 21/25* | (2011.01) | |
| *H04N 21/258* | (2011.01) | |
| *H04N 21/2668* | (2011.01) | |
| *H04N 21/41* | (2011.01) | |
| *H04N 21/414* | (2011.01) | |
| *H04N 21/4788* | (2011.01) | |
| *H04N 21/485* | (2011.01) | |
| *H04N 21/61* | (2011.01) | |
| *H04N 21/84* | (2011.01) | |
| *H04N 21/845* | (2011.01) | |
| *H04N 21/8545* | (2011.01) | |
| *G11B 27/00* | (2006.01) | |
| *H04N 21/254* | (2011.01) | |
| *H04N 21/854* | (2011.01) | |

(52) U.S. Cl.
CPC ........ *H04L 9/0819* (2013.01); *H04L 63/0457* (2013.01); *H04L 67/02* (2013.01); *H04N 5/63* (2013.01); *H04N 5/64* (2013.01); *H04N 21/2347* (2013.01); *H04N 21/252* (2013.01); *H04N 21/2541* (2013.01); *H04N 21/25875* (2013.01); *H04N 21/2668* (2013.01); *H04N 21/4122* (2013.01); *H04N 21/41407* (2013.01); *H04N 21/42224* (2013.01); *H04N 21/436* (2013.01); *H04N 21/4307* (2013.01); *H04N 21/43615* (2013.01); *H04N 21/4627* (2013.01); *H04N 21/4788* (2013.01); *H04N 21/485* (2013.01); *H04N 21/6125* (2013.01); *H04N 21/6175* (2013.01); *H04N 21/835* (2013.01); *H04N 21/84* (2013.01); *H04N 21/8456* (2013.01); *H04N 21/854* (2013.01); *H04N 21/8545* (2013.01); *G06F 2221/0784* (2013.01); *H04L 67/00* (2013.01); *H04L 2209/603* (2013.01)

(58) Field of Classification Search
CPC ........... H04N 21/436; H04N 21/43615; H04N 21/4627; H04N 21/835
USPC ...................... 455/556.1; 361/679.55–679.56
See application file for complete search history.

(56) References Cited

U.S. PATENT DOCUMENTS

| | | | | |
|---|---|---|---|---|
| 7,079,864 | B2 * | 7/2006 | Engstrom | H04B 1/3877 379/433.01 |
| 7,085,542 | B2 * | 8/2006 | Dietrich | H04M 1/72575 379/433.11 |
| 7,941,197 | B2 * | 5/2011 | Jain | G06K 19/07739 379/433.05 |
| 2003/0073462 | A1 * | 4/2003 | Zatloukal | G06F 1/1626 455/558 |
| 2010/0124040 | A1 * | 5/2010 | Diebel | G06F 1/1628 361/816 |
| 2011/0304962 | A1 * | 12/2011 | Su | G06F 1/1626 361/679.01 |
| 2012/0044622 | A1 * | 2/2012 | Mori | G06F 1/1628 361/679.01 |
| 2012/0268911 | A1 * | 10/2012 | Lin | G06F 1/1628 361/807 |
| 2013/0077235 | A1 * | 3/2013 | Pawar | G06F 1/1628 361/679.56 |
| 2013/0154914 | A1 * | 6/2013 | Salo | G06F 1/1628 345/156 |
| 2013/0180879 | A1 * | 7/2013 | O'Dowd | G06F 1/1628 206/521 |
| 2013/0332642 | A1 * | 12/2013 | Capezza | G06F 13/4081 710/304 |
| 2015/0237191 | A1 * | 8/2015 | Moran | H04M 1/0256 455/556.1 |
| 2015/0358439 | A1 * | 12/2015 | Carnevali | H04M 1/0254 455/575.8 |

* cited by examiner

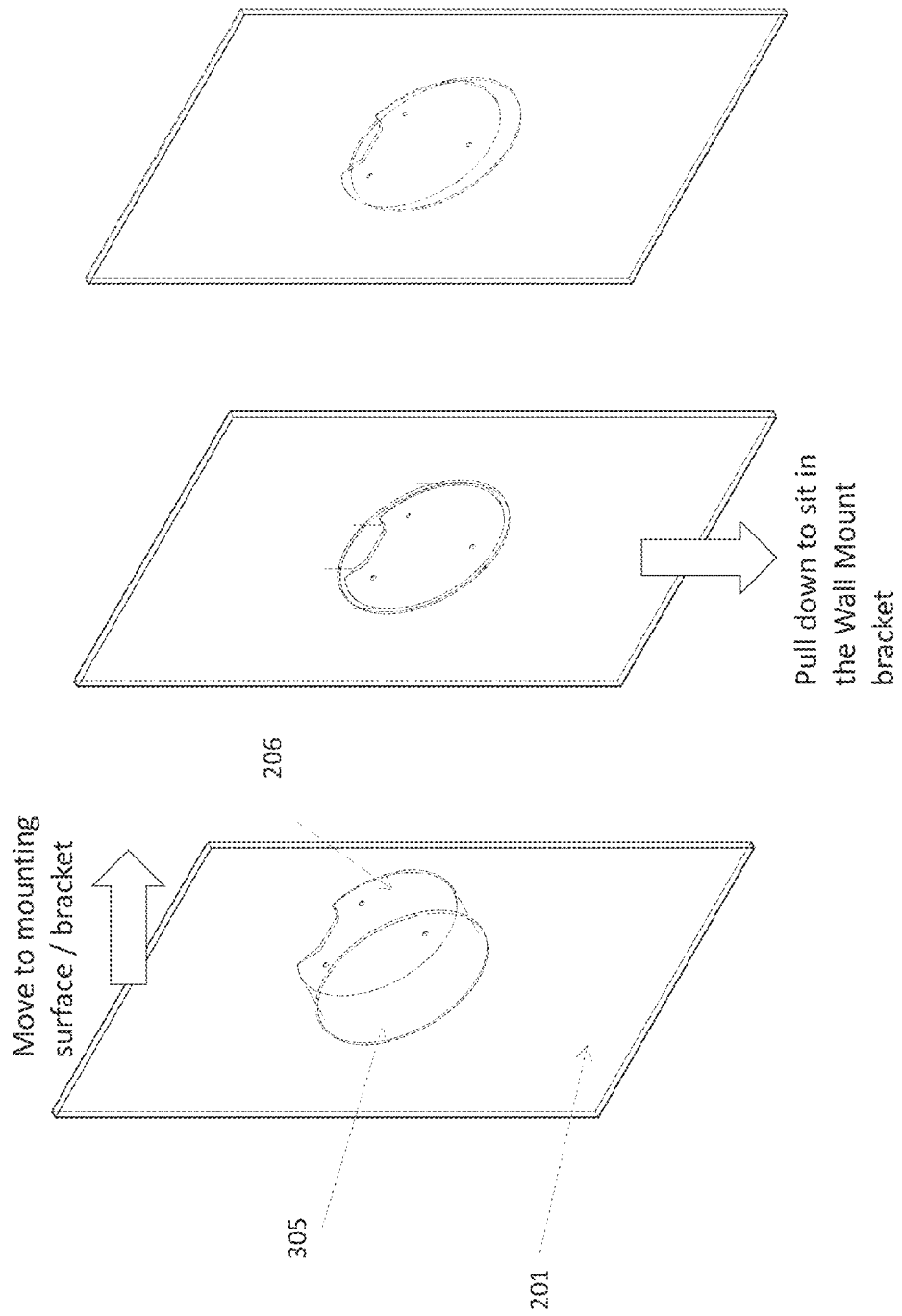

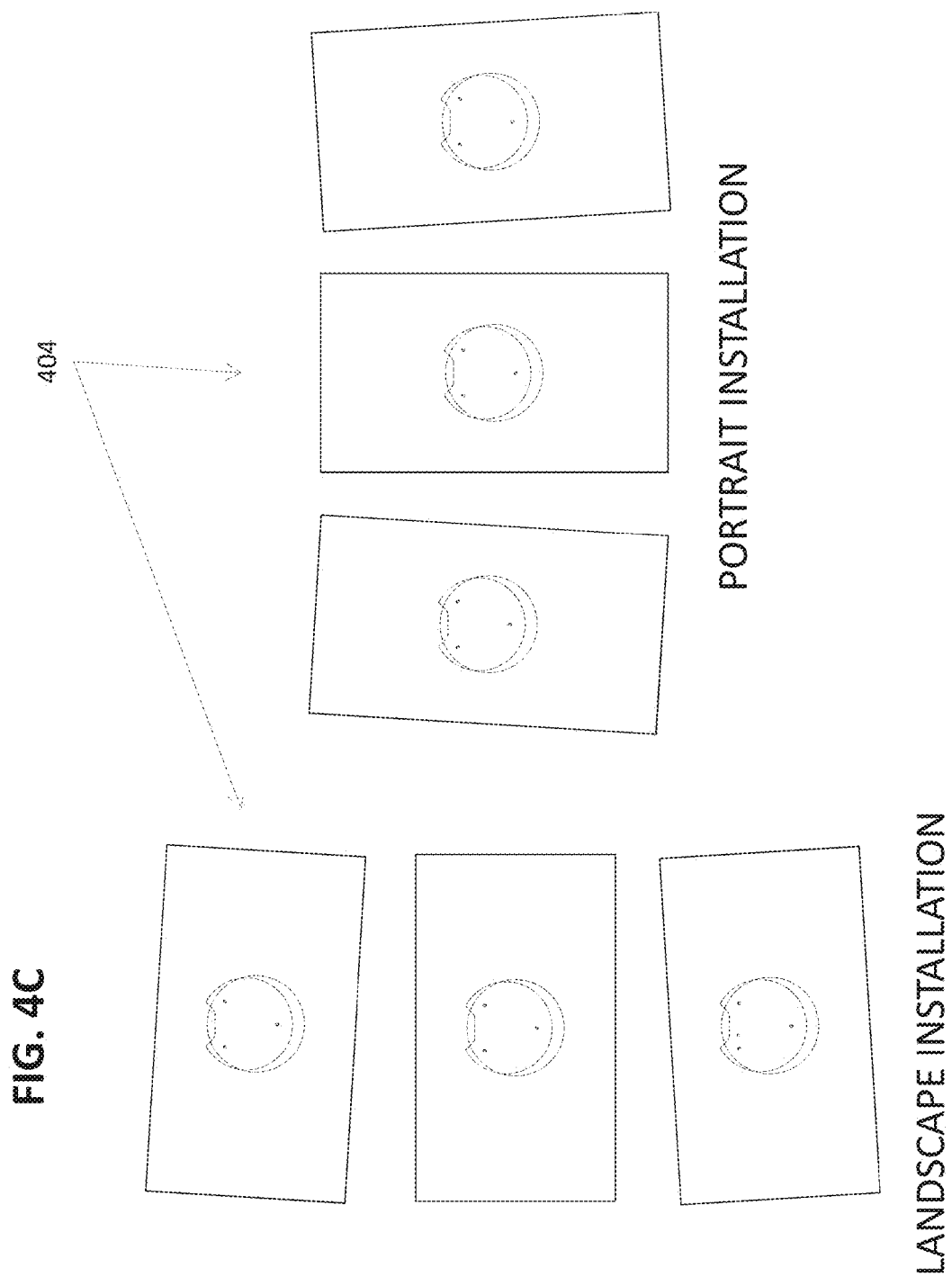

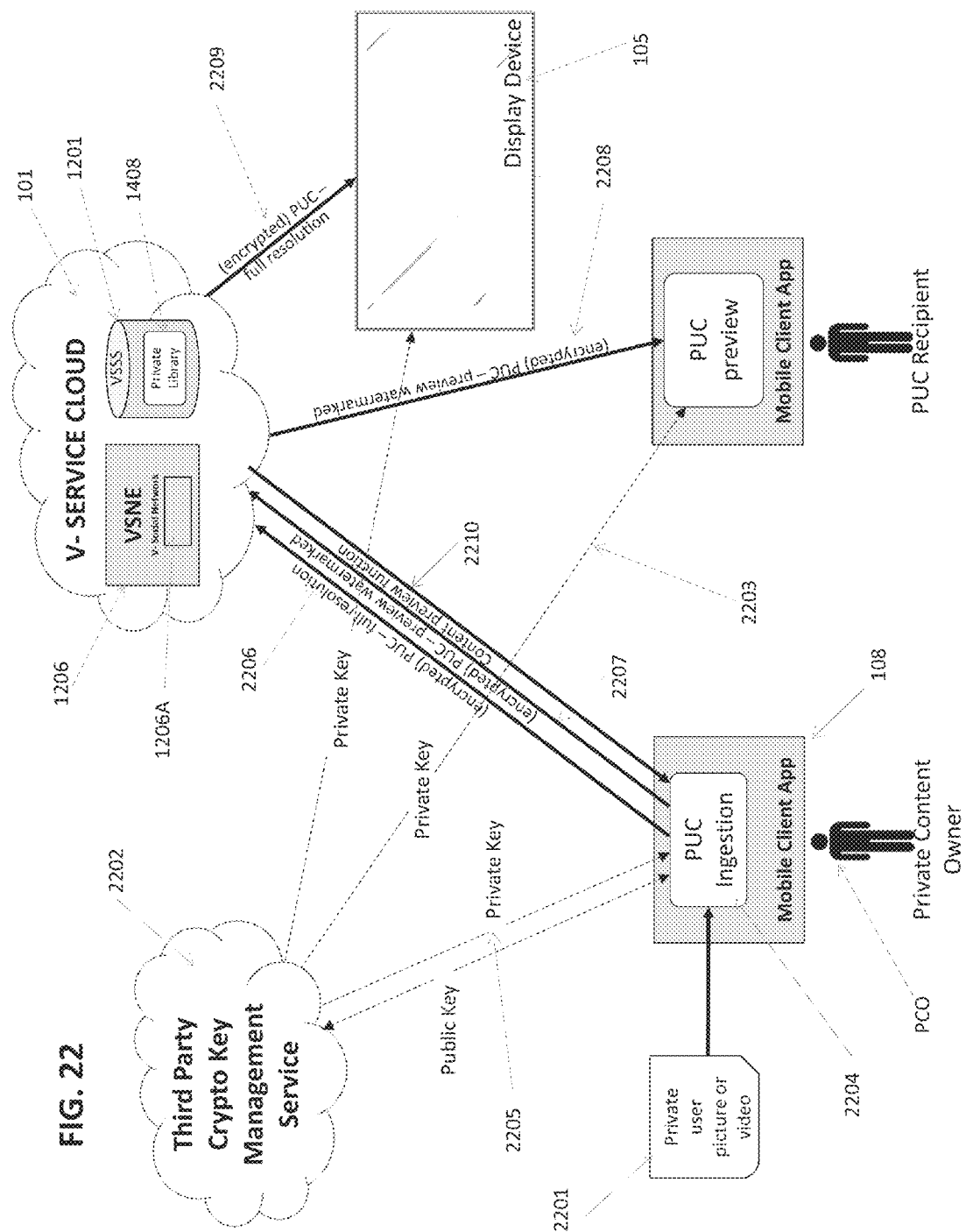

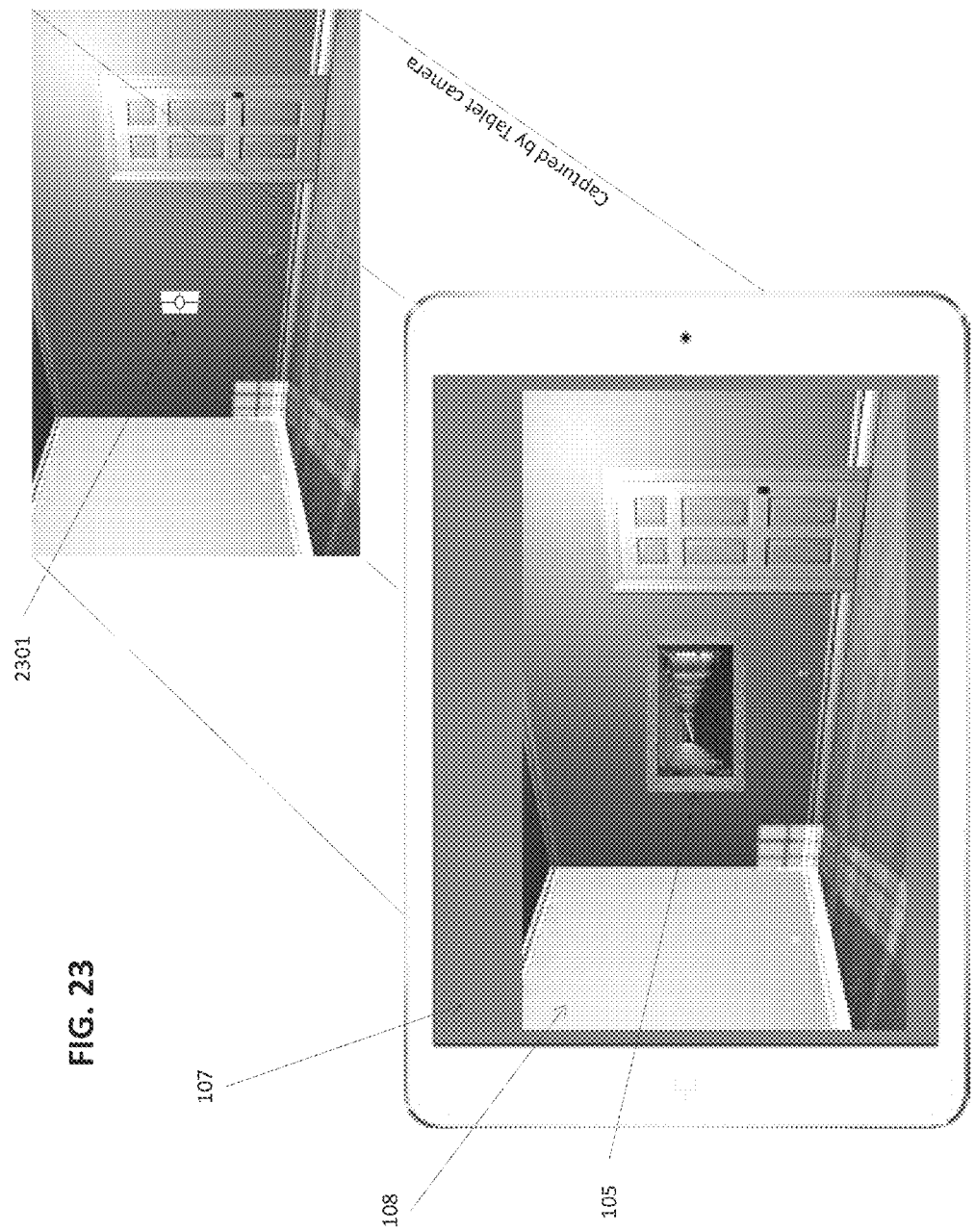

SMART FRAME FOR A MOBILE DISPLAY DEVICE

RELATED APPLICATIONS

This application claims priority to U.S. Provisional Patent Application Nos. 61/800,681, filed Mar. 15, 2013, and 61/917,067, filed Dec. 17, 2013, the disclosures and teachings of which are incorporated herein by reference. This application also claims priority to U.S. Design patent application Ser. Nos. 29/469,599, 29/469,606, 29/469,621, 29/469,628, 29/469,633, 29/469,638, and 29/469,645, all of which were filed on Oct. 11, 2013, the disclosures and teachings of which are also all incorporated herein by reference.

FIELD OF THE INVENTION

The present invention relates generally to systems and methods for displaying digital art, decorations, posters, visual lifestyle, social media, over-the-top, MSO, and other types of digital content on thin sleek display devices for use in a home, office, hotel, gallery, or any other public or private location. The invention also provides systems and methods for managing the display of such digital content, including systems and methods for the distribution, viewing, and control thereof. The invention also includes systems and methods for preserving, distributing, and protecting content through a suite of innovative technologies and processes.

BACKGROUND

Art and photography is used to decorate the walls of homes and public places. Art comes in many styles and colors and tends to be created by painting, drawing, placing, and/or printing colors, shapes, and/or designs on a medium, such as glass, canvas, wood, metal, film and/or paper. Unlike digital displays, once an image is painted, printed, or created on a medium, that image is fixed. Thus, once installed on a wall of a home or public place, the image cannot be changed unless it is repainted, reprinted, physically modified or moved in some way. To display a new piece of art in the same place, the existing piece would need to be taken down with the new piece installed in its place. This is difficult when art is hung in large and possibly heavy frames, making movement, repositioning, or replacement of the same impractical. Thus, there is no means currently to change the pictures, posters, paintings, and photographs on the wall like one can change the songs on their iPod or change the program on their TV.

Additionally, there is no TV, computer, or mobile device, or system for display, which allows a user to easily manipulate and interact with art, photography, decorations, posters, applications, social media, visual lifestyle media, over-the-top content, MSO content, and any other types of content onto an internet cloud ecosystem powered elegant thin framed display, where the user can self-adjust every element of the experience.

Televisions, computer monitors, and other digital display devices are adapted to present digital images, which can include images of artwork, photography, and other images. However, such devices are heavy, cumbersome, thick, difficult to install, hard to use and not flexible with regard to their orientation and interaction with digital content. Additionally, they generally have fixed orientations, include sound functions or capabilities, lack a fine frame, contain controls and buttons, include power supplies, have onboard processors, and contain many additional features that prevent them from serving as thin displays that can present digital art or other visual and/or audio content in an elegant, unobtrusive, and refined manner. Furthermore, the televisions, computer monitors, and other digital display devices require direct connection to high voltage power making them difficult, expensive, and inflexible to use and install.

DESCRIPTION OF PRIOR ART

To the Applicants' knowledge, there is no integrated means to change the pictures, posters, paintings, and photographs on the wall like one can change the songs on ones iPod, and there is also no currently existing broad database of digital art images available for subscription on such an integrated platform. To the Applicants' knowledge, there is also no prior art system to provide a user the ability to easily manipulate and interact with art, photography, decorations, posters, applications, social media, visual lifestyle media, over-the-top content, MSO content, and any other types of content onto an internet cloud ecosystem-powered elegant thin framed display, where the user can self adjust every element of the experience. There is, therefore, a need for a comprehensive digital content system and experience to deliver digital content for easy, convenient, and elegant consumption and display. There are also no current user interfaces in the art which allow a user to interact with and control the display of digital imagery on a remote display device for display of art, photography, decorations, applications, social media, posters, visual lifestyle, over-the-top, MSO, and any other types of content.

BRIEF SUMMARY

The present invention discloses a frame for a mobile device with a memory and a processor running an application and a system for displaying digital content, comprising a frame assembly for the mobile device, comprising a processor, a media storage memory, a first body with a recess configured for receipt of a mobile device in the frame assembly, and a second body, configured to connect to the first body to enclose the mobile device. Preferably, at least one of the two sides comprises a connector, configured to connect with a corresponding connector of the mobile device, so that the processor of the frame is configured to communicate, through said connector, with the memory and processor of the mobile device. In an alternate embodiment, at least one of the two sides comprises a communication means, configured to communicate with the memory and processor of the mobile device through WiFi, Bluetooth, or the Internet.

In preferred embodiments of the invention, methods and systems are provided for delivering digital art, decorations, posters, visual lifestyle, social media, over-the-top, MSO, and other types of content to a thin, elegant framed display. By creating an ecosystem of ground-breaking devices, enriched digital content, a natural and intuitive user experience, new social exchanges, and innovative purchase options, the present invention is adapted to fundamentally change the experience and enjoyment of art, posters, paintings, photographs, video, and apps and provide a new manifestation of how digital content is enjoyed.

In preferred embodiments, the invention includes a display device for artwork or the like—including a lightweight digital display with a thin and sleek design, an application ("APP"), which is a program that enables management of digital content displayed on the Display Devices of the present invention, and an associated Internet Service Cloud, which provides access to digital content displayable on these Display Devices.

Display devices disclosed by the present invention preferably range in size from hand-held to potentially over 60" displays. Preferably, the characteristics of a display device include an ultra-thin (preferably less than 13 mm) minimalistic design with a nearly invisible front bezel and border; an external power supply; ultra thin or small diameter wiring between external power supply and display assembly; a built-in display processor with wireless connection to the Internet Service Cloud; an optional external decorative frame attaching to the device to replicate the aesthetics of a traditional painting; optional digital frames and/or digital matting rendered by a graphics engine embedded in the system of the present invention; and audio-over-WiFi, Bluetooth, Near Field Communication (NFC), or iBeacon, which allows the device to stream audio to an external audio system. Preferably, embodiments of the Display Device of the present invention comprise no embedded user interface so that all controls occur through a connection to the App and/or the Internet Service Cloud. Additionally, embodiments of the Display Device of the present invention preferably comprises an external detachable structure to facilitate shipping, handling, and installation of the device, and a mounting and installation system allowing vertical or horizontal installation of the unit and leaving preferably a less than 2 mm gap between the mounting surface and display unit which also preferably has the ability to alter its orientation automatically depending on the characteristics of the displayed content.

The App is a highly intuitive native software application for a mobile platform such as IOS, Android, Windows and others which preferably manages and controls all aspects of the display devices and allows users to access resources on the Internet Service Cloud. The Internet Service Cloud provides a digital media content ingestion engine and management system to validate, normalize, adapt, protect, and manage rights, and to enforce standards for unique digital content, including still images, motion images, interactive images, app images, and user private content, all of which is adapted to be displayed on the display devices disclosed by the present invention.

BRIEF DESCRIPTION OF THE DRAWINGS

FIG. 4B illustrates the process of mounting a display device and display assembly of the present invention to the wall mounting bracket seen in FIG. 4A on a vertical surface;

FIG. 4C discloses the adjustability of a display device of the present invention, when hung on a vertical surface, in a landscape or portrait configuration, to various degrees of freedom;

FIG. 22 discloses the social distribution system of personal user media content presented by embodiments of the present invention;

FIG. 23 discloses the installation procedure of a display device of the present invention utilizing the client application on a mobile device to visualize a room and simulate the desired placement of the display device;

DETAILED DESCRIPTION OF PREFERRED EMBODIMENTS OF THE INVENTION

Figure 1:
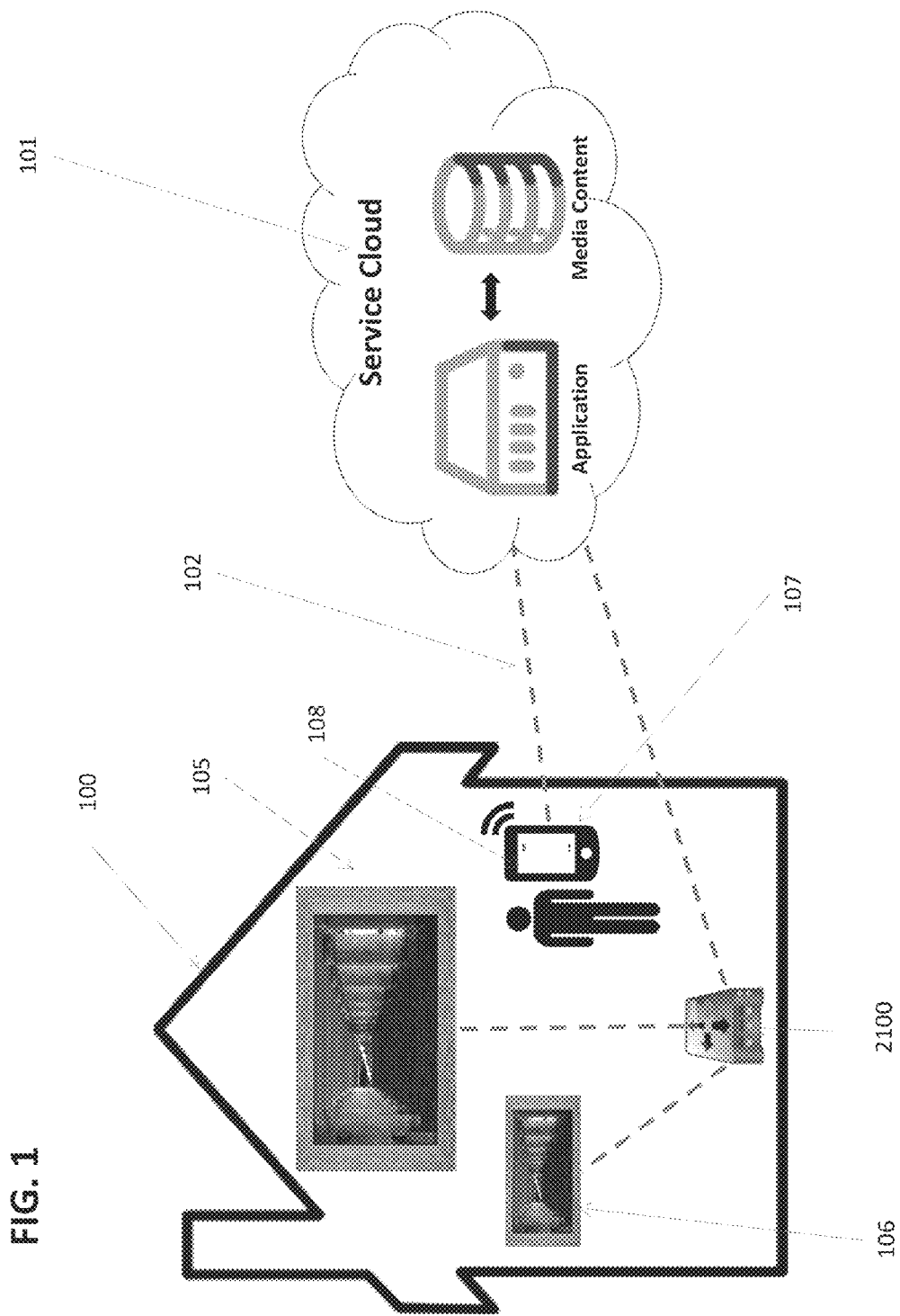
FIG. 1 depicts an overview of the present invention, a system for distributing, viewing, and controlling digital art and other digital visual and/or audio content.

Description will now be given of the invention with reference to the attached FIGS. 1-27. Other and further features and advantages of the present invention will be apparent from the following descriptions of the various embodiments when read in conjunction with the accompanying drawings. It will be understood by one of ordinary skill in the art that the following embodiments are provided for illustrative and exemplary purposes only and that numerous combinations of the elements of the various embodiments of the present invention are possible. Preferred embodiments of the present invention are illustrated by way of example, and not by way of limitation, in the figures of the accompanying drawings and in which like reference numerals refer to similar elements.

FIG. 1 illustrates an overview of the present invention system, which includes a Display Device 105 or 106 which is configured to store content for digital display, manage display functions, and interact with a Client Control 107 running a Client Application 108 through the Service Cloud ("VSC") 101 over the Internet 102. The Client Application ("App") 108 allows users to manage the content they display or applications they execute on the Display Device 105 or 106 of the present invention, including by purchasing content to own, uploading user-created content, or, through various tiered subscriptions, accessing a rental library of digital images, which allows users to obtain digital posters, art, sports, entertainment, ambiance, travel, and other content for display. As can be seen in FIG. 1, the present invention system is configured to be set up in a home environment, although use of the present invention in other public or commercial venues is also envisioned. The Service Cloud 101 communicates through the Internet 102 with Client Control 107. The Client Control 107 has installed on it App 108 to manage digital content displayed on the Display Devices 105 and 106 and perform other account management functions.

An Environment 100, such as the home environment depicted in FIG. 1, may include one or several Display Devices 105 and 106. For ease of reference, only a single Display Device 105 will be referred to throughout, though in every environment and embodiment of the present invention, the use of multiple Display Devices is envisioned. Each Display Device 105 is preferably in wireless communication with Client Control 107, and is configured to display the same or different digital content as other Display Devices in the Environment 100. Each Display Device 105 in the Environment 100 may be mounted on a wall in either a vertical or horizontal configuration. Additionally, as will be described in detail later, the orientation of each Display Device 105 is adapted to change, whether manually or automatically, through input from the App 108 on the Client Control 107 depending on the characteristics of the digital content displayed on the Display Device.

The devices disclosed by the present invention can ideally be installed in any environment such as a home, office, vehicle, or public venue, connected to the Internet, and linked to an on-line account managed through the Client Application 108 and the Service Cloud 101. Users have the ability to purchase or subscribe to digital art, decorations, posters, visual lifestyle, social media, over-the-top (delivery of video content without an MSO being involved, i.e., Netflix, Hulu, etc.), multiple system operator ("MSO"), and other types of content, as well as specially designed apps to interact with media content displayed on the Display Devices 105, or subscribe to external apps that make content reactive to external stimuli. While the Display Devices 105 and App 108 of the present invention are designed for the control and display of numerous categories of digital content, including digital art, decorations, posters, visual lifestyle, social media, over-the-top, MSO, and other types of content, for ease of description, the digital content will hereinafter be collectively referred to as "digital visual content." This in no way limits the scope of the content available and applicable for the present invention.

The Display

A preferred element of the present invention is a portfolio of aesthetically designed Display Devices 105 and an overall Display System 200. It is an object of these devices to render digital art as well as dynamic data-driven visuals and graphics with or without audio, in the most compelling way possible to enhance the ambiance of homes, offices, and public areas and create new ways to consume visual and/or audio content and data of all types. The present invention thereby creates a new digital display product category, which is distinct from existing TV flat displays, computer monitors, and digital frames, by virtue of its unique form factor and holistic user experience, unique wall mounting design installation and procedure and optimized performance for display of a broad range of digital media types extending beyond traditional TV entertainment programming to include all forms of digital content, including digital art.

The Display Device 105 uses a different architecture than traditional flat TV or computer monitor devices. All heavy and bulky electronics components, including power and audio subsystems, are removed from the Display Device 105 itself and its Display Assembly 201 and replaced with external components or packaged in one or more lightweight circuit boards to make the actual Display Assembly lighter, thinner, and easier to handle and to install. In place of an audio sub-system, the Display Device 105 uses digital wireless audio streaming to a compatible external third party audio system. Embodiments of the present invention incorporate a powerful processor to manage sophisticated functions such as content self-healing or auto-color calibration to ensure a consistent viewing experience across all devices. Embodiments of the present invention system preferably incorporate WiFi wireless capabilities to connect to local peripheral devices or the Service Cloud 101 through the Internet. WiFi, Bluetooth, Near Field Communication (NFC), and iBeacon connectivity can also be used to fully integrate into a "connected" home environment where a Display Device 105 can become an intelligent node capable of controlling or reacting to other remotely connected devices such as motion or proximity sensors, home controller, or other Display Devices. The underlying design of the Display Device 105 is modular to minimize re-design efforts when new technologies or display sizes are introduced.

Components

Figure 2:
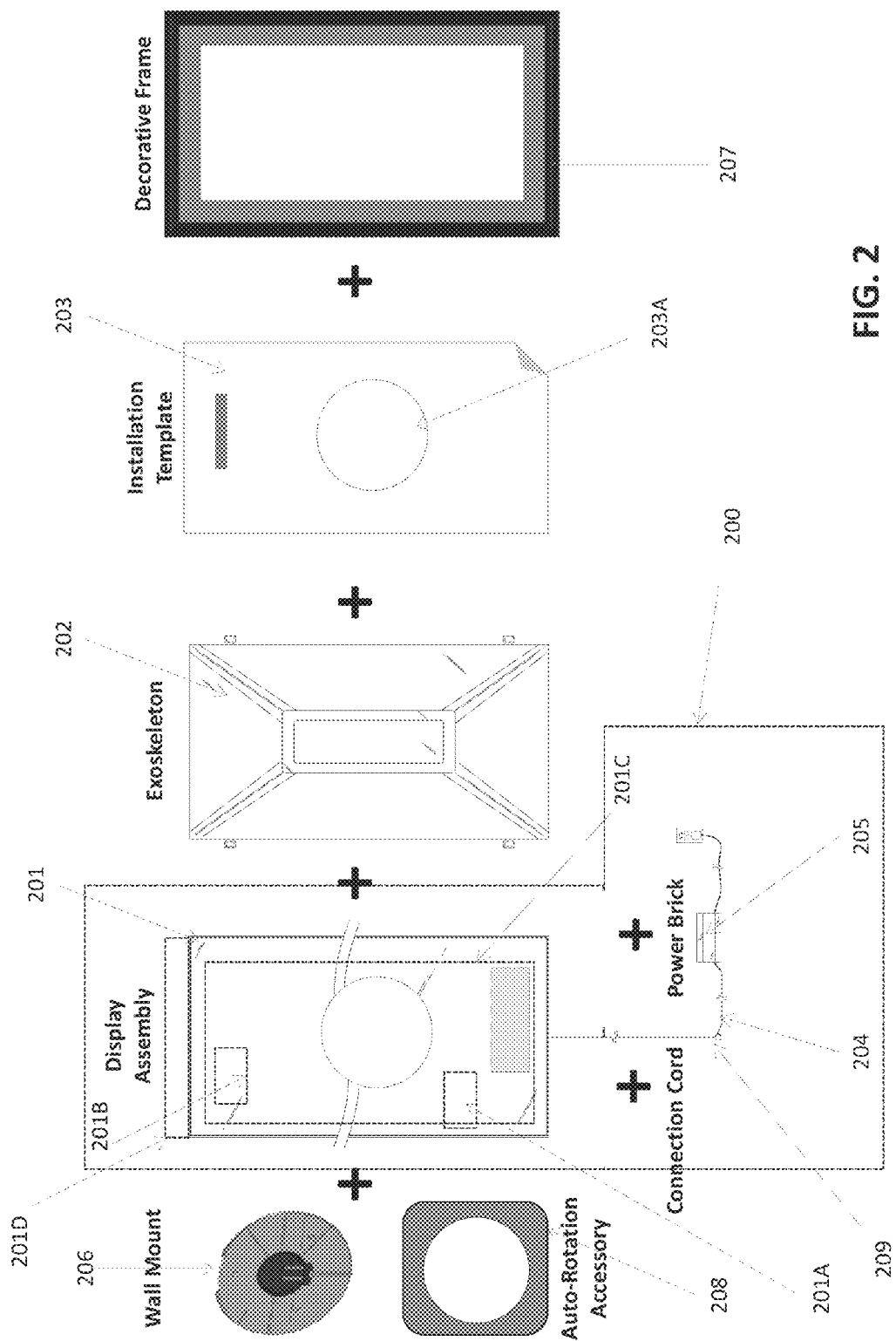
FIG. 2 is a front elevational view of the various physical assembly components of the present invention.

As can be seen in FIG. 2, embodiments of the present invention device preferably comprise several components: a Display Assembly 201, a Wall Mount 206, a Connection Cord 204, a Power Brick 205, an Exoskeleton 202, and an Installation Template and Tools 203, and other optional components such as a Decorative Frame 207 or an Auto-Rotation Accessory 208. More detail about each component of the present invention follows.

The Display Assembly 201 comprises a Display Device 105 which is designed as a bare display system without any user interface or audio. It preferably incorporates an invisible linear touch interface located on side of the device and a pin-hole reset button that is recessed in the frame. It preferably receives power from the Power Brick 205 through the Connection Cord 204 and can be attached to a vertical surface with the Wall Mount Bracket 206. The Exoskeleton 202 protects the Display Device 105 during shipping and handling and facilitates installation. The Display Devices preferably use a display surface with a rectangular aspect ratio, and diagonal sizes preferably ranging from 20" to 60". Customized Display Devices 105 in sizes larger than 60" or non-rectangular shapes are also envisioned.

The Display Device 105 is preferably designed in a modular way to adapt to various display technologies 201A, including plasma, LCD with edge LED Backlighting or OLED. Graphene display technologies are also envisioned. These display technologies are preferably selected to handle FullHD (1080p), UHD, and 4K, 8K, or higher display resolutions at up to 480 or more frames per second, and preferably deliver the lightest and thinnest display assembly and meet target production cost while providing a uniform brightness in excess of 450NITS and the sharpest contrast and deepest black possible. The Display Device 105 preferably also incorporates a brightness sensor 201B to automatically adjust brightness, contrast and color saturation to most lighting conditions and a white and black auto-calibration mechanism to ensure a consistent viewing experience across all displays and most viewing conditions.

The preferred embodiment of the Display Device 105 of the present invention preferably has a very thin front bezel that is nearly invisible to enhance the overall aesthetic of the Display Assembly 201 and maximize display surface. The effective border of the display, i.e., the distance from edge of active display area to the outside edge of the bezel, is preferably less than 15 mm. The Display Assembly 201 is secured to the rear side of the Display Device 105 and is adapted to secure to a Wall Mount Bracket 206 for hanging of the same. The Display Assembly 201 may also incorporate an attachment mechanism 201C allowing the Display Device 105 to attach to a physical Decorative Frame 207. The rear face of the Display Assembly 201 can be partially open to further reduce weight and facilitate heat dissipation and incorporates a recessed mounting mechanism for easy attachment to the Wall Mount Bracket 206 and connection to the Connection Cord 204. Unlike standard display devices such as TVs and Monitors, the Display Device 105 can easily be attached to a near-vertical surface either with the Wall Mount Bracket 206, a free rotation accessory, or the Auto-Rotation Accessory 208. Hence, its mechanical structure preferably provides the bare minimum structural rigidity required to maintain the Display Device 105 on a vertical surface while reducing the overall weight as much as possible.

Figure 3:
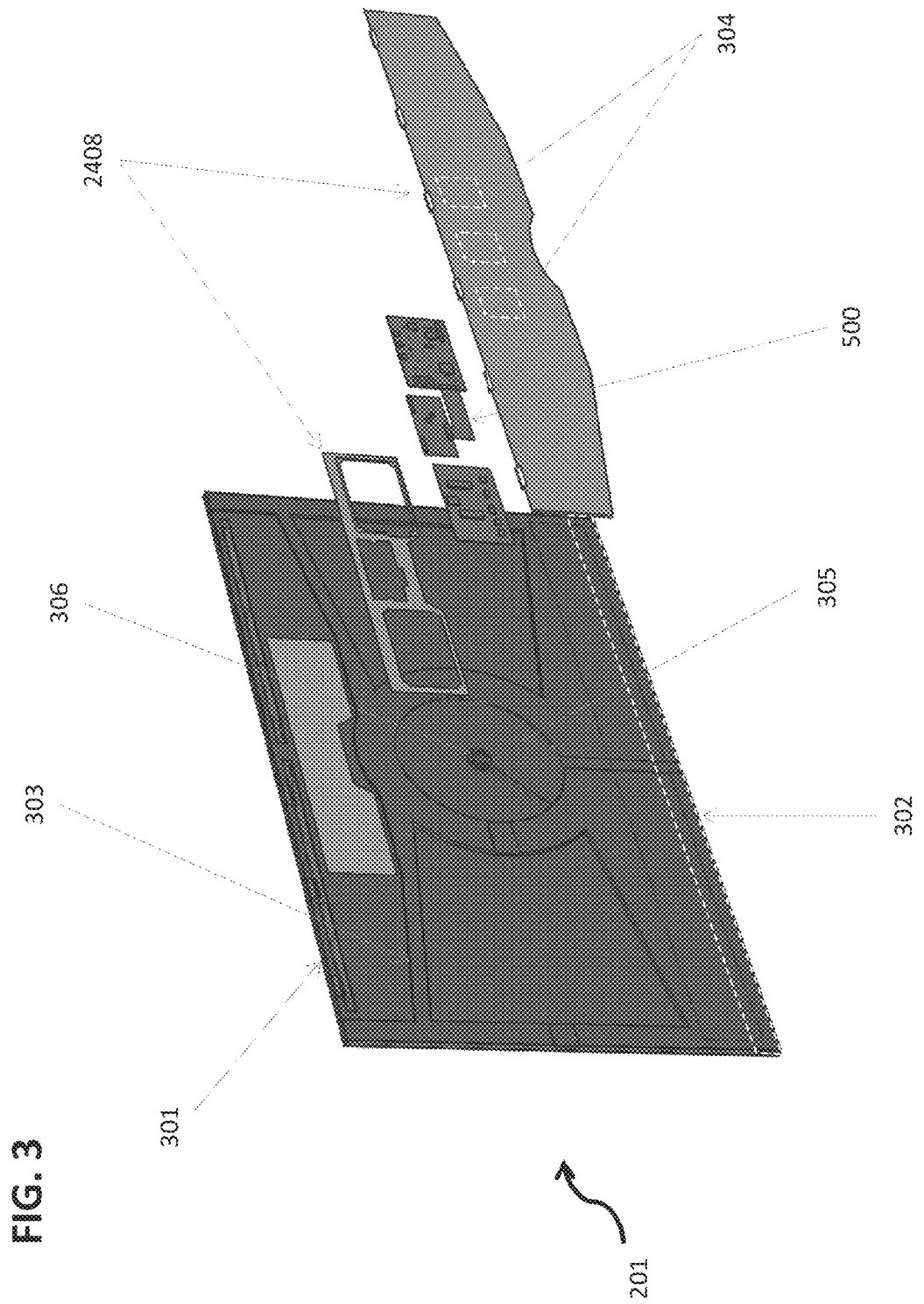
FIG. 3 is a rear elevational view of the display device and display assembly of the present invention.

FIG. 3 is a depiction of the back cover of the Display Assembly 201. The back cover 301 preferably (1) prevents excessive structural torsion and bending while the Display Device 105 is attached to the Wall Mount Bracket 206, and (2) acts as a contact radiator to distribute and dissipate excessive heat generated by the iC-DPC 500, which will be described in detail later, and backlighting LED arrays. Back cover 301 is preferably a generally flat surface with a very small space gap, preferably of approximately only a few millimeters, between any part the back cover and the mounting surface except for the middle section where the Wall Mount Bracket 206 can be inserted into the back cover 301. The back cover 301 preferably incorporates cross corrugations 303 to improve structural rigidity of the overall display assembly without increasing its overall thickness or weight. The back cover 301 is opened to allow the iC-DPC module cover 2408 to be inserted to complete the back surface of the Display Assembly 201. The iC-DPC module cover 2408 is preferably snapped in place through a mechanism to facilitate thermal conductivity across the entire back surface of the Display Assembly 201. The iC-DPC module cover 2408 is shaped, and incorporates contact thermal pads 304, to create a thermally conductive mechanical interface with the hot components of the iC-DPC 500 modules to distribute and dissipate the heat load across the entire back cover surface area. The iC-DPC module cover 2408 also acts as an additional EMI shield. The middle section 305 of the back cover is recessed to allow the Wall Mount Bracket 206 to be inserted into the back cover with minimum space gap between the back cover and the mounting surface. The iC-DPC 500 electronics modules housed in the iC-DPC module cover 2408 are preferably positioned on the periphery of the back cover away from edge backlighting LEDs 302 to free the recessed middle section. Power connectors 306 are preferably located on the edge of the recessed part of the back cover for wired connection to the Power Brick 205 by means of the Connection Cord 204. In one embodiment of the present invention, the Connection Cord 204 is configured to attach from Power Brick 205 directly to a Display Device 105 or Display Assembly 201. In another embodiment of the present invention, Connection Cord 204 is configured to attach from Power Brick 205 to Wall Mount Bracket 206, which in turn in connected to Display Device 105.

Figure 4A:
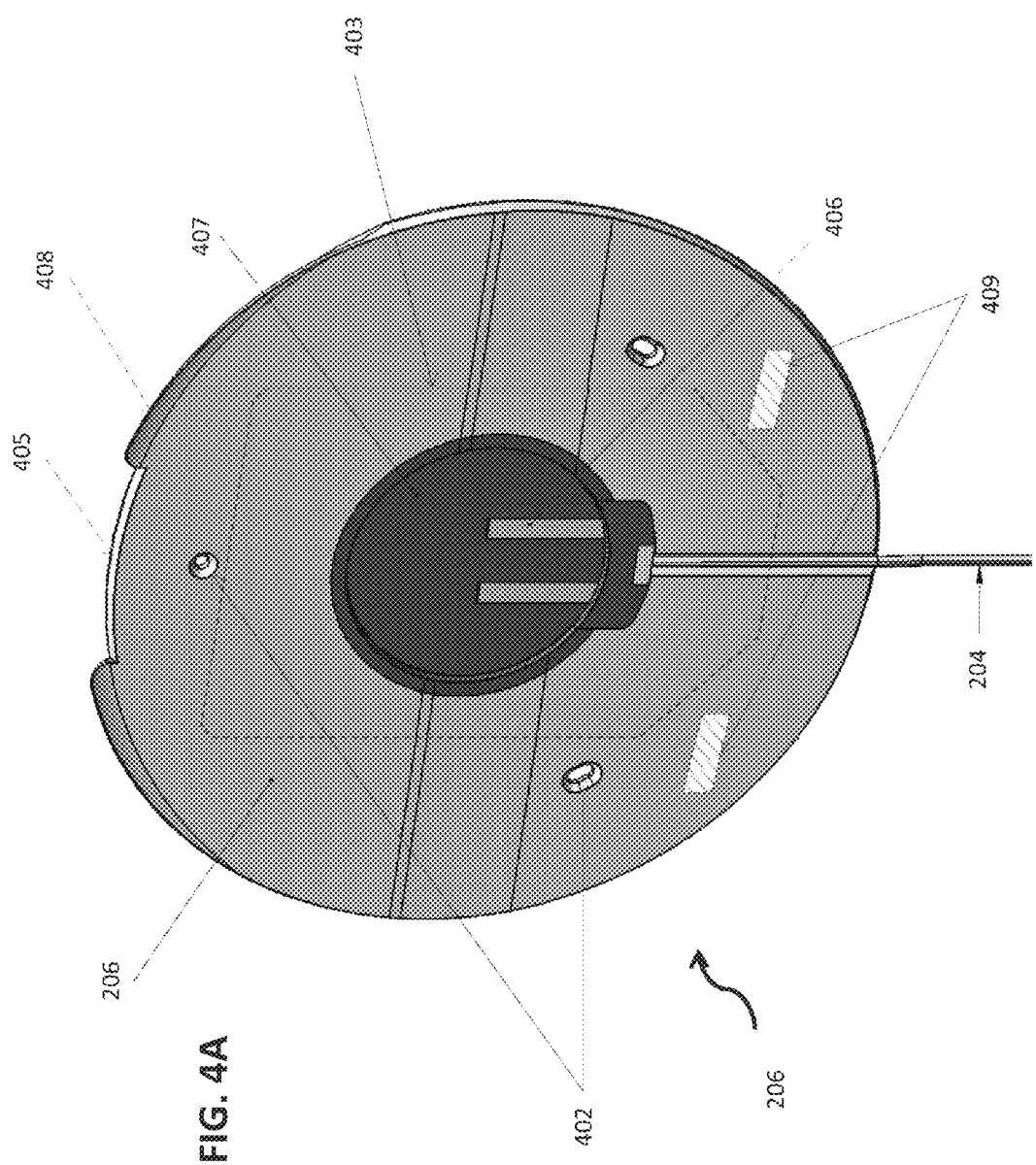
FIG. 4A is a front perspective view of the wall mounting bracket of the present invention, adapted to mount the display device and display assembly of the present invention on a vertical surface.

FIGS. 4A-C depict the Wall Mount Bracket 206 and the process of mating the same to the back cover 301 of the Display Assembly 201. FIGS. 4A-C depict the Wall Mount Bracket 206 itself. The bracket can be anchored to a vertical mounting surface either using the screw holes 402 and provided screws or using a double-sided stick pad 403, as seen in FIG. 4A, depending on the type of mounting surface. The adhesive strips provided with the device preferably adhere to most surfaces and can be removed without damaging the surface. The Wall Mount Bracket 206 is preferably circular to facilitate installation of device in vertical or horizontal orientations and to hold a Display Device 105 on a wall and maintain the same, despite the lack of structural rigidity provided by the Display Assembly 201.

The Wall Mount Bracket 206 is a unique mechanical assembly that preferably maintains the Display Device 105 on a vertical mounting surface made preferably of standard construction materials including drywall, painted wood, metal, cement, brick or cinder blocks, preferably with a gap less than 2 mm between the mounting surface and the back of the Display Assembly 201. The structure of Wall Mount Bracket 206 preferably allows a device mounted in a horizontal or vertical orientation to change from one orientation to another without having to reinstall or modify the Wall Mount Bracket 206. The Wall Mount Bracket 206 is also designed to act as an intermediary between the Connector Cord 204 and the Display Device 105 through use of thin power connectors that close the power circuit when the Display Assembly 201 is installed in the Wall Mount Bracket. Thin silicon pads are preferably installed at the corners of the Display Assembly 201 to create a slight friction against the mounting surface to maintain the display orientation and prevent the Display Assembly from moving unintentionally. Contrary to standard flat TV wall installation procedures that require screwing a potentially large, heavy, visually unappealing mounting surface or equivalent structure into a wall, the installation of a Display Device 105 preferably does not require many—if any—tools, does not create any permanent damage to a wall, and can preferably be accomplished in less than 10 minutes by a single average person using the adhesive tape.

The top end 405 of the bracket is shaped as a wide U to make room for the mating connector 406 that delivers power to a corresponding connector 306 embedded in the back cover of Display Assembly 201. The bracket mating connector 406 has a wider opening 407 to facilitate alignment of the connector during the installation process and provide some rotation freedom 404 for level adjustments. An outward "wing" 408 is located on each side of the U-shape to guide the mating connection of recessed part of the back cover 301 of the Display Assembly 201 into the right position in case the mounting surface is slightly depressed relative to the surrounding surface. This mating process can be seen in FIG. 4B. Finally two silicon pads 409 are preferably located in the lower part of the bracket to prevent vibration of the Display Assembly 201 by applying a slight pressure to the back cover 301 of the Display Assembly 201.

In one embodiment of the present invention, the Auto-Rotation Accessory 208 can be an independent structure which replaces Wall Mount Bracket 206. In another embodiment, Auto-Rotation Accessory 208 can be a component which attaches to Wall Mount Bracket 206 already secured to a vertical wall. The Auto-Rotation Accessory 208 preferably allows free rotation of full 90° from vertical to horizontal and vice-versa so that a Display Device may be viewed horizontally or vertically. In the preferred embodiment of the present invention, the Auto-Rotation Accessory 208 also comprises a micro-controller connected to the iC-DPC 500 of the Display Assembly 201 for precise calibration, alignment and control through VSC 101. This preferably enables the Auto-Rotation Accessory 208 to automatically shift 90° in direction—from vertical to horizontal (portrait to landscape configuration), or vice-versa—depending on the image to be displayed on the Display Device 105. That is, the Auto-Rotation Accessory 208 is preferably configured to rotate a Display Device 105 based on the desired viewing content. Through the process of mounting the Wall Mount Bracket 206 to the wall to ensure perfect alignment of one side of Display Device 105 with the floor, ceiling, or door or window frame. Thus, the Auto-Rotation Accessory 208 is preferably adapted to rotate a Display Device 105 a perfect 90° to ensure that the Display Device 105 is always perfectly aligned. The Auto-Rotation Accessory 208 preferably incorporates a micro-controller for precise calibration, alignment and control through VSC 101.

The Connection Cord 204 is a wiring system that carries power from the Power Brick 205 to the Display Device 105. The Connection Cord 204 allows for installation of the Power Brick 205 at a distance, preferably up to 10 meters, from the vertical axis of the Wall Mount Bracket 206. All types of Connection Cords 204 share a common connector preferably providing an easy-to-use yet robust connection to the Wall Mount Bracket 206 and the Power Brick 205. The Connection Cord 204 preferably meets safety regulations for transport of preferably less than 30V DC power at less than 6 A over a distance of 100 m, securely connects to the Wall Mount Bracket 206, and preferably allows for less than 2 mm gap between the mounting surface and the back of the Display Device 105. Further, the Connector Cord 204 is preferably assembled with the Wall Mount Bracket 206 with one degree of freedom away from the wall and towards a user to allow for some flexibility when the Display Device 105 is mated with the Connection Cord 204. The actual visible part of the wire preferably enhances the iconic look of the device while addressing practical installation requirements.

A first type of Connector Cord 204 is a thin, minimally visible wire that lies flat against the mounting surface to minimize visible cross section. It is preferably made of two conductors protected by silicon insulation of various colors. A second type of Connector Cord 204 is wide and flat wire that can be secured to a wall and "disappear" under a coat of paint. Once installed, the wire can be maintained in place with a cleat 209 that is either attached to the wall with pre-installed sticking tape or simply that maintains vertical alignment by gravity. The cleat 209 preferably has a solid grip on the wire without damaging it and provides a clean pivot to turn the wire from vertical orientation (from the Wall Mount Bracket 206) to horizontal orientation (to the Power Brick 205) while maintaining a straight line along both axes. Alternately, this thin wire can be installed in a shallow groove on the mounting surface and covered with plaster and painted over to make it completely invisible. A second type of Connector Cord 204 is a thin flat cable that is glued or taped to the mounting surface and can be painted over to camouflage the same on a wall. This wire can be folded to a right angle at the base of the mounting surface to connect to a Power Brick 205 that is anchored to the mounting surface at the base of the wall. A third type of Connector Cord 204 preferably runs in the wall from the Wall Mount Bracket 206 to an exit cleat that connects to a thin wire connected to the Power Brick 205.

The Power Brick 205 provides DC power to the Display Device 105 through the Wall Mount Bracket 206 and the Connector Cord 204. The Power Brick 205 preferably comprises a power supply, a power cord, a status indicator and an enclosure. The power supply transforms sector AC power into DC power that is required to run the Display Device 105. The power supply is rated to provide up to 30V at 6 A. The power cord connects the power support to a regular residential or commercial power outlet through a replaceable connector that can be adapted to local power outlet regulation. The status indicator is a simple LED that provides power ON/OFF status. The enclosure preferably contributes to the iconic signature of embodiments of the present invention and facilitates installation in multiple positions, including flat on the ground, leaned against a wall or baseboard, or anchored to a wall.

Figure 26B:
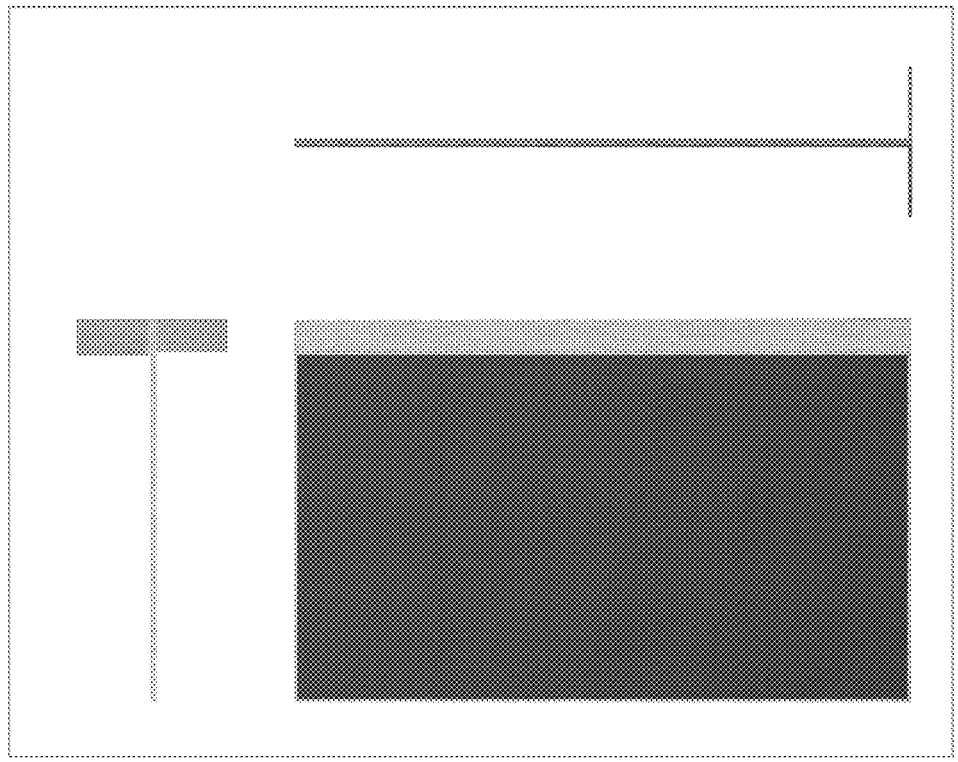
FIG. 26B discloses the display stand seen in FIG. 26A configured to secure to the display device of the present invention for display thereof in a vertical configuration.
Figure 26A:
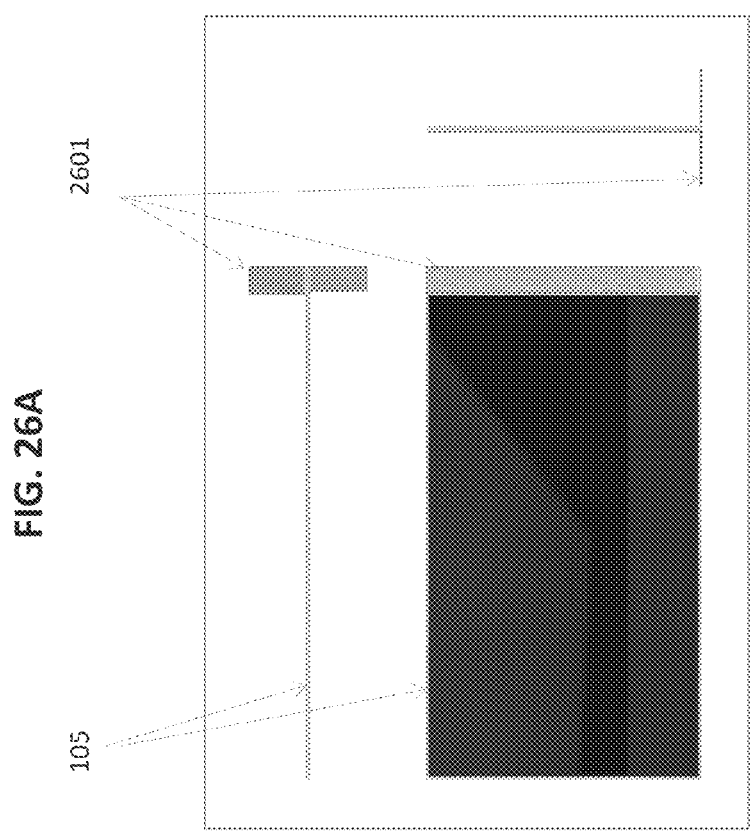
FIG. 26A discloses a display stand configured to secure to the display device of the present invention for display thereof in a horizontal configuration.

Alternatively to the Wall Mount Bracket 206 and Rotation Accessories, a Display Device 105 could be installed using a display stand 2601 as shown in FIGS. 26A & 26B. The stand 2601 is designed to attach to the side of the Display Device 105 to hold it straight up on top of a horizontal surface. This optional stand is preferably available in different heights to accommodate the short or long edge of the different sizes of Display Devices 105. The stand is designed to let the Display Device 105 sit directly on the horizontal surface and to mate flush with the edge of a Display Device with approximately the same thickness as the display assembly. The stand 2601 can be attached to the Display Device with either adhesive tape or screws, and can hold the Display Device 105 in a horizontal or vertical (landscape or portrait) configuration. The design of the stand preferably includes a separate power adapter that can be mated with the power connectors 306 of the Display Device 105 to complete the power circuit. The connection cord of this power adapter can be routed at the base of the display and attached to the base of the stand. In an alternate design, a power connector is added to the side frame of the Display Device 105, with a corresponding connector built into the stand and power wire running in the stand coming out at the base. The stand 2601 is preferably made of brushed aluminum but can also be made of other materials such as other metals, acrylic or wood. The display stand 2601 is configured to hold a Display Device in either a vertical or horizontal configuration, and a single display stand 2601 is configured to hold a Display Device in both configurations depending on the user's desire for configuration of the Display Device 105.

Figure 27:
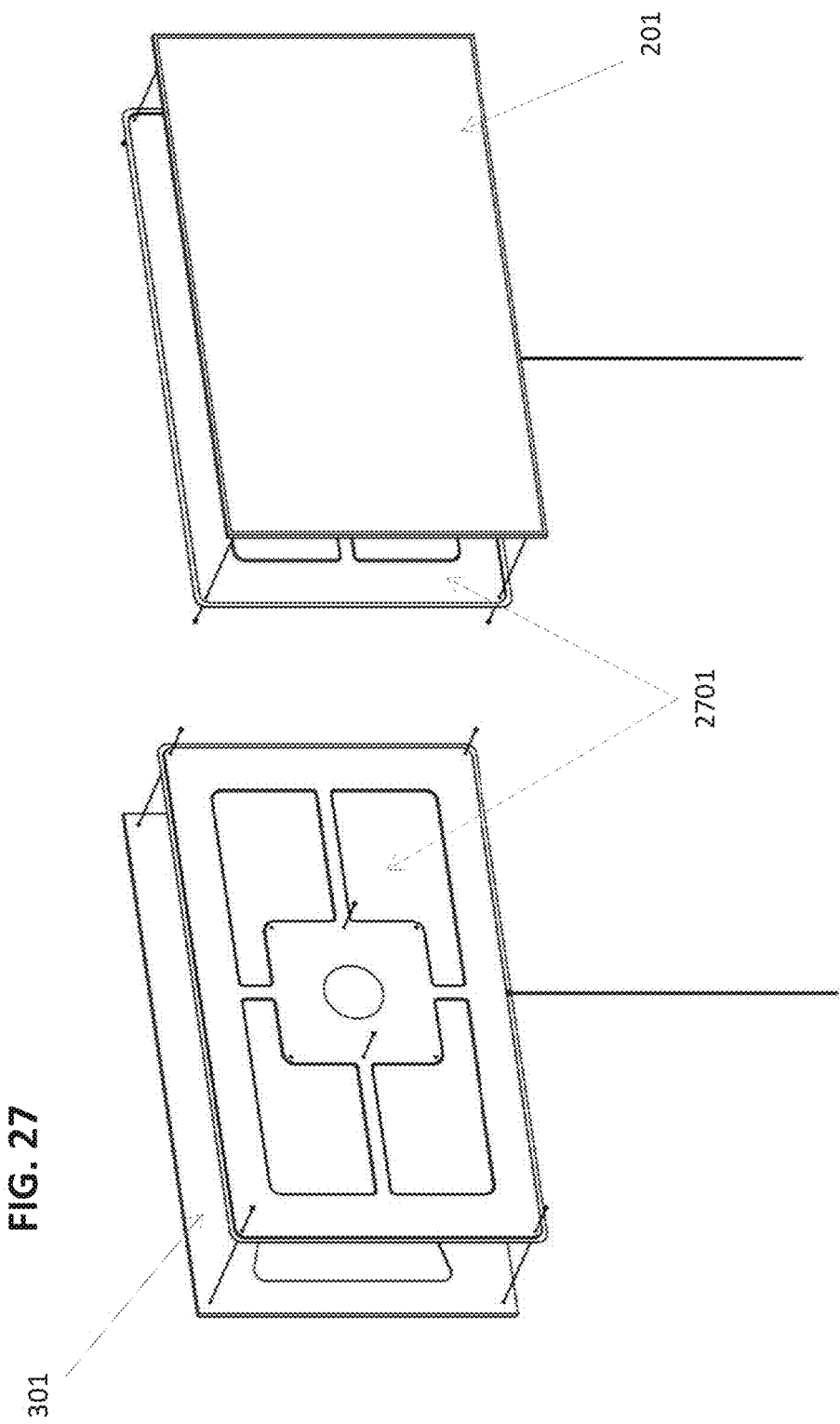
FIG. 27 is a front perspective view and a rear perspective view of a back plate of the present invention configured to secure to the display device of the present invention for display thereof.

As another alternative to the Wall Mount Bracket 206, Rotation Accessories or the stand 2601, a Display Device 105 could be displayed free standing—i.e., not secured to a vertical surface or a stand—using a back-plate accessory 2701, as shown in FIG. 27. The back-plate accessory 2701 is designed to re-enforce the structural rigidity of the Display Device 105 for leaning the Display Device 105 against a wall, use the Display Device 105 in a free standing situation where the Wall Mount bracket 206 or rotation device is not used or use with a standard VESA wall mount. The back-plate 2701 is designed to mate with the Display Device 105 using its recessed back cover attachment mechanism 305 and lock in place. Pads are preferably used to create a slight pressure between the back-cover 301 of the Display Device 105 and the back-plate 2701 to prevent any rattle or vibration in any potential free space between the back-cover 301 and the back-plate 2701. It incorporates power connectors to mate with the corresponding power connectors of the Display Device 306 as well as a connection interface with the Connection Cord 204. The back-plate 2701 preferably covers the entire area of, and marries flush with, the back cover 301 of the Display Device 105. Its attachment to the Display Device 105 is designed to maximize heat transfer to further increase distribution and dissipation of the heat generated by the active components of the Display Device 105. The back plate 2701 is configured to hold a Display Device in either a vertical or horizontal configuration, and a single back plate 2701 is configured to hold a Display Device in both configurations depending on the user's desire for configuration of the Display Device 105.

The preferred Display Assembly 201 of the present invention, no matter the size, preferably has a maximum and uniform thickness (depth) of 13 mm across the entire surface of the display assembly including its edges. This ultra-thin form factor is obtained through one or more of (1) minimizing of the mechanical structure, (2) design of electronics components to create ultra-thin profile electronics modules, (3) minimizing of the optical stack sub-assembly, (4) design of an ultra-thin power connector, and (5) design of the back-lighting sub-assembly. The mechanical structure of the Display Assembly 201 reduces weight and thickness to a minimum by allowing for greater bend and torsion of the Display Assembly 201 when it is not mated to its exoskeleton 202, secured to Wall Mount Bracket 206, mated to the stand 2601, or mated with the back plate 2701. The design preferably uses a thin aluminum frame and rear cover that work jointly with other components to create the minimum structural strength required to allow the Display Assembly 201 to remain in a flat plane when securely attached to its Wall Mount Bracket 206.

The electronics sub-assembly, generally referred to as the Display Processing Controller (iC-DPC) 500, is designed, preferably to a maximum of 4.5 mm in profile (height) and located on the edge of the display, to facilitate heat management and placement of the recessed Wall Mount Bracket 206 receiving end in the middle of the back cover 301. The thickness of the optical stack sub-assembly made of the TFT glass panel, filters and films, diffuser, light guide plane and reflector was reduced by minimizing the air gap between the layers and thickness of the light guide plane. The reduction of air gap thickness was compensated with improved (passive) airflow. An ultra-thin power connector preferably allows the Display Assembly 201 to mate with the power source attached to the Wall Mount Bracket 206. The shape of each connector is such that it allows for rotation freedom of approximately +/-5 degrees without losing power connection. A single or dual edge backlighting solution with high efficiency LED arrays is preferably used to match the reduced thickness of the light guide plane while delivering a uniform brightness in excess of 450 NITS across the entire active display surface. Edge LED arrays 302 are preferably mounted on L-shape brackets to simplify the mechanical design and facilitate assembly, increase heat distribution, and contribute to the overall structural rigidity of the Display Assembly 201. Finally, the Display Assembly 201 is mostly assembled using high strength adhesive tape to facilitate mechanical assembly and further reduce thickness and weight.

The Display Assembly 201 preferably incorporates a touch strip 201D on one or more sides of the display. These touch strips 201D preferably blend with the material of frame to make them invisible, and they are touch-sensitive to allow for linear analog control of various functions of the device. By moving a finger along the touch sensitive strip or tapping, a user can adjust display parameters or interact with Interactive or App Images.

Figure 4D:
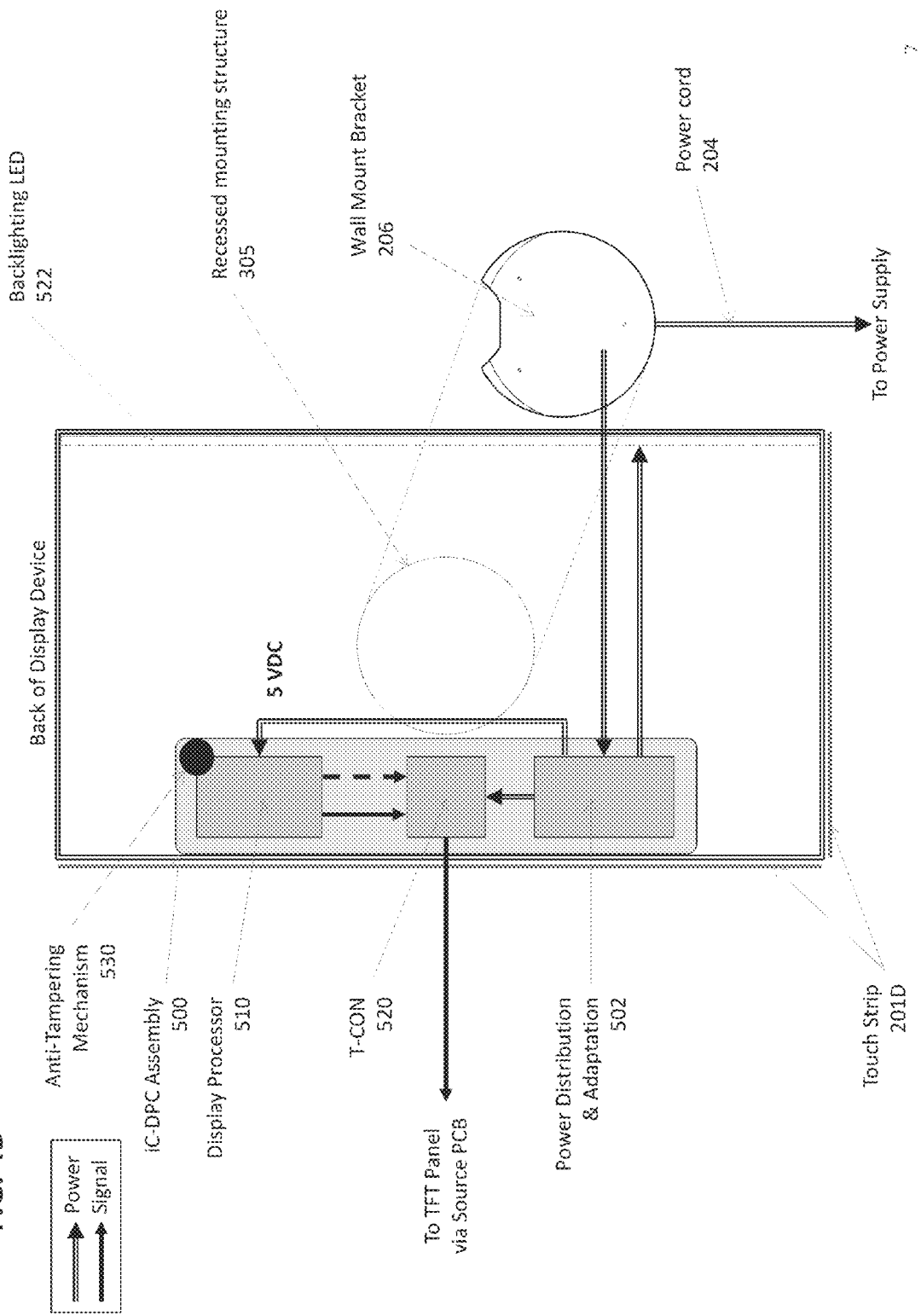
FIG. 4D illustrates the rear surface of the display device seen in FIGS. 4B and 4C and showing the external processor and electronics secured to the rear thereof.
Figure 5A:
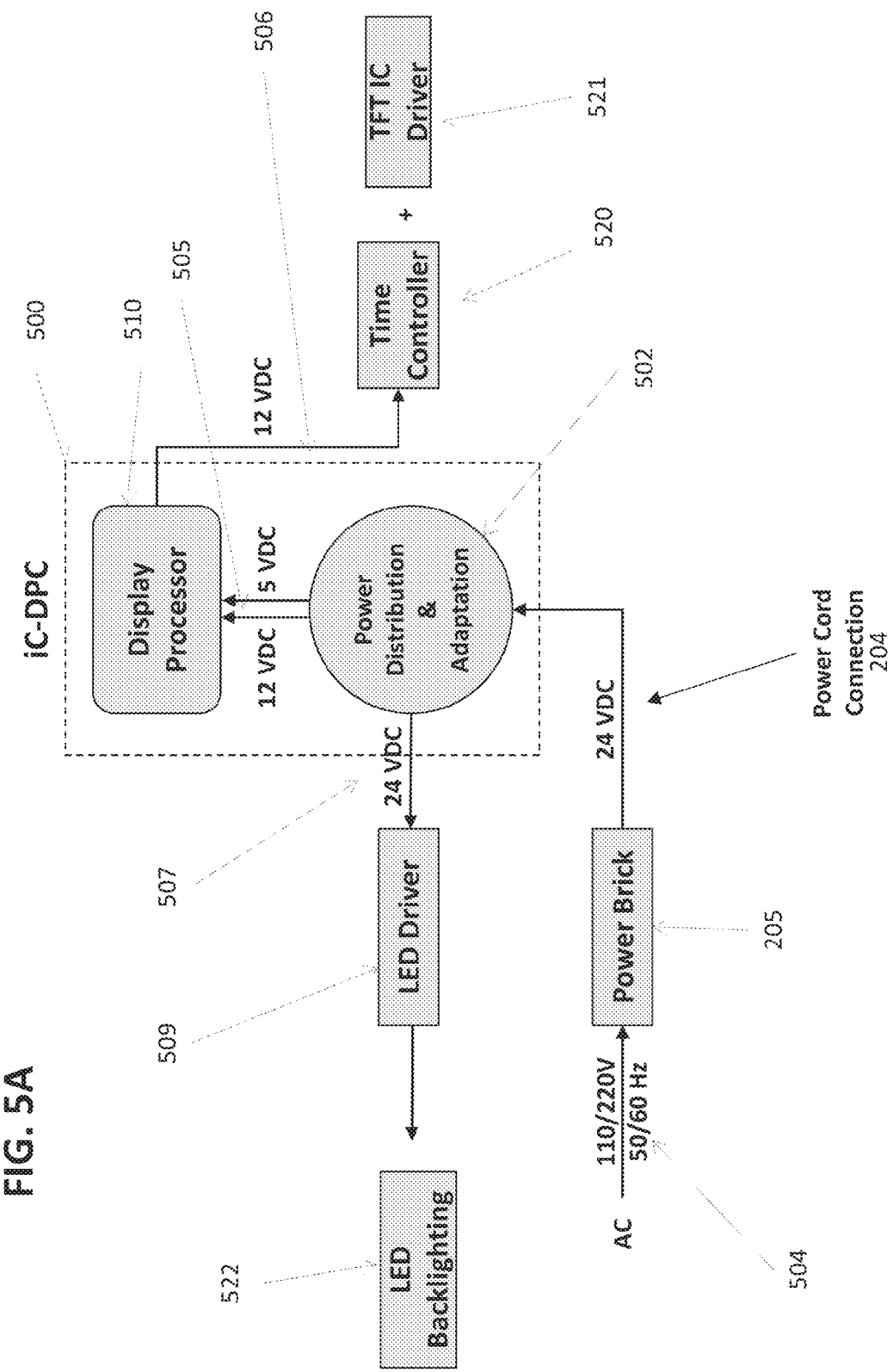
FIG. 5A depicts the power system for controlling a display device of present invention.

As depicted in FIGS. 4D and 5A, the Display Device 105 preferably incorporates a powerful dedicated processing module and electronics sub-system called Display Processing Controller (iC-DPC) assembly 500 which is configured to control the display of images on the Display Device 105 through a processor connected to the display screen of the Display Device 105. The iC-DPC assembly 500 preferably comprises three main components: a Display Processor 510, a Time Controller (T-CON) 520, and a Power Distribution and Adaptation module 502. The iC-DPC assembly 500 controls all functions of the present invention and communicates with the Service Cloud 101. The main component of the iC-DPC Display Processor 510 is preferably based on a multi-core high clock speed ARM® Cortex™-A9 architecture that incorporates a crypto-core, hardware video decoder and a fast I/O sub-system. The crypto-core is used to encrypt media content files for onboard storage and real-time deencryption when needed. The iC-DPC Display Processor 510 is preferably configured with a minimum of 1 GB of DDR3 or other types of fast random access memory that can be increased to 64 GB and two or more SD-RAM slots for a minimum onboard storage of 8 GB. The iC-DPC Display Processor 510 also preferably includes a number of standard Ethernet, USB and I/O ports, an onboard orientation sensor (to detect horizontal or vertical orientation), and WiFi, Bluetooth, Near Field Communication (NFC), and iBeacon wireless interfaces and connectors that can be populated to achieve various I/O configurations. The design of the iC-DPC Display Processor 510 preferably ensures that the entire decoded video path is physically and mechanically protected. Specifically, the length of the traces is kept to preferably less than 1 mm and a cover is glued on top of LVDS connectors to prevent probing the raw video signal driving the TFT panel. The entire iC-DPC Display Processor module preferably achieves the lowest profile possible by selecting low profile components starting with the main processor which is preferably less than 2 mm, using a variable layers PCB design and placing all components on the same side of the PCB, including fast random access memory modules (e.g., DDR3). T-CON 520 preferably receives Low Voltage Differential Signal (LVDS) video signal and power over one or two flat ribbons from the iC-DPC Display Processor 510 depending of frame rate. It connects the LVDS to the TTL electronics and drives the TFT panel 521 over a native interface to an electronic module commonly called "Source PCB."

Figure 24:
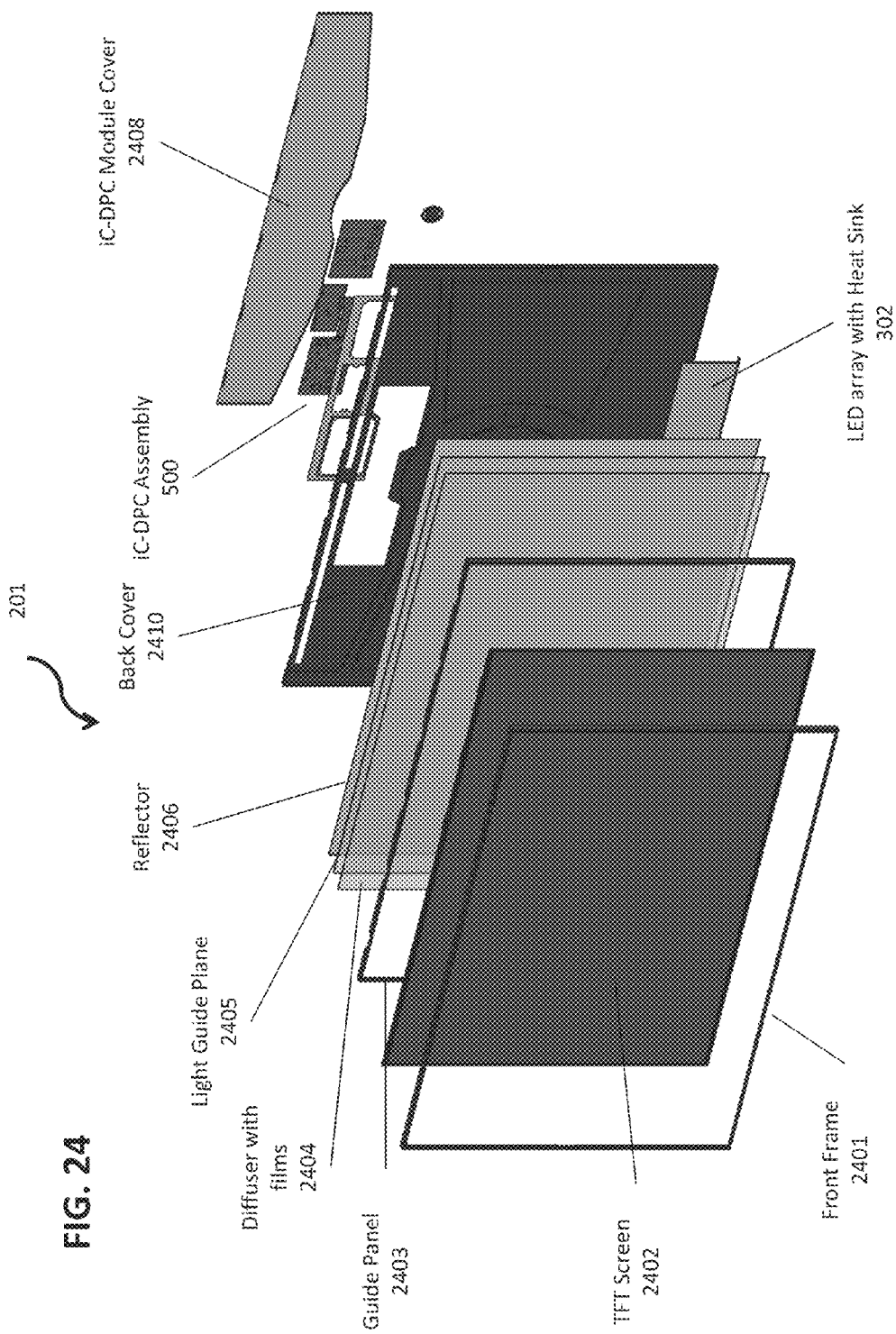
FIG. 24 is an exploded view of the Display Assembly of the present invention seen in FIG. 3.

As can be seen in FIG. 24, the Display Assembly 201 is preferably made of a front frame 2401, a TFT panel 2402, a series of optical films and filters 2404 (polarizing filters and image and color enhancers) held in place with a Guide Panel 2403, the backlighting subsystem, the back cover 2410 and the iC-DPC assembly 500 contained in the iC-DPC module cover 2408. The front frame 2401 is designed to provide minimum front bezel width to cover the inactive area at the edge of the glass and contribute to overall structural rigidity. The optical films and filters 2404 are made of thin polarizing filters, image and color enhancers and diffuser plane that are layered to enhance brightness, contrast, color, and image resolution and ensure maximum uniformity of image and motion quality. The backlighting unit is preferably made of a single or dual edge array of LEDs and a heat sink 302, a specially designed light guide plane 2405 of preferably less than 3 mm to match the actual size of the LEDs 302, and a back reflector 2406. The brightness of the LEDs 302 is controlled by the LED driver 509 (part of the power sub-system) which is, in turn, controlled by the iC-DPC Display Controller 510. The light emitted by the LEDs 302 propagates through the Light Guide Plane 2405. The iC-DPC assembly 500 is pre-assembled in the iC-DPC module cover 2408 that snaps in the back cover 201 to complete the assembly. The iC-DPC module cover 2408 and the iC-DPC electronics assembly 500 are designed to be used with all Display Assembly 201 sizes to facilitate assembly and reduce production complexity and costs.

The Power sub-system preferably includes three main active components: (1) Power Brick 205, (2) Power Adaptation and Distribution Module 502 and (3) LED Driver 509. The Power Brick 205 is a universal power supply rated for 150 W to support Display Device sizes up to 60" with an efficiency rating of 85% and safety margin of 15%. It accepts standard residential AC 504 ranging from 110V to 220V at 50 Hz to 60 Hz and feeds 24 VDC at up to 6 A to the Power Adaptation and Distribution Module 502 located in the Display Assembly 201 through the Connection Cord 204. Although several types of Connection Cord 204 are envisioned, the preferred wire is made of a very thin (2.2 mm) and flexible 20 AWG (copper) two-conductor flexible wire covered with silicon material. This Connection Cord 204 is very malleable and does not retain any deformation to ensure near perfect vertical alignment when properly installed. The Power Adaptation and Distribution Module 502 uses a series of DC/DC step-down elements to provide 5 VDC and 12 VDC rails 505 to the iC-DPC Display Processor 510, and a 24 VDC rail 507 to the LED Driver module 510. The Display Processor 510 sends 12 VDC 506 to the Time-Controller (T-CON) 520 and TFT IC Driver 521 modules. The Power Adaptation and Distribution Module 502 preferably uses electronics components that offer the lowest z-axis (thickness of) profile possible and still offer proper critical de-rating to ensure product quality and longevity. Capacitors are selected for de-rated voltage, inductors, diodes and FETs are de-rated for current, and preferable values preferably depend of the size of the display and design of backlighting.

Figure 5B:
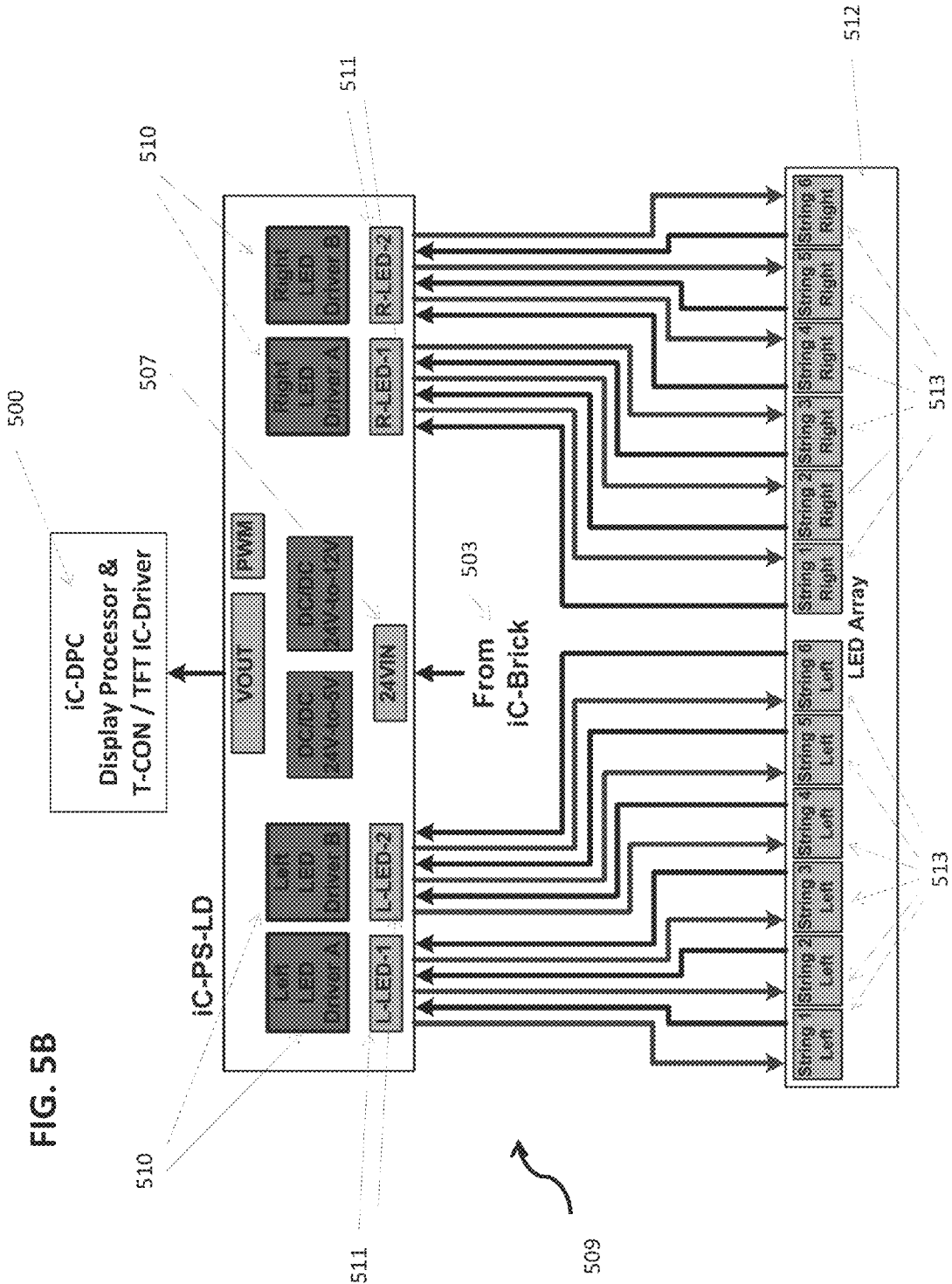
FIG. 5B depicts the LED backlighting power distribution of the present invention.

FIG. 5B is a block diagram of the iC-DPC LED Driver 509. The LED Driver module 510 receives 24 VDC 507 from the Power Adaptation and Distribution Module 502 and provides adapted power 511 to LED arrays 512 to drive proper lumen level for the LED Backlighting 522 subsystem. The LED Driver module 510 preferably drives up to 200 mAmps per LED string 513 and achieves the lowest z-axis profile possible while offering proper critical de-rating to ensure product quality and longevity. Traditional electrolytic capacitors are preferably replaced with banks of parallel ceramic capacitors to obtain a lower z-axis profile for same performance ratings. In addition, the LED Driver module 510 preferably includes a thin 2 mm connector capable of supporting up to 3 A. The iC-DPC LED Driver 509 also preferably includes a Voltage Output and a Power Management source.

The Display Device 105 is preferably capable of presenting one or more of four different types of images: (1) Still Images, which are digital images that do not change over time (a single "still picture" image may be displayed on one or several separate and coordinated devices to create a desired artistic effect); (2) Motion Images, which are digital motion video at various frame rates and various length, which can be looped (a single "motion picture" item may be displayed on one or several separate coordinated devices to create a desired artistic effect); (3) Interactive Images, which are digital images that have interaction between still or motion images displayed on the Display Devices 105 and the mobile apps running on the Client Control 107 to create changes in the image displayed on the Display Device 105, reveal information through the mobile App 108 when the camera of the Client Control device 107 overlays the App display with the Display Device 105, and/or trigger changes in the images or information displayed on the mobile app; and (4) App Images, which are real-time graphics renderings—i.e., not pre-rendered video—of visual scenes with or without audio or live data sets or objects driven by a software app and hosted on the Display Device 105 of the present invention that may react to external data sources or user input.

App Images are images and sounds that are produced by an Application running in the Display Processor 510 of the Display Device 105 and controlled by an extension to the Client Control 107 user interface that is specific to the functionality of that App. App Images can also stream audio-only content with no visual and/or audio content. The App can be previewed and purchased from an App Store using the Client Control 107 user interface, and it can be installed on the Display Processor 510 of the Display Device 105 by dragging the iconic representation of the App on the Client Control 107 user interface to the graphics representation of the selected Display Device 105 on the user interface. Once selected from an app catalog, the actual download and installation of the App on the selected Display processor 510 is preferably fully automated without any other action from the user. App Images are secured and managed like other types of Images, i.e., downloaded to a Display Device 105 when requested, secured, and prioritized in onboard memory based on viewing profile. App Images can also be locked in the Display Processor 510 memory during production process or when a user acquires the App Image to create a specialized Display Device 105 that can execute a limited number of Apps (e.g., digital signage or video playback). App Images can be driven by an internal data source (i.e., time) or by an external real-time data feed or audio/video stream, or combination of more than one type of data source. Examples of data feed include standard RSS feed—weather, stock market, etc.—as well as social data feeds—Twitter, etc.—or custom or proprietary data feeds—telemetry, game data, etc. Apps may or may not offer corresponding user interface controls and indicators on the Client Control 107.

In addition to these four types of Images, the iC-DPC Display Processor 510 allows for composite Images where different types of Images (Still, Motion, Interactive, or App) are combined into a single display. The layout and composition can be static or change over time, whether through preprogramming, control from external data source, or manual controlled. iC-DPC Display Processor 510 also preferably provides layout management using graphics rendering capability. Layout management allows juxtaposition of several images in one or more predetermined layouts that are adapted to change over time either in a pre-defined way or driven by an external source. Using a number of pre-defined layout templates, the iC-DPC Display Processor 510 can display a plurality of images simultaneously (preferably up to 12 different images, comprising a combination of Still, Motion, Interactive or App Images) on a single Display Device 105. Layout templates define number and location of each active area (i.e., an area where an Image is displayed) as well as background and border attributes. A user can select a layout template or allow the iC-DPC Display Processor 510 to manage the same automatically.

Figure 25:
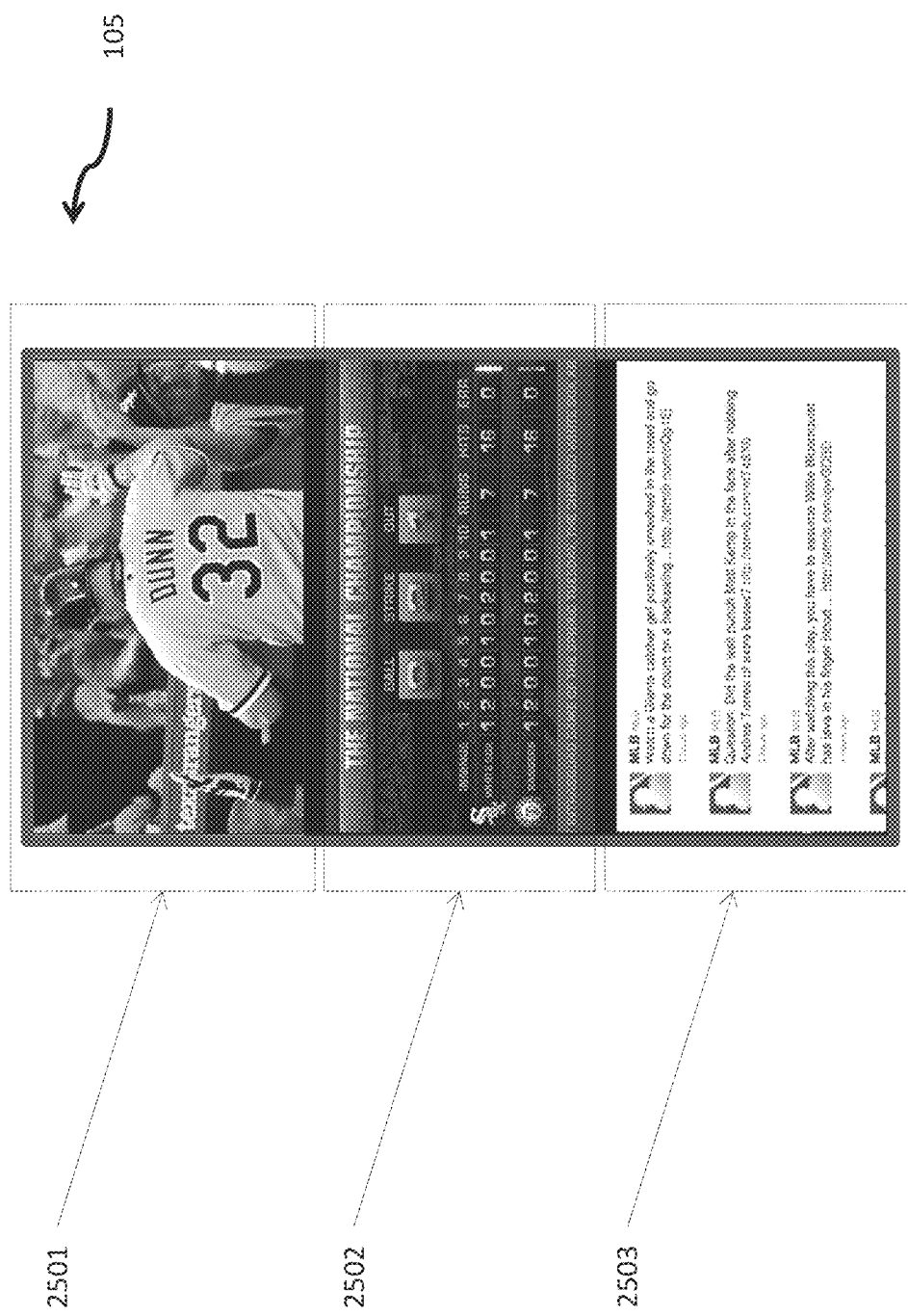
FIG. 25 is a front elevational view of a display device of the present invention simultaneously displaying three separate images simultaneously, each being displayed in full 16:9 aspect ratio.

One specific type of layout is illustrated in FIG. 25, showing a Display Device 105 in vertical Portrait orientation to display three 16:9 images 2501, 2502, and 2503 vertically, one on top of the other. In the example shown in FIG. 25, three images of 1080 pixels (horizontally) by 608 pixels (vertically) are displayed simultaneously, leaving a total of 96 pixel rows for borders and other graphics elements rendered by the Display Processor 510. Each of these 16:9 areas can display any type of Images (Still, Motion, Interactive or App Images). A user can select this pre-defined layout using the Client Control 107 user interface and assign content to each area independently. Each image in each area is also controlled independently of the others using a specific extension of the user interface. For example, the top area 2501 can display a live video feed of a sporting event, while the center area 2502 can display a scoreboard feed of the same event and the lower area 2503 can display live Twitter feed of the same event. The user may decide to move the sport event (top area 2501) to the center area 2502 and select a different sport event to be displayed in the top area 2501.

Figure 6:
FIG. 6 is a front elevational view of a digitally-rendered graphics frame and mat of the present invention, adapted to be incorporated an in embodiment of a display device of the present invention.

Finally, playlists define a sequence of Images (including composite Images) that will be displayed sequentially either along a fixed timeline or under manual user input control or reacting to external triggers from the Service Cloud 101. These images can combine to cover all or substantially all of the display area of Display Device 105 while each maintaining their 16:9 aspect ratio and not compromising the image quality. In the preferred embodiment of the present invention, three separate digital content images can be displayed on a Display Device 105, which is positioned in a vertical (portrait) configuration, so that the three digital content items, when stacked vertically, cover approximately 95% of the display screen viewing area, iC-DPC Display Processor 510 can use its graphics rendering capabilities to create a digital frame and/or digital mat around a piece of digital content. FIG. 6 is a depiction of the Digital Frame 601 and Digital Mat 602 generated by the iC-DPC Display Processor 510. A Digital Frame 601 is a 3D shaded graphics rendition of a traditional painting or poster frame that is digitally rendered by the iC-DPC Display Processor 510 graphics engine. A Digital Mat 602 is a 3D shaded graphics rendition of a traditional painting or poster mat that is digitally rendered by the iC-DPC Display Processor 510 graphics engine. A Provisioning Engine 1203 of the present invention preferably automatically adjusts the dimensions and 3D shaded attributes of the Digital Frames 601 and Digital Mats 602 to adapt to the displayed digital media content item and the size and orientation of the Display Device 105 and enforce guidelines defined by the artist and curators.

The Digital Frames 601 and Digital Mats 602 can be combined and multiple mats can be layered to create various depth, shadowing and perspective effects rendered by the graphics engine of the present invention. As an alternative to a physical Decorative Frames seen in FIG. 9, Digital Frames 601 and/or Digital Mats 602 may be included around any digital content displayed on embodiments of the Display Device 105 of the present invention. These features can be selected from a library of pre-defined styles (varying based on texture, pattern, color, or in other ways). This library is presented in the form of a digital framing store with a wide selection of pre-defined frames and mats and a rule engine (part of the Provisioning Engine 1203) to recommend the best combination of the same to match a specific visual and/or audio digital content item based on the nature, attributes and composition of each visual and/or audio content item. The content Provisioning Engine 1203 of the present invention also allows a curator to recommend or limit selection of Digital Frames 601 and Digital Mats 602 for a given visual and/or audio digital content item.

Additionally, the Provisioning Engine 1203 optimizes the visualization of digital content to be displayed in the Display Device 105 of the present invention. Specifically, if the aspect ratio of a content item to be displayed, such as a painting, does not correspond to the display area of a Display Device 105, the Provisioning Engine 1203 will preferably automatically detect this situation and provide a Digital Frame 601 and/or Digital Mat 602 for the image to maximize the display viewing area of the Display Device without hindering the quality of the image displayed thereon. A Digital Frame 601 and/or Digital Mat 602 can be selected from the content library or, if none exists, from the Internet to match the digital image to be displayed.

Figure 9:
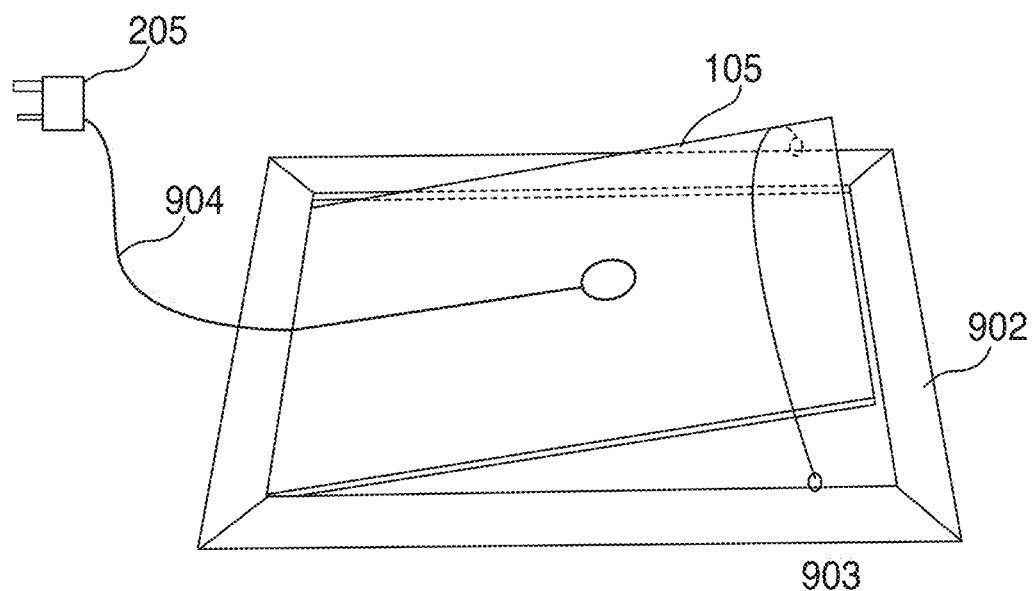
FIG. 9 is a rear perspective view of a physical decorative frame designed to hold the display device embodiment of the present invention as opposed to use of a digital frame.

As seen in FIG. 9, an optional external Decorative Frame 902 similar to the physical frames that surround traditional paintings or posters can be added to device to enhance the minimalistic design of the Display Device 105. The optional Decorative Frame allows a Display Device 105 to be mounted in a traditional physical frame 902 and installed on a wall using a traditional anchoring mechanism 903. The Display Device 105 can be locked in place inside the Decorative Frame 902 using a friction mechanism built into the frame of the Display Device 105. A Framing Kit is also available to allow traditional frame makers to build a frame where a display assembly will lock perfectly in place and allow for air flow required for cooling Display Device's active electronics components. For the installation of Display Device 105 using a Decorative Frame 902, the Connection Cord 904 is preferably connected to the Display Device 105 using a direct connection adaptor included in the Framing Kit before mounting on the wall and then connected to the Power Brick 205. The Wall Mount Bracket 206 or Auto-Rotation Accessories 208 are preferably not used with Decorative Frames 902; instead, a traditional frame mounting mechanism 903—hook and wire, nail and bracket, etc.—may be used to attach the Decorative Frame 902 (including the Display Device 105) to the mounting surface.

iC-DPC Display Processor 510 is configured to automatically manage its onboard storage to keep the most current or frequently viewed images in storage within the Service Cloud 101. This allows older or less viewed Images (Still, Motion, Interactive or App Images) to be replaced with newer content; removed Images can be automatically reloaded when viewing is requested by user. This onboard image management process is configured to be automatically performed continuously without any intervention from a user. However, a user preferably has the ability to lock an image in the memory of the Display Processor 510 to prevent it from being dislodged to the Service Cloud 101 by a more recent or viewed Image.

The iC-DPC 500 generates Still or Motion Images by decoding digital media content from local onboard storage 2003, progressive download or direct streaming. It also provides audio functionality by extracting encoded audio from the digital media content and generating a real-time audio stream that is compatible with third party external audio rendering systems and transmitted over the WiFi, Bluetooth, Near Field Communication (NFC), or iBeacon wireless interface. iC-DPC 500 also incorporates the V-Sound Engine 2012 which modifies the decoded source audio stream to adapt to the external audio system by modulating audio frequencies or audio range or generating surround sounds channels. The V-Sound Engine 2012 also allows for adjusting a video compensate for lag introduced by the wireless communication interface, transmission, and external audio system internal processing. In order to obtain the optimum audio and video synchronization, the Display Processor 510 has a calibration application which allows a user to visually adjust the video delay to perfectly synchronize with the audio signal using a visual pattern.

Figure 20:
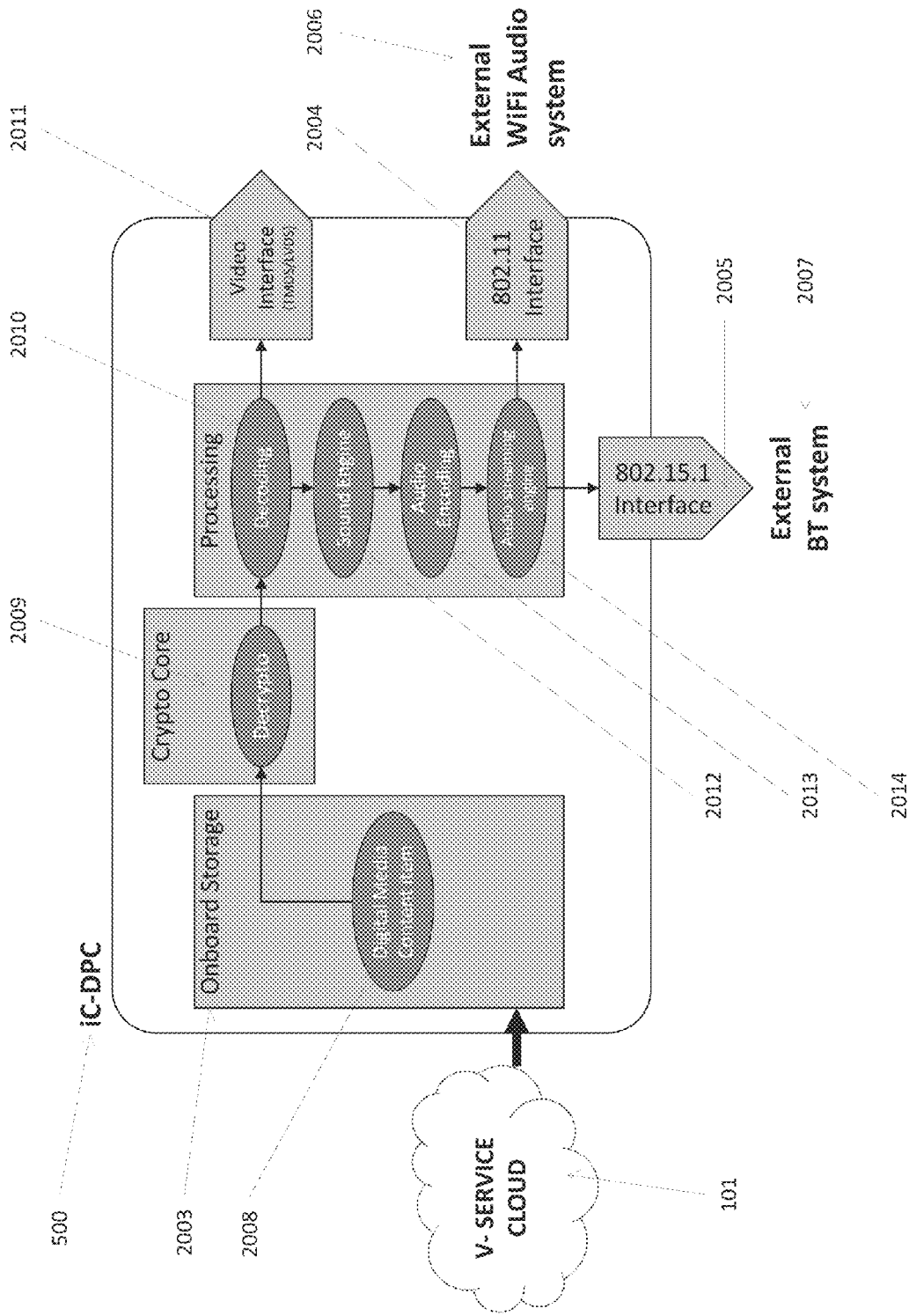
FIG. 20 discloses the audio streaming system of the present invention to an external audio system.
Figures 21A, 21B:
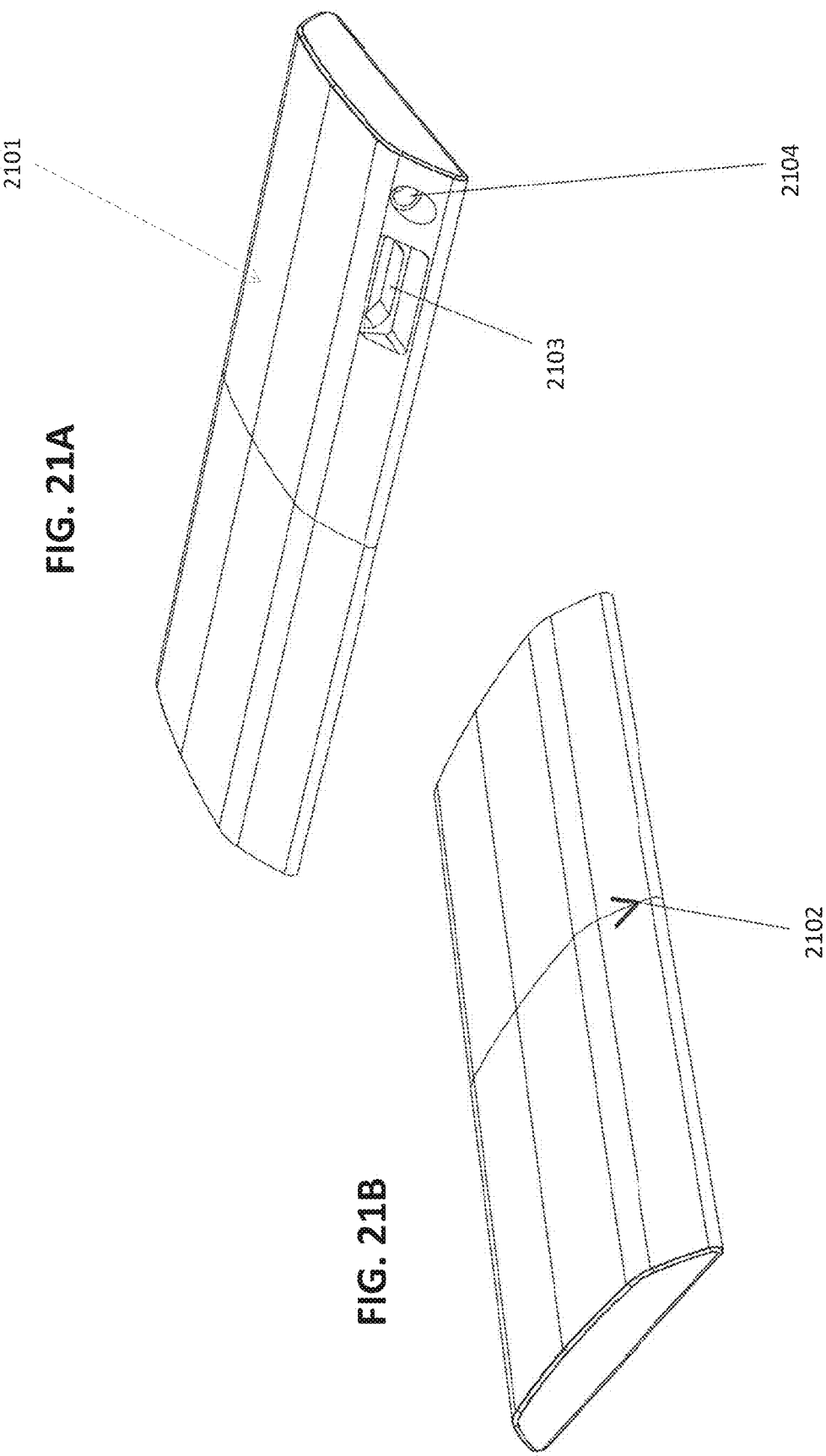
FIG. 21A is a front perspective view of the player of digital art, decorations, posters, visual lifestyle, social media, over-the-top, MSO, and other types of content associated with the present invention.
FIG. 21B is a rear perspective view of the player of digital art, decorations, posters, visual lifestyle, social media, over-the-top, MSO, and other types of content seen in FIG. 21A.

FIG. 20 is a block diagram that illustrates an embodiment of the general audio streaming sub-system of the present invention. The iC-DPC 500 preferably streams high quality audio embedded in digital media content obtained from the Service Cloud 101 and stored in iC-DPC onboard storage 2003 over WiFi wireless interface (IEEE802.11) 2004 and other wireless interfaces 2005 (including Bluetooth— 802.15.1, Near Field Communication or NFC—including ISO/IEC 18092, and iBeacon) to external third party audio rendering systems 2006 and 2007, respectively. A digital media content item 2008 is re-constructed using data from onboard storage 2003 and decrypted by the iC-DPC crypto-core 2009 before being transferred to the iC-DPC decoder 2010. The decoder 2010 sends the decoded image/video to the TMDS/LVDS interface 2011 and transfers the audio data to the Sound Engine 2012 before being encoded 2013 and transferred to the audio streaming engine 2014. Depending on configuration, the audio streaming engine 2014 can send the audio stream across one of the previously mentioned wireless communication interface to an external audio (rendering) system 2006 or 2007 that renders the actual acoustics.

The iC-DPC Display Processor 510 includes a secured lock-down processor 510 with a secure booth loader, a signed Android OS running on a secured partition, and security key registers (all features of a security sub-system of a Freescale iMX6 processor preferably used) that are preferably not exposed in clear outside of a trusted application space. All software applications are preferably signed and authenticated before being installed. In addition, the iC-DPC Display Processor 510 mechanical design ensures that the entire decoded video path is protected. Also, as a design and safety feature of the present invention, all removable storage and memory modules are preferably glued to their receptacle socket if not soldered to the electronics module to prevent unauthorized removal without irremediable destruction of the electronics module.

The iC-DPC Display Processor 510 preferably uses a Virtual Environment Abstraction Layer (VEAL) Adapter 1220 to allow an App Image connected to one or more external public or private Service Clouds 1216 and 1217 to execute securely within iC-DPC Display Processor 510. The VEAL adapter 1220 is preferably wrapped around the App to deliver all required resources including Access Control, Management and Control, Content Delivery and Security. It allows the App to communicate securely with its external Service Cloud 1216 or 1217 through its corresponding Virtual Environment 1223 hosted within the Service Cloud 101.

The iC-DPC Display Processor 5100S is configured to allow for secure remote OS update and application update down to the file level using a signature authentication mechanism. In the case where an OS update is broken or current OS gets corrupted, the iC-DPC Display Processor 510 has the capability to automatically fall back to a previous safe OS version that is stored securely on the iC-DPC Display Processor 510. Using this mechanism a Service Cloud 101 operator is able to force fall back or remotely install and configure a new OS version with information securely stored on the iC-DPC 500.

There are preferably two mechanisms disclosed by embodiments of the present invention to protect content stored by the components of the present invention: the first can preferably be used for most content types and the second is a security model that offers additional protection for higher value content. In the preferred embodiment of the present invention, these two mechanisms are mutually exclusive but complementary processes, though it is envisioned in an alternate embodiment of the present invention that they could be combined. For digital content which are not of high value, the first security mechanism—shown in FIG. 7—can be utilized, which segments a digital media item into a plurality of segments before storing the same onboard the iC-DPC 500 and sends only a small percentage of the segments—called a pre-formatted file 702—to the V-Secure Content Service ("VCSC") 1218 of the VSC 101 for storage. The second security mechanism—shown in FIGS. 17 and 18, and described in detail later—can be used for securing higher value digital content items 1810, where content is instantly dissected on the Service Cloud 101 into particles 1507 which can then be further cut into slices 1802 which can individually be encrypted using a Cypher Key 1806 and separately stored.

Figure 7:
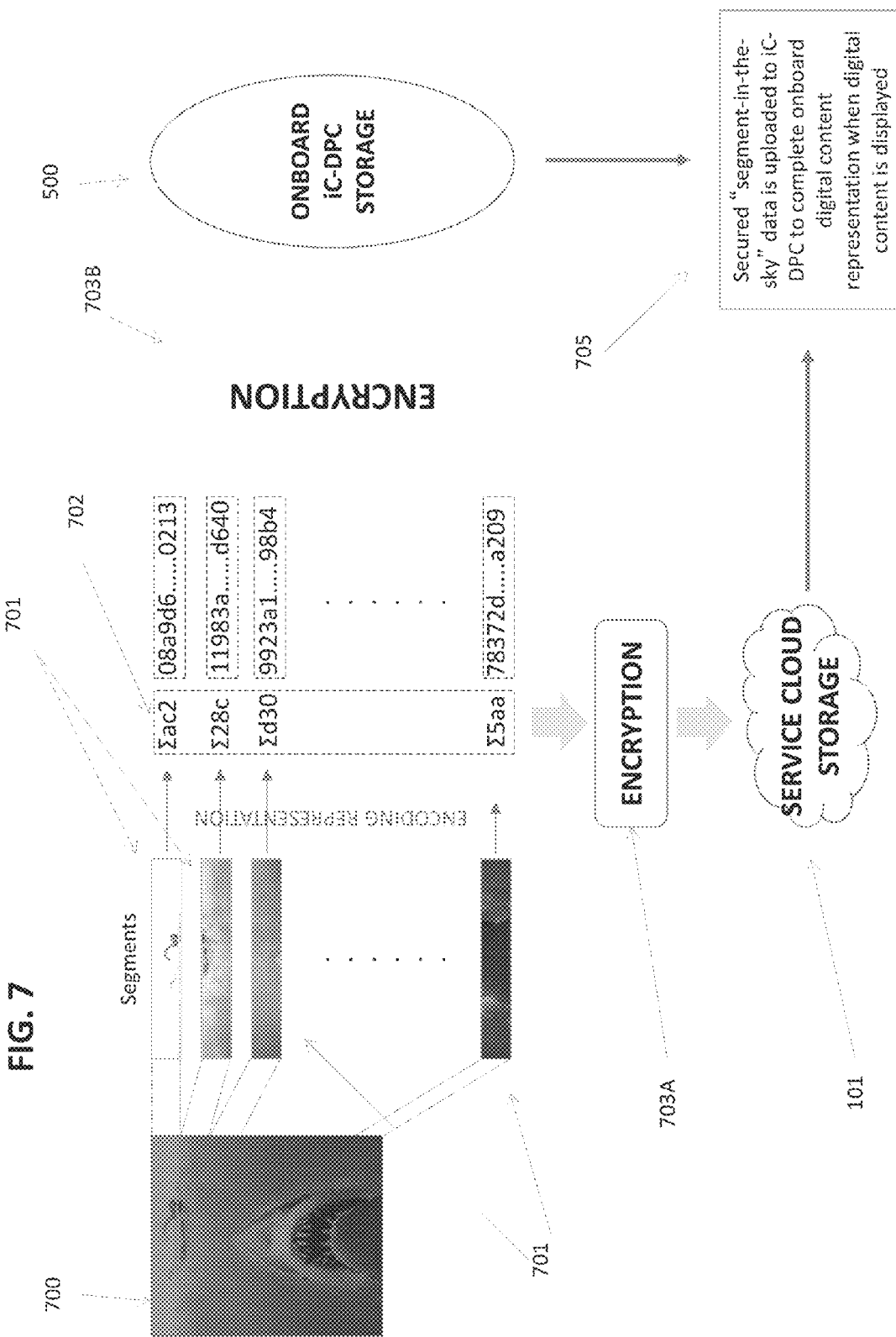
FIG. 7 depicts an embodiment of the first level content storage security and protection system of the present invention.

FIG. 7 is a representation of an iC-DPC first level content storage security system design embodiment of the present invention. This storage security model can preferably be applied to all content unless the higher level content security model depicted in FIGS. 17 an 18 is desired and utilized. A Digital Content Image 700 which has been simply encrypted in the VCSC 1218 can be downloaded by iC-DPC 500 using secured protocol, at which point the Digital Content 700 can be de-encrypted and segmented into a plurality of segments 701. A small portion of each segment 701 can be removed and packaged in a container 702 (so-called "segment-in-the-sky") that is provided with an encryption 703A and sent to the Service Cloud 101 to be stored. The remaining portion of the segments can be re-encrypted with an encryption 703B and stored together on the iC-DPC 500 until they are reconstructed back together. Thus, each Digital Content Image 700 stored in iC-DPC 500 is missing a key piece of data necessary for the image to be reconstructed. Upon receiving an authenticated command to display a Digital Content Image 700 on a Display Device 105, the iC-DPC 500 requests the appropriate "segment-in-the-sky" 702, decrypts it, and reconstructs each segment 701 at step 705 to reassemble the complete image.

Embodiments of the present invention preferably incorporate an anti-tampering mechanism 530 that triggers immediate zero-removal of all encryption and segmenting keys and digital media content if an attempt to physically access the iC-DPC Display Processor 510 module is detected. The anti-tampering mechanism 530 is a mechanical switch that is preferably embedded in the iC-DPC Module Cover 2408. As soon as an attempt is made to separate the cover from the Display Processor 510, the anti-tampering mechanism 530 is preferably configured to send a signal to the iC-DPC Display Processor 510 to initiate a zero-removal procedure. The iC-DPC Display Processor 510 incorporates a battery to ensure that the switch and processor have enough power to detect and execute this procedure in case power is disconnected from Display Device. A zero-removal procedure has the highest execution priority and can't be interrupted once initiated. It preferably starts by erasing all registers and keys (replacing with zeros) and then continues by erasing stored Image file indexing and then stored Image files and finally the application software and operating system until it runs out of power.

As for any storage system, digital content integrity may be impacted by digital rotting or data corruption over time. To protect against such degradation, which affects the quality of images displayed, the iC-DPC Display Processor 510 incorporates software to continuously monitor the data integrity of stored content for data integrity and requests downloads of parts or complete items if it detects digital rotting or data corruption. This process takes place in the background, ideally guarantees all aspects of stored content protection, and does not impact the viewing of digital content on the Display Device 105.

Embodiments of the present invention preferably integrate the Display Device 105 seamlessly into a connected home network and can be configured to become either a master, slave or peer node. Through its wireless connectivity interfaces, iC-DPC Display Processor 510 can receive commands or send commands from other connected devices or appliances or other Display Devices 105. Among other types of devices, a Display Device 105 can be integrated with proximity and location sensors, thus enabling it to become "aware" of its environment and react accordingly. For example, it may be able to detect the presence of a warm body or a motion and adjust its displayed Images accordingly; alternatively, it may detect the proximity of another smart device and trigger an action in the remote device or coordinate an action between itself and the remote device. Multiple Display Devices 105 can communicate with one another within wireless proximity and relay ("hop") messages (e.g., motion detected), commands, or images back and forth to coordinate actions.

The iC-DPC Display Processor 510 preferably incorporates standard IEEE 802.11 (WiFi) capability. Once the device is connected to the cloud, all control, command and reporting dialogs are preferably exclusively routed through the cloud using secure IP protocol over the WiFi communication link through a local wireless access point 1104, thus enforcing a strong security framework and preventing unauthorized access to its resources. The WiFi interface can operate in master (infrastructure) or slave (peer) modes depending on the initialization status of the Display Device 105.

Other wireless communication standards such as Bluetooth—802.15.1, Near Field Communication—including ISO/IEC 18092, and iBeacon may also be used to communicate with remote devices. Local peripheral devices such as audio rendering system or sensors can communicate with a Display Device 105 over WiFi or other wireless communication interfaces to establish a direct link with an authorized mobile Client Control 107 device hosting the Client App 108. The iC-DPC 500 may also incorporate a USB port to allow external devices such as external sensors to connect and transfer data to/from the iC-DPC Display Processor 510.

A 3G (IMT-2000) and 4G/LTE and 4G/WiMax (IEEE 802.16) cellular wireless interface can also be enabled to allow the iC-DPC Display Processor 510 to communicate with the Service Cloud 101 through a local cellular data service operator network.

Exoskeleton

Figure 8:
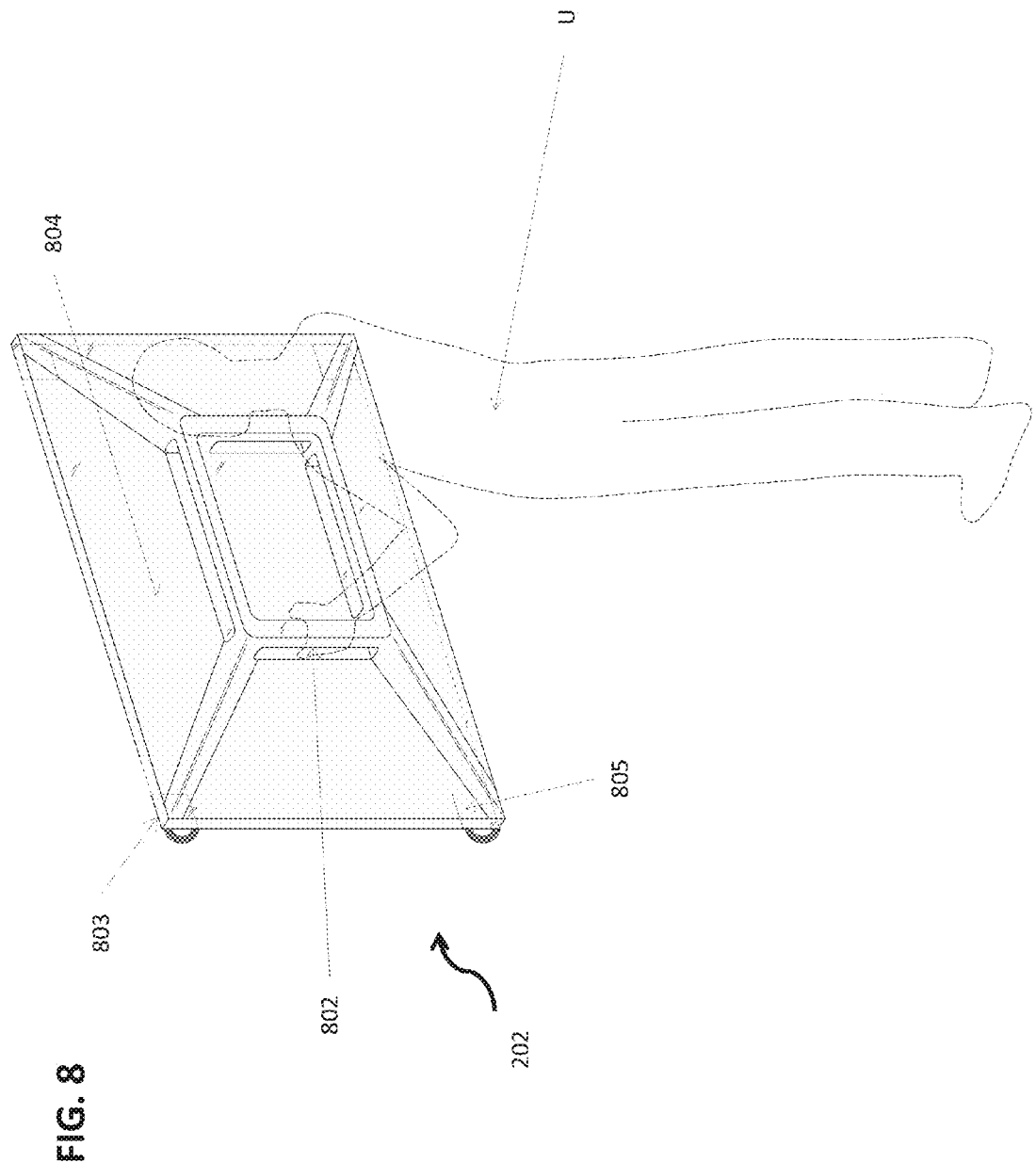
FIG. 8 depicts an embodiment of the exoskeleton packaging of the present invention used for shipping and installation of a display device of the present invention.

As can be seen in FIG. 8, the Exoskeleton 202 is a protective shell that is attached to the front side—comprising the display screen—of a Display Device 105 which is preferably formed of glass. The Exoskeleton 202 preferably provides ease of manipulation, handling, and installation of the Display Device 105, makes the installation process more accurate, protects the Display Device 105 during shipping and handling, and allows for dramatic reduction of the Display Assembly 201 internal structure, thus enabling a much thinner and lightweight design. Preferably, the Exoskeleton 202 is configured to couple to the Display Device 105 to protect it on all sides—except for the rear surface of the Display Assembly 201 which connects to a Wall Mount Bracket 206—and is adapted to quickly and easily decouple from the Display Device 105 once it is in place on a wall. The Exoskeleton 202 is designed to prevent excessive bending and twisting of a Display Device 105 and provides holding points (e.g., handles) to facilitate removal from the shipping packaging and attachment to the Wall Mount Bracket 206 or Auto-Rotation Accessory 208.

The three main components of the Exoskeleton 202 include (1) handles 802 to grab and manipulate the Display Assembly 201, (2) locking mechanism 803 to securely attach the Exoskeleton 202 to the Display Assembly 201 without risk that the Display Device 105 will fall and shatter, and (3) Body 804 that provides the required structural rigidity while remaining light and easy to handle. The locking mechanism 803 is preferably made of a plastic material part 805 that pivots behind the Display Assembly 201 to securely and firmly attach the Display Assembly 201 to the Exoskeleton 202.

Installation

The Display Device 105, mated to its Exoskeleton 202, is preferably delivered new in packaging that protects the device during shipping and handling, facilitates installation of the device, includes installation tools to install the device, and delivers a unique and rewarding "out-of-the-box" experience. The entire packaging and installation procedure is ideally completed in less than 20 minutes by consumers with no specific home renovation or construction or mechanical skills once the location of the device is determined. Immediately upon opening the shipping packaging, a printed protective layer providing a preview of the device is preferably visible. The back of this protective layer also serves as an installation template.

The installation procedure may begin without any components other than the Client App 108 loaded on a Client Control 107 device such as tablet T or other mobile device. Using the App 108 a user can visualize what the wall and the room will look like once the device is installed. Using the camera of the Client Control 107 device, the App 108 preferably recognizes the printed pattern 2301 and can overlay a synthetic representation of a Display Device 105 on top of the picture captured by the camera in real-time to simulate the desired placement of the Display Device 105. Once locked on the pattern 2301, the camera can be moved around the room and the representation overlay is configured to maintain the right position and orientation of the simulated Display Device 105 with reference to the wall using the mobile device's built-in accelerometer and spatial referencing system. Once the correct position is located, the reference pattern 2301 can be replaced with the actual installation template 203 included in the packaging. This can be seen in FIG. 23.

The Installation Template 203 provides a full size representation of the Display Device 105. It is used on the mounting surface without having to install the Wall Mount Bracket 206 and possibly damage the mounting surface. Template 203 preferably incorporates a bubble level to ensure proper leveling, sticky points to easily attach the same to the mounting surface and make adjustments and markers to precisely determine the position of the Wall Mount Bracket 206 and its anchor points (sticky pads or screws). The Template 203 can be placed on a wall—and leveled to be exactly parallel with the floor or ceiling—and when it is removed from the wall, the markers are preferably left on the wall to direct a user as to the exact desired location of the Display Device and the Wall Mount Bracket 206. If the user needs to adjust the level to achieve the desired angle, the user can easily detach and re-attach the Template 203 on the wall without damage to the wall. Once the Template 203 is correctly located, the user can mark the wall where screws or adhesive pads will be installed (the template preferably incorporates a chalk-like substance that automatically marks the wall when pressed). The user can then peel off the central part of the template to leave an empty hole 203A that is the exact shape of the Wall mount bracket. Once the Wall Mount Bracket 206 is installed, then the user is instructed to install the Connector Cord 204 and connect it to the Power Brick 205 (without connecting the Power Brick 205 to a power outlet). The remainder of the Template can be used to guide the actual mounting of the Display Device to the Wall Mount Bracket, as the shape perfectly aligns with the edges of the Display Device to be installed. Finally, using the Exoskeleton handles 802, the Display Device 105 can be attached to the Wall Mount Bracket 206 by sliding the recessed back cover 305 of the Display Assembly 201 into the Wall Mount Bracket 206 using the guiding channels built into the back cover. The Exoskeleton 202 can then be removed to reveal the glass display screen of the Display Device 105, and it can be set aside for later relocation of the device if necessary or desired. The last step is to connect the Power Brick 205 to the power outlet to initiate the power-up sequence of the Display Device 105. The user then removes the remainder of the Installation Template 203 to complete installation.

Figure 11:
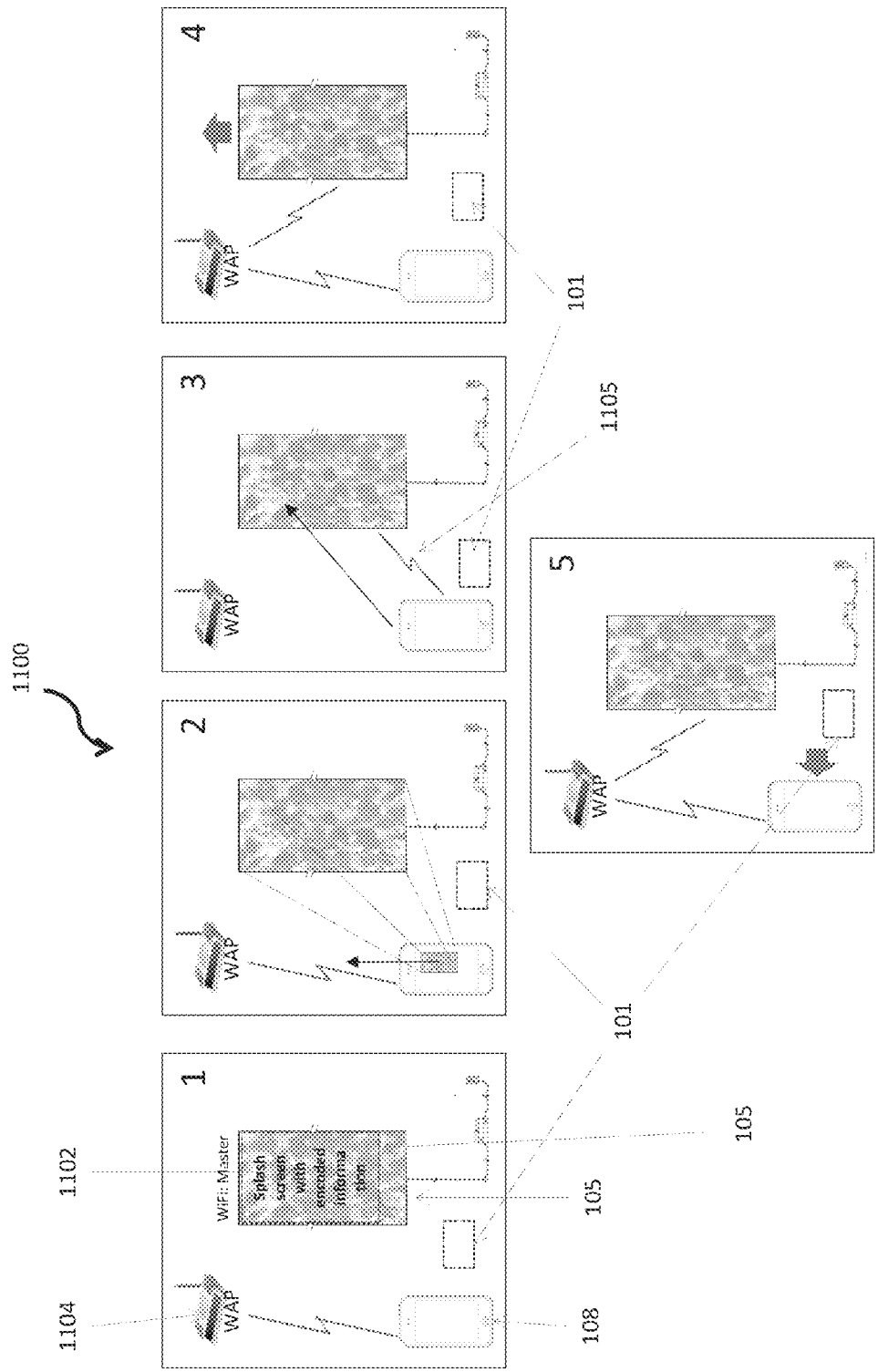
FIG. 11 illustrates an installation process of a display device with the Service Cloud of the present invention.

The preferred embodiment for installation procedure 1100 is depicted in FIG. 11. In Step 1, Display Device 105 powers up in infrastructure/master mode and displays an encoded splash screen 1102 (artistic rendering with encoded unique ID) while Mobile App 108 is connected to Service Cloud 101 through local Wireless Access Point (WAP) 1104 (or 3G/4G/LTE). In Step 2, a user takes a picture of the splash screen 1102 with Mobile App 108 and extracts an SSID of the device from information encoded in splash screen 1102; the Mobile App 108 is still communicating with Service Cloud 101 through its normal WiFi 1104 (or 3G/4G/LTE) connection. In Step 3, the Mobile App 108 switches its WiFi connection 1105 to the device and the user sets local WAP settings directly or copies the configuration from another Display Device. In Step 4, the Display Device 105 restarts in slave mode to connect to local WAP 1104, Mobile App 108 resets its connection to WAP 1104, and Display Device 105 registers with Service Cloud 101. Finally in Step 5, Mobile App 108 receives confirmation that a new Display Device 105 is fully commissioned and ready for normal operations.

As an alternative to the configuration procedure presented in FIG. 11, the Display Device may use its internal WiFi, BlueTooth, NFC, or iBeacon capability to communicate with the Client Control 107 device. After completing its power-up sequence, the Display Device 105 configures its WiFi, Bluetooth, NFC, or iBeacon wireless interface in auto-discover model (encrypted). The Mobile App 108 scans the opening pictures displayed on the Display Device 105 or the QR code printed on the packaging to extract the key information necessary to find the Display Device Bluetooth, NFC, or iBeacon signal, authenticate securely, and obtain Display Device 105 information that is validated with the Service Cloud 101. Once the Display Device 105 is authenticated, the Mobile App 108 copies its own WiFi settings to Display Device 105 through the BlueTooth, NFC, or iBeacon connection and instructs the Display Device 105 to reboot with the new WiFi configuration that will allow the Display Device 105 to connect with the local Wireless Access Point 1104. A second Display Device 105 may also auto-discover an existing Display Device 105 in close proximity upon completing its power-up sequence and communicate with this Display Device 105 to obtain its WiFi configuration, thus removing the need for manual configuration using a Client Control 107 device.

Display Processor

The iC-DPC Display Processor 510 module may also be packaged as a stand-alone unit, hereinafter called Player 2100, capable of driving a standard FullHD display through a standard HDMI port. The Player 2100 can be seen in FIGS. 21A and 21B. The Player 2100 is a stand-alone packaging of the ultra-thin iC-DPC Display Processor 510 module enclosed into the ultra-slim form factor of a flat and thin solid preferably having a maximum thickness of 7 mm. It preferably communicates with a traditional display device such as a TV or computer monitor through a standard micro-HDMI connector 2103. The Player 2100 provides a means to display visual and/or audio media content through App 108 and VSC 101 on a standard TV instead of a Display Device 105. For example, if a Gallery wants to display some digital artwork on a 105" display, then the gallery can use the Player 2100 to drive a standard 105" TV through its standard HDMI port. The Player 2100 is configured to embed the same iC-DPC Display Processor 510 electronics as the Display Device 105, thus allowing a user to connect the standard TV with VSC 101 so that the standard TV can be controlled in exactly the same way as a standard Display Device 105 would. The only difference between the use of Player 2100 with a regular TV and the use of a Display Device 105 is that the Player 2100 is an external component to a standard TV instead of the iC-DPC Display Processor 510 being embedded in the Display Device 105 itself.

The Player 2100 preferably uses a stylized LED indicator 2102 to provide status information to user. The Player 2100 preferably uses the same type of wireless connection as the iC-DPC Display Processor 510 embedded in a Display Assembly 201 to communicate with the Service Cloud 101. In addition, it preferably has the capability to embed audio along with video into the HDMI signal. The Player 2100 is preferably powered through a standard external power supply. It may also be configured to be powered through its embedded Power Over Ethernet (IEEE 802.3-2012) internal capability.

Mobile Client Application

A Mobile Client Application ("App") 108 may be compatible with one or more of the iOS, Android, Windows and other mobile platforms and is used to enable users to control and manage their entire user experience. Its functionalities can also be embedded into web pages available through a Web browser or a single-purpose tablet device. The App 108 preferably incorporates an advanced and innovative visual and interactive design to offer a highly intuitive and stylish user interface to control operations of embodiments of the Display Devices 105 embodying the present invention and enable other functions such as secure access to user account and profile information; review, monitoring, and management of owned devices; review, monitoring, and control of product subscriptions; browsing and management of purchased digital media content; browsing and management of private user media content; browsing and viewing of media content collections and catalog; purchase or subscription of products or services through a shopping cart including immediate access to a payment gateway; access to all social functions including subscribing to specific media content items, updating social network app status, sharing comments, and more; adapt and push selected media content (purchased, subscribed or private) to specific devices; and ingesting private user media content (selecting one's own still images or video, normalizing to set viewing standards, adapting to the viewing experience of the present invention, and uploading to the Service Cloud 101 or private cloud storage). In fact, the App 108 is the user interface of the Display Device 105 which allows users to control all aspects of its operations.

All communications between App 108 and Display Device 105 are preferably routed through the Service Cloud 101 to enforce a strong security framework except for the very limited use cases when a direct Bluetooth, NFC, or iBeacon connection can be established between the Display Device 105 and the Client Control device 107 running the Mobile Client App 108. The App 108 is configured to communicate with the service cloud over public or private Internet. In turn the Service Cloud 101 is configured to send requests and content to, and receive information from, the Display Devices 105 of the present invention. The communication link is a generally wireless one, through a local network, the connection to which is managed by the smart mobile device 107 hosting the App 108, but generally proceeds by allowing the selection of the SSID of a local WiFi network and entering of a security key, if required. Alternately the smart mobile device can communicate over its cellular data communication interface.

A single Client Control 107 and App 108 are preferably adapted to remotely control several Display Devices 105, whether the Display Devices 105 are in the same room or across the world. The App is designed to control each Display Device 105 separately or coordinate the actions of several Display Devices 105 synchronously, to coordinate a spatial arrangement of Display Devices 105 where a single digital media content item can be displayed across several Display Devices. The user experience of the present invention is aimed to deliver a pure interactive experience where all complexity is handled by the system to leave the user with a simple and highly intuitive user interface. The primary function of the App 108 is to control the operations of the Display Device 105; the App 108 is designed to bridge the separation between the two devices and make them behave as one highly intuitive and coordinated system.

The App's user interface is based on a structured tiling layout where a user can visually group digital media content items (including Apps) and slide a thumbnail representation of the content item to an abstract user interface representation of the selected Display Device 105. All content management functions can be implemented using this intuitive paradigm. Due to the geometric arrangement of the various elements of the user interface, the user can intuitively select and drag content items to mimic the gesture of "pushing" the content item to a Display Device 105 that is physically in front of, or in some way connected to, the Client Control 107. A similar gesture can be used to remove images from a Display Device 105 which have been placed thereon by a user. In the preferred embodiment of the present invention, all images can be uploaded to and removed from Display Devices 105 by means of the App 108 by using a simple drag-and-drop configuration on the Client Control 107 through the App's user interface. A user can thus drag an image to a digital representation of a specific Display Device 105 on their App 108 to display an image, and drag the image away from the Display Device 105 representation to remove the image therefrom and place it back in the content library. In another embodiment, App 108 can also be provided with an erase function, by which an image can be removed from a Display Device merely by waiving App 108 (on the Client Control 107) in front of a Display Device displaying an image. This will preferably remove the image from the Display Device and place the image back into the content library, in the same manner as the drag-and-drop configuration. The user interface interaction model is designed to manage all types of media content—still images, motion images, interactive images and app images—in the same way regardless of their type of interaction, installation complexity, or operations controls.

Similarly—and unlike traditional applications—the execution of an app image is controlled by the App 108 with the simple gesture of drag-and-dropping the App Image icon to a Display Device 105. The App 108 software is configured to detect the drag-and-drop gesture and to send a command to the VSC 101 to instruct the selected Display Device 105 to download the App Image, install it, and have it ready for execution. This background process may actually cause a slight delay in the appearance of the app-driven image on the Display Device 105 because of the time required for that process. Preferably, the App 108 interface can display an interim image for the brief time during which this process is occurring.

The App 108 allows users to create an account, manage account profile, settings and payment information, set usage preference, and review usage and payment history. Each owner of one or many Display Devices 105 has a Customer account. Each user has a separate User account that can be linked to the same Customer account. All User accounts of the same Customer account are able to share access and control of a common pool of devices or digital media content. One of these User accounts is preferably designated as primary and controls specific access privileges for all User accounts linked to this Customer account. There are different types of Customer accounts based on the type of commercial activities that they can perform within the Content Service Cloud 1218 community: selling content, buying content, buying and subscribing to content, reselling content, ingesting original content or simply viewing content. Finally one or several Display Devices 105 are linked to a Customer account along with all digital media content items purchased or subscribed by this Customer account.

The App 108 enables authorized users to configure devices linked to the same Customer account. Users can define their profile (name and location), privacy settings (access list, visibility), content restrictions (type of content, notification) and operation settings such as sleep time, audio delay, brightness offset, and maintenance rules and periods.

The App 108 enables a properly authenticated user to install and provision a Display Device 105 linked to a Customer account. Each Display Device 105 can be linked to a Customer account using its unique identification number. This number is preferably encoded in the image displayed by the device during its start-up procedure and captured by the App 108 through the camera of Client Control 107.

The App 108 enables authorized users to control operations of a Display Device 105 that is linked to the same Customer account. Users can load or remove digital media content, review storage usage, mirror content from another authorized device, set the digital frame and mat rules, activate/disable playlists, adjust brightness, contrast and color saturation of specific digital media content items on a specific device or control backlighting intensity, pixel hoping, reboot to factory settings, reset network interface or display status. The App 108 also provides access to support and maintenance to enable functions such as browsing knowledge base, chat with a customer support agent, reporting a defective device or service malfunction, or restoring a backup configuration to a new device.

The App 108 allows authorized users to manage content that is owned or subscribed to by the Customer account taking into consideration limitations defined by the primary User account owner. Each Customer account has a master content library that contains references to content items which are owned (i.e., digital media content, frames, mats, and playlist) or subscribed to (content channel) by the account. Using the same user interface paradigm as described for controlling operations of the present invention, users can browse, review metadata, preview, and push to the device any content item that is referenced in the account master content library. In addition, a user can add or remove any content item (purchased or subscribed) from a Display Device and create or modify Favorites, playlists or a configuration made of specific digital media content items paired with specific frames, mats, and playlist items. Subscribed digital media content is presented in the form of content channels, i.e., a large number of digital media content items grouped under a common theme and available for display on any device linked to a Customer account for a limited period of time. Finally, users can organize content items in folders or browse by age, viewing frequency, type, viewing locations, etc.

If an image is desired to be pulled from the Internet and displayed on a Display Device 105, upon its selection on the App 108, VCSC 1218 will preferably determine whether that image has been cached on the Display Device 105 previously and instantaneously download and display the selected image on a desired Display Device 105 if it was not cached. The image will then be stored in the content library 1408 on VCSC 1218 for future use. Any time thereafter that a user wishes to re-display that image, it can be selected on App 108 from the content library and drag-and-dropped to the digital representation of a desired Display Device on the App 108 for display thereon.

The App 108 enables authorized users to acquire content items (including App Images) or subscribe to a content channel. Its intuitive user interface preferably allows users to browse content catalogs and collections by keywords, pricing parameters, theme, type, ranking, recommendations and emotional attributes, view metadata of content items, preview watermarked content in the App's viewer or, for a short period of time, on the device and complete a one-time transaction to purchase content items using payment information linked to the Customer account. Through this process, a user can acquire ownership rights of digital media content (Still Images, Motion Images, Interactive Images and App Images), frames, mats, and playlist items. For playlist purchase, in addition to previous functions, the App 108 also allows user to preview the entire playlist with play controls and watermarked content and preferably automatically generates a list of digital media content items that are missing from customer's own content library to have the complete playlist. Similarly, a user can acquire limited duration viewing rights for the content included in the content channel through a recurring payment model. Finally, the user interface provides access to commercial terms and conditions of transactions, transaction history and order status.

Under certain pre-determined conditions, the App 108 preferably allows certain categories of authorized customers to sell digital media content that was either previously acquired through the Service Cloud 101 or newly added to its own catalog. Typically, resale of digital media content is controlled by the terms of ownership that explicitly determine whether a content item can be resold and the commercial terms that are applicable. A limited number of customer Account types preferably have the privilege to sell content. Once content is fully ingested and made available for sale, the App 108 allows customers to monitor and control the selling process including defining commercial metadata, terms, conditions and pricing, reviewing and accepting or rejecting offers and completing the commercial transaction.

The App 108 also enables authorized users to manage their social user experience. It allows users to send, receive and reject friend requests, post status automatically or manually on the internal social network or externally to third party social networks, publish like/dislike, reviews and comments of content managed by the cloud service, make suggestions and recommendations and create or participate in discussion groups and blogs that are open to the entire online cloud community or limited to a private sub-community. User can also trade playlists or join authoring groups that are jointly and dynamically creating shared playlists. All such content can be displayed on a Display Device 105.

Users can also use the App 108 to import their own private user content 2204, display it on their Display Device 105, and share it among the Service Cloud 101 community. The user interface guides the user through an automated workflow with gates and checkpoints that allow the user to control the quality and specifications of the media content item that will be stored in the Service Cloud 101. First, it allows a user to select a private picture or video content item 2201, in a wide variety of format, from local storage or a third party cloud service. Then, it triggers the upload 2206 & 2207 of the selected content to the Service Cloud 101 where it is preferably normalized, adapted to internal standards and converted to mezzanine format. Finally, a user can make color saturation, brightness and contrast adjustments, and preview 2210 in full resolution on device, add metadata and set share attributes. Once the content is stored in the user's private library 1408, the user can browse, organize, edit viewing preferences, push to any authorized device, or delete. The App 108 also allows authorized user to send, accept or decline a share request to/from another user that is part of its social network, modify sharing attributes, review sharing history and trace, review viewing history or withdraw sharing privileges.

Additionally, the App 108 is configured to hide all security and rights permissions for the Display Devices 105 to which it is connected through VSC 101. Thus, a user can send an image directly from App 108 on his Client Control 107 directly to a Display Device 105—whether their own or one for which he has previously been granted access—without any intermediate steps from a third party intermediary granting rights to do so—or without requiring the interface of a third party intermediary. Previously, a user would require such a third party intermediary, such as Facebook, Instagram, a text message, or other device to send an image to another. The present invention aims to overcome this issue.

The App 108 is designed to allow extensions to be added automatically when App Images are installed the iC-DPC Display Processor 510. These extensions are specific to each App Images. They are preferably encapsulated into the VEAL adapter 1221 that delivers all required resources including Access Control, Management and Control, Content Delivery and Security. The VEAL adapter 1221 allows App 108 Extensions to communicate securely with its external Service Cloud 1216 or 1217 through its corresponding Virtual Environment 1223 hosted within the Service Cloud 101. Extensions are additional user interface elements which can be loaded onto the App 108 for display on the Display Device 105. For example, if a user loads a NetFlix app on the Display Device, the App 108 can have additional user interface elements to allow the user to control the NetFlix app (e.g., select a movie). These new user interface elements can preferably be grouped together under a NetFlix panel as an "extension" of the user interface.

Figure 10:
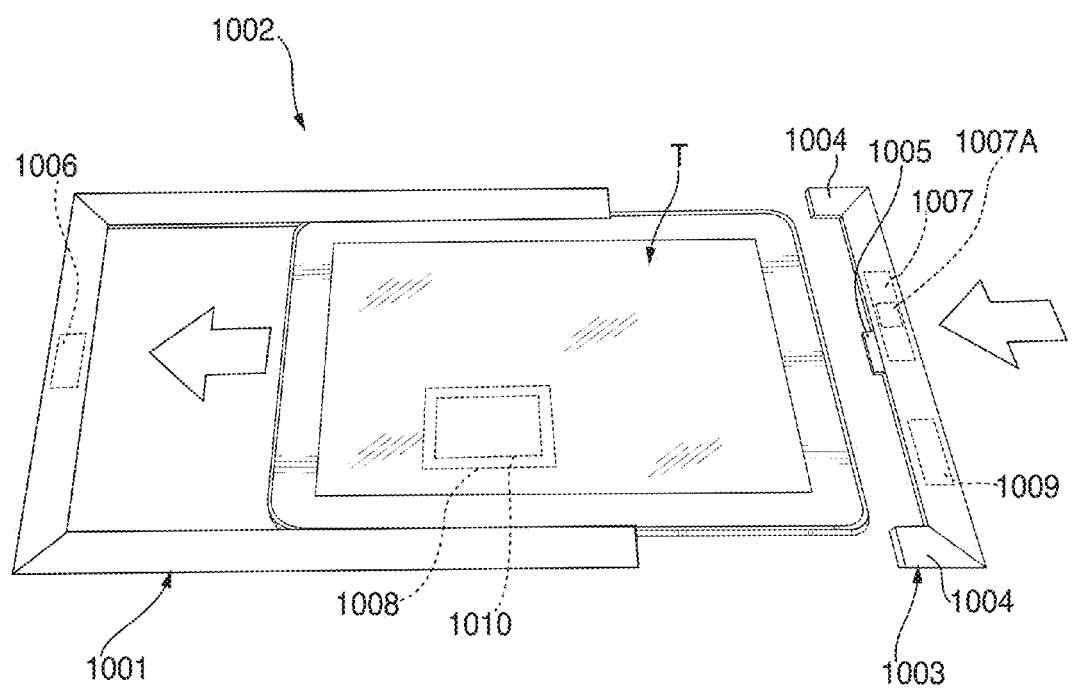
FIG. 10 is a front perspective view of a frame designed for a display device of the present invention and more specifically for use with a mobile device.

Shown in FIG. 10, Active Frame 1002 is provided for standard mobile device (for example, tablets, iPads, Kindles, Iconias, PadPhones, Transformer Pads, Galaxy Notes, Nexuses, Xperias, Excites), hereinafter collectively referred to as "tablet T." The Active Frame for a tablet device is preferably made of two mechanical components configured to connect around the perimeter of a mobile device. In the preferred embodiment of the present invention, the two mechanical components comprise: (1) a U-shape frame 1001 with a rail that allows a standard tablet T to slide therein and (2) a straight fourth side of the frame 1003 that matches the design of the U-shape frame assembly 1001. The fourth side has a locking mechanism 1004 at each end to lock it in place and create a solid frame around the tablet. The fourth side incorporates a male connector 1005 that will be inserted into the female connector of the tablet when the fourth side is locked in place. Different sized Active Frame for tablets preferably match the exact specifications of different types of tablet devices T. The frame preferably aesthetically enhances the viewing experience of digital art, posters, decorations and other visual and/or audio content and may allow a standard tablet to stand nearly upright on a horizontal surface or be mounted on a vertical surface using a simple anchoring system 1006 similar to traditional frame mounting mechanism 903. Other variations of the configuration of the Active Frame 1002 are also envisioned.

This Active Frame 1002 preferably functions to lock a standard mobile tablet to allow it to function solely as a device disclosed by the present invention, thus preventing the tablet from being used for any other purposes than viewing digital media content. Prior to inserting the tablet T into the Active Frame 1002, the user must load an app 1010 (shown schematically) on the tablet T to enable the tablet to operate in a way that is similar to the Display Device 105 of the present invention. Once inserted in the Active Frame 1002, the electronics, discussed below, embedded in the Active Frame can send a signal through the tablet connector to inform the tablet operating system to allow only the application of the present invention to run while connected to the Active Frame. Detaching the frame side that is connected to the tablet connector port 1005 will restore the tablet to its normal operations. Once locked, the tablet and frame assembly communicates with the VSC 101 through the tablet WiFi interface and can be controlled like other Display Devices 105. The Active Frame 1002 preferably draws power from the tablet T when connected through its connector port 1005, but preferably also comes with its own external power supply to power the active frame and the tablet. In another embodiment, Active Frame 1002 comprises a communication device which is configured to communicate with the tablet T through radio, including Bluetooth, WiFi, NFC, or iBeacon.

The Active Frame 1002 contains a processor 1009, media storage 1007 to store digital media content securely, separately from the tablet's own storage 1008 and secured registers 1007A where the frame unique identifier and security keys are stored. This information is used to encrypt, encode and slice digital media content in a way that is similar to the security sub-system of the iC-DPC Display Processor 510.

Internet Cloud Infrastructure

Figure 12A:
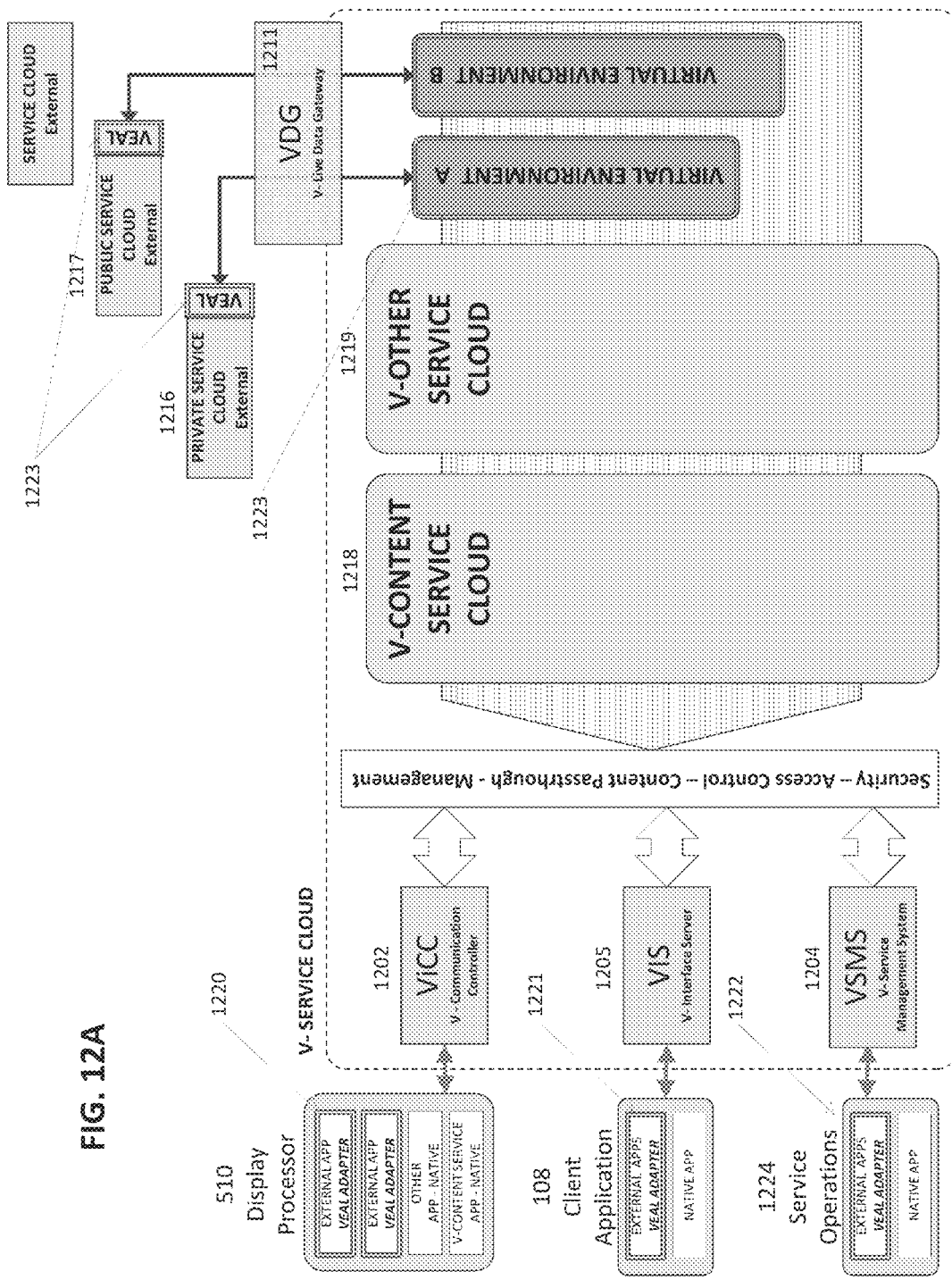
FIG. 12A is a block diagram illustrating the general architecture and key components of the Service Cloud of the present invention.

FIG. 12A is a block diagram that illustrates the functional components of the V-Service Cloud 101 that delivers a fully virtualized environment to deliver content and services to iC-DPC Display Processor 510 (embedded in the Display Device 105 and Player 2100), the Client Control 107, Mobile App 108, and Service Operations Management applications 1224. These content and services are primarily managed and delivered through native service clouds entirely hosted and operated within the V-Service Cloud 101. Other services are managed by the V-Service Cloud 101 resources and delivered from other service clouds external to the V-Service Cloud 101; these external service clouds can be private 1216 or public 1217. Content and service originating from external service clouds 1216 or 1217 uses the V-Live Data Gateway 1211 and its Virtual Environment Abstraction Layer (VEAL) 1223 to communicate content and controls to App Images 1220 running in the iC-DC Display Processor 510, Client Control 107 user interface extensions 1221, and extensions to System Operations Management applications 1222.

Native service clouds have direct access to all resources of the V-Service Cloud 101 to deliver maximum performance. The main native service cloud is the V-Content Service Cloud 1218 that is designed to deliver visual and/or audio content to the Display Device 105 under user Client Control 107 and managed by Service Operations Management Application 1224. Other native service clouds 1219 are also deployed to deliver services such as enterprise visual communications and digital signage.

V-Live Data Gateway (VDG)

The V-Live Data Gateway (VDG) 1211 provides a Virtual Environment Abstraction Layer (VEAL) 1223 to allow external service clouds 1216 or 1217 to deliver their services to Display Devices 105 and the App 108 running on Client Control 107 within the V-Service Cloud 101 environment. VEAL 1223 follows a three-tier model where the top tier is a standardized and structured layer attached to the external service cloud 1216, allowing the external service cloud 1216 to securely communicate with a second tier made of a corresponding Virtual Environment 1223 within the Service Cloud 101 that directly controls interaction with a third tier which is a VEAL interface attached to the corresponding app 1220 installed on the Display Processor 510 and controlled through a corresponding extension 1221 of the Client Control 107. The top tier, i.e., the external standardized layer, communicating with the second tier Virtual Environment 1223, is structured in four elements: content, security, access control, and management, with each element being specific to each external cloud service 1216 or 1217. In addition to acting as a secure proxy routing data from the external service cloud 1216 or 1217 to and from the Display Processor 510 and the Client Control 107, the external service Virtual Environment 1223 splits controls from content allowing each one to be routed to and from a different device. By opposition to traditional cloud services (for example a video on demand service) which combines user controls and content viewing on the same device (e.g., a TV), the external service Virtual Environment 1223 allows controls to be routed to and from the Client Control 107 and content to be simultaneously routed to the Display Device 105. The external service Virtual Environment 1223 also performs deep data filtering to prevent any malware from reaching the Display Device 105 and other management functions allowing both the external service cloud 1216 or 1217 and the Service Cloud 101 to keep track of activity history and other usage and commercial metrics.

In simpler situations where data is simply sent from an external source to the Display Device 105 Display Processor 510, the VDG 1211 acts as a data concentrator to securely route data from an external service cloud 1216 or 1217 to create an App Image 1220. VDG 1211 uses connectors to receive live RSS, XML or URL data feeds and make them available to App Images 1220 running on registered Display Devices 105. VSDK 1604, which will be discussed in further detail, allows developers to create new connectors and/or register their Apps to connected live data feeds. VDG 1211 also incorporates a security filtering mechanism to make sure that live data feeds do not carry any harmful data.

A specific application of VDG 1211 and VEAL 1223 is to enable over-the-top ("OTT") capability for the Display Devices 105 of the present invention by creating an OTT Virtual Environment 1223 that acts as a secure proxy for external service clouds and aggregates their content to be sent to the corresponding VEAL-wrapped App Image 1220 running on Display Processor 510 and managed (e.g., by login credential) and controlled (e.g., by feed selection) through a Client Control 107 and a corresponding "VEAL-wrapped" extension 1221. Thus, a user with a single Display Device 105 can use the multi-image layout capability of the iC-DPC Display Processor 510 to aggregate several types of App Images 1220 driven by their corresponding Virtual Environment 1223 (for example, a movie feed, a video game feed, or Skype chat feed), so that all images can be displayed separately and yet simultaneously and concurrently on the same Display Device 105 using a preset display layout and under control of specific Client Control 107 user interface extensions 1221. This can include any combination of still images, motion images, interactive images, or app images. The OTT aggregation capability can be utilized for digital art, poster and decor images, for social networking, for gaming, or even for television broadcast or on-demand or other MSO or OTT content.

Using the split relationship between the App 108 and a Display Device 105, a user can log into his/her own web service account—i.e., social network, media streaming, etc.—on the Client Control 107 and direct the output to be displayed on a select Display Device 105 by simply pushing the visual representation of the web service to the selected Display Device 105 without the need for a third party intermediary.

While the preferred embodiment of the present invention discloses the display of digital art, it is also envisioned that the Display Device 105, App 108, and VSC 101 of the present invention are configured for the transmission and display of other digital content such as decorations, posters, internet streaming of television or movies, video games, social media, video chatting, social networking, MSO, or OTT visual and/or audio content or even the display of Applications normally accessed on a mobile device.

V-Communication Controller (ViCC)

The V-Communication Controller (ViCC) 1202 preferably maintains communication with all active Display Devices 105, routes native data to and from the various native Service Clouds 1218 or 1219 and VEAL-wrapped data to and from Virtual Environments 1223, and keeps track of the operational status of all Display Devices 105 that are provisioned. Communication to and from each Display Device 105 preferably employs XMPP messages over secured IP connection for signaling a secure payload transfer protocol over secured IP connection for digital media content distribution. ViCC 1202 can keep track of the status of each device through XMPP presence status. Upon receiving a request to upload a digital media content item, ViCC 1202 can solicit a cloud Content Distribution Network (CDN) to deliver the payload to the device.

V-Interface Server (VIS)

The V-Interface Server (VIS) 1205 is a highly scalable server architecture that handles all communications between the Service Cloud 101 and the App 108 on Client Control 107 to service all functions and capabilities accessible through the user interface of App 108 on the Client Control 107. VIS 1205 routes native messages from native Service Clouds 1218 or 1219, or VEAL-wrapped messages from Virtual Environments 1223 to the App 108. VIS 1205 also routes information and data requests from the App 108 to the appropriate Service Cloud 1218 or Virtual Environment 1223. VIS 1205 enforces strict positive authentication to authenticate user and validate commands and requests.

V-Service Management System

The V-Service Management System (VSMS) 1204 is configured to collect all data reflecting operational status and performance levels of provisioned Display Devices 105, VSC 101 systems and applications, and VSC 101 itself, to generate alerts, reports and dashboards allowing a service operations team to maintain peak service performance at all time, anticipate service degradation and plan capacity. All components of the service disclosed by the present invention (Display Device 105, Mobile Client App 108, VSC 101 and its corresponding cloud systems infrastructure) preferably generate status information on a regular basis.

The instrumentation is designed with several levels of awareness that can be automatically triggered by an internal rule engine. An operator can also manually put a system or device on a watch list that will automatically trigger a higher level of awareness. Depending on the level of awareness, the instrumentation agent can send different types of information to VSMS 1204 ranging from simple heartbeat to alerts or detailed configuration reports. The remote device sending more detailed information along with the standard heartbeat is called "higher level of awareness" because the central monitoring system is now "aware" of more detailed information regarding the remote device. VSMS 1204 preferably uses a correlation engine to detect and streamline cascading conditions, link causes and effects and perform trend analysis. All data and tools are preferably accessible through secured web services allowing authorized operators to visualize information and rapidly implement corrective actions from any web-enabled device. VSMS 1204 can also automatically capture traces and log for audit, capacity planning, and training. Finally, VSMS 1204 can allow operators to plan and execute system upgrades and updates on a granular basis. It enables distribution and installation of software upgrades and updates based on model number, serial number/unique identification code, region or time zone, date of commissioning, usage pattern and according to update rules set by users. It also enables software upgrades or updates of the Service cloud and its underlying cloud infrastructure.

VSMS is designed to route all data to and from Apps Virtual Environment 1223 within the Service Cloud 101 to Service Operations Management applications 1224 that are capable of controlling and monitoring Virtual Environments 1223 and their corresponding Client Control 107 user interface extensions and Display Processor 510 Image Apps. A VEAL adapter 1220 is wrapped around the extensions 1222 to Service Operations Management applications 1224 that are required to properly manage all resources related to App Images.

Figure 12B:
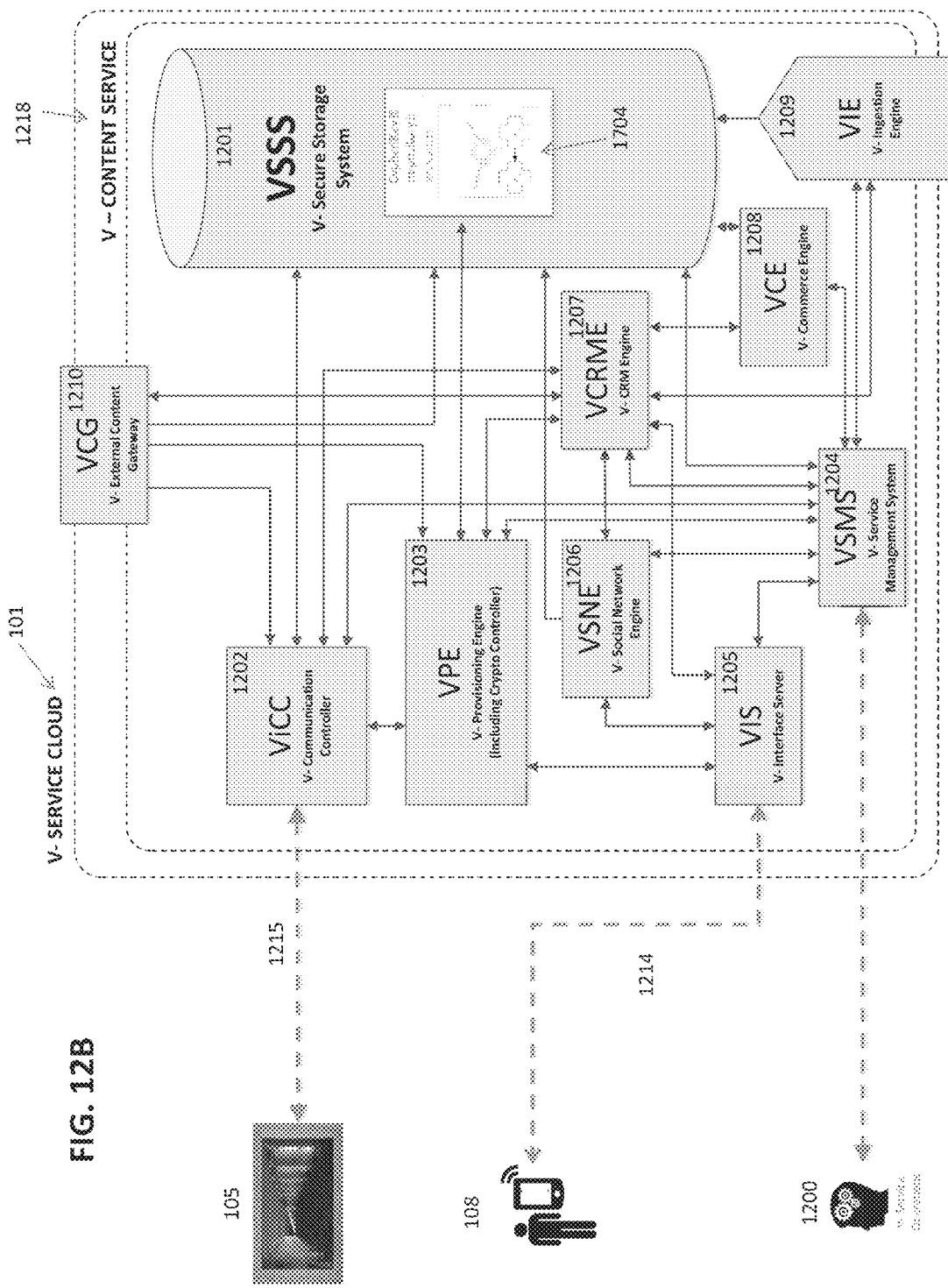
FIG. 12B is a block diagram illustrating the components of the Service Cloud of the present invention.

FIG. 12B is a block diagram that illustrates functional components of the Internet Content Service Cloud 1218, hosting a suite of cloud applications collectively referred to as the "V-Content Service Cloud" (VCSC) 1218, which operates to facilitate and support the experience of viewing digital media content on a Display Device and uses the Mobile Client Application to, among other functions, control the Service Operations 1200 of linked Display Devices 105. The VCSC 1218 may be a private cloud hosted by commercial cloud service provider that preferably guarantees 99.999% service availability and 100% data integrity and recovery, and a commercial Content Distribution Network (CDN) that preferably guarantees 99.999% content delivery. The Service Cloud 101, VCSC 1218 and CDN preferably provide a demonstrated and audited secure infrastructure framework involving, account security, network security (protection of access points and transmission), fault tolerant design, business continuity management, change management control, and physical and environmental security.

The VCSC 1218 preferably comprises a Secure Data and Media Storage System (VSSS) 1201, a Provisioning Engine (VPE) 1203, a Social Network Engine (VSNE) 1206, a Customer Relationship Management Engine (VCRME) 1207, an Advanced Commerce Engine (VCE) 1208, a Digital Media Content Ingestion Engine (VIE) 1209, and an External Content Gateway (VCG) 1210. VCSC 1218 also uses resources from the V-Service Cloud 101 to communicate with other elements of the ecosystem, such as the Communication Controller (ViCC) 1202 to control all communications with Display Devices 105 through a secured Primary Internet Connection 1215, the (user) Interface Server (VIS) 1205 to interface with the App 108 through a Secondary Internet Connection 1214, and the Service Management System (VSMS) 1204 to deliver operations control and monitoring capabilities.

The VCSC 1218 is built on a strong security framework to positively identify, authenticate and protect all user requests coming from the App 108 and all communications with Display Devices 105. Preferably all elements of all instances and representations of digital media content stored in the VCSC 1218 are fully encrypted and protected from unauthorized access through a strict and granular access control mechanism that explicitly defines access privileges for each authenticated user. Preferable performance and scalability characteristics of the VCSC 1218 may be provided by its internal secure signaling fabric using the highly extensible XMPP protocol to signal between all cloud systems, the App 108, and Display Device 105 embedded software. Using this signaling fabric, all control, command and reporting communications are routed quickly from origin to destination. Each communication instance is secured through an authentication and integrity mechanism that allows receiver to positively authenticate the source and validate the integrity of the data. Hence, in addition to using a highly secured private cloud infrastructure, preferably all communications taking place within or across this private cloud boundary are protected.

V-Secure Storage System (VSSS)

Figure 14:
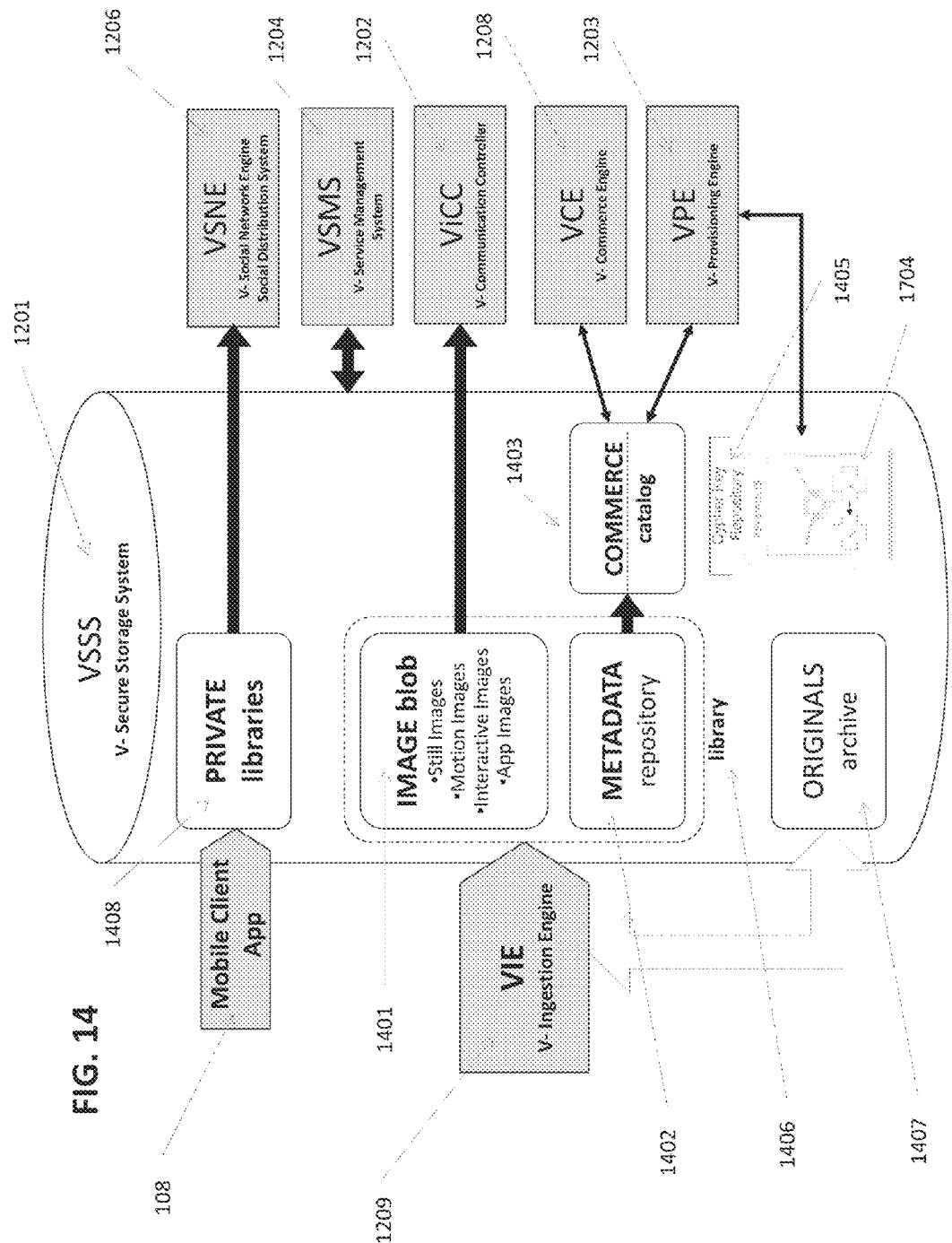
FIG. 14 discloses the internet cloud storage disclosed by the present invention.

FIG. 14 is a block diagram that illustrates some the functional components of the V-Secure Storage System (VSSS) 1201. The VSSS 1201 resides in the VCSC 1218. It stores, protects, and manages all components of information or data that is ingested through the Ingestion Engine (VIE) 1209. Through VIE 1209, an authorized user can upload its original digital media content to its VSSS' library 1406 and create related and derivative information that is also stored in VSSS 1201.

The VSSS 1201 storage architecture includes four primary storage components. The first component is a Metadata Repository 1402 which preferably uses a NOSQL database to store and index all metadata and derived non full resolution digital media representations that are ingested, captured otherwise, or automatically generated during the ingestion process including derivate media format such as thumbnails and icons. Once the decision is made to make media content items visible in the online catalog (i.e., available for browsing, searching, previewing/viewing, purchasing and subscribing), then its metadata is copied to a Commerce Catalog 1403 where is preferably accessible by VPE 1203 and VCE 1208. VPE 1203 (which will be discussed later in detail) is also adapted to access the Key Vault 1704 and its Cypher Key Repository 1405 to validate and manage digital media content requests. A second component, called the Image Blob 1401, is a highly scalable and secure flat file system storing the actual full resolution media content (Still, Motion, Interactive, and App Images) that can be distributed to a Display Device 105 in mezzanine format. A wrapper is preferably used to permit storage of all types of digital media content (Still Image, Moving Image, Interactive Image, App Image, Digital Frames and Digital Mats) using a single internal representation, thus speeding up access and transfer and facilitating security enforcement. Together the Image Blob 1401 and the Metadata Repository 1402 are called "library" 1406. The third component is the Commerce Catalog 1403 that preferably uses an SQL or other known database to store a subset of the library data that is accessible by VPE 1203 and VCE 1208 for commercial transactions. VPE 1203 uses the Key Vault 1704 and its Cypher Key Repository 1405 to validate and manage full resolution media content from the Image Blob 1401 to Display Devices 105. Finally, the fourth component is the Originals Archive 1407, which preferably uses the same data structure as the Image Blob 1401 to preserve the original digital media content representation for later retrieval and processing if needed. The Originals Archive 1407 uses a highly secured but low access speed partition of the VSSS 1201. Digital media content can be uploaded by an artist to the VCSC 1218 in whatever format was chosen by the artist. The VIE 1209 receives this file in its original format and normalizes it into the internal "mezzanine" format that is used to display all digital images on the Display Devices disclosed by the present invention. Digital media content ingested by VIE 1209 can be stored in the Image Blob 1401 in this format as well. However, there is also a need to preserve the artwork or other digital media image in its original format for later processing in a different mezzanine format—if a new format is adopted—or simply to give the assurance that original artwork can be restored in its original format. Hence the original artwork is preserved in its original format in the Originals Archive 1407 using the same interface file structure as the Image Blob 1401. A fifth component of the VSSS 1201, the user Private Libraries 1408, are used to store and manage Private User Content 2201 that is ingested in the Service Cloud 101 to be viewed on Display Devices 101 or shared with the Service Cloud community. Finally, VSMS 1204 has complete secure access to all elements of VSSS 1201 for management and system administration purpose. Critical metadata, full resolution digital media content and original digital media content can be secured using standard asymmetric cryptography whereby encryption keys are secured in a separate Key Vault 1704 hosted in a separate highly secure private cloud and managed by the Crypto Controller application 1809 running in a secure partition of the VCSC 1218. The same Key Vault 1704 also stores the Cypher Keys 1806 used to re-assemble a higher value digital content item from its particles.

V-Provisioning Engine (VPE)

The V-Provisioning Engine (VPE) 1203 delivers the core functionality for deploying, provisioning, and delivering the best digital content experience to a Display Device. VPE is a rule-based deterministic cloud software application that works with a Display Device 105 and App 108 to deliver media content items in accordance with commercial right rules and security policies governing their use. VPE 1203 also ensures that the experience guidelines defined by the author or creator of a digital media content item are strictly enforced by preventing unauthorized viewing conditions of digital media content. VPE 1203 is configured to control all aspects of distributing and viewing digital media content on a Display Device, including but not limited to:

(1) Rights: ensuring that a Display Device (and its owner) has acquired the rights to store and/or view a digital media content item at a given time and for a given location;

(2) Orientations, Sizing, and Scaling: making sure that each digital media content item is displayed in accordance with the viewing rules set by its creator, ingestion specialist or curator (display resolution, orientation detected by built-in sensor, etc.);

(3) Framing and Matting: making sure that media content is properly framed and matted to deliver the best viewing experience in accordance with the guidelines set by its creator, ingestion specialist, or curator; and (4) Interaction: ensuring proper coordination between apps and media content and preventing unauthorized apps from entering the VSC 101 and interacting with managed or protected content.

VPE 1203 can create and recommend presentation layouts in real-time to combine several digital media content items (all types) on a single Display Device 105 based on guidelines and limitations dictated by the media content author or creator, settings from users and internal provisioning rules. These layouts can be static, change over time following a specific pattern, or change over time driven by an external data source (e.g., temperature).

VPE 1203 also incorporates complete Digital Rights Management (DRM) 1304 capability to manage rights to access, load, and view each digital media content item registered with the VCSC 1218. VPE's DRM capability strictly limits the number of instances of a digital media content item that can be distributed or viewed at any given time. VPE's DRM 1304 use stenographical watermark (invisible) to keep an unbreakable trace of all V-managed digital media content items. The DRM 1304 is preferably used to create, manage and deliver a digital Certification of Authenticity that replaces the traditional COA that is common in the art world. The DRM 1304 preferably provides an unbroken chain of ownership and location from initial content ingestion to current ownership and active location is maintained and can be consulted at any time through the App 108. This digital COA provides authorized users with specific details about a specific digital media content item like identity of people or organizations involved in production or creation, location and time of release (production completion), exact name of the item, exact dimensions, resolution color depth and other representation attributes, name and qualifications of the individual who ingested and authenticated the item, and reference sites, books or other resources that contain related information about the item. Digital COAs are preferably encrypted and locked to current owner.

V-Social Network Engine (VSNE)

The V-Social Network Engine (VSNE) 1206 enables all social networking functions accessible through the App 108 user interface both internal and external to the VSC 101. In addition, VSNE 1206 provides a suite of tools to control and manage all aspects of social networking activities. It can keep a detailed trace of all activities for audit, trend and cohort analysis and detection. It can also provide granular control to selectively activate, disable or filter any social networking functions for any item or group of items in the commercial catalog. Also, it has the capability to monitor all social networking channels to detect keywords or combination of keywords and automatically send alerts, post a reply or quarantine information.

As can be seen in FIG. 22, a key component of VSNE 1206 is its Social Distribution System 1206A that enables a user to upload private pictures and videos 2201 to a private library 1408 in VSSS 1201 and provides such Private User Content (PUC) 2204 for sharing and viewing in a secure manner under strict control of the user. To ensure security, unprocessed private content 2201 is preferably two-key encrypted, encoded and normalized before it is uploaded to the Service Cloud 101. Private content owner PCO retrieves a private key 2205 to encrypt both the full resolution PUC 2206 and its lower resolution watermarked preview version 2207. The encryption key exchange is preferably managed through a Third Party Crypto Key Management Service 2202 to ensure that encryption keys preferably never touch the Service Cloud 101 un-encrypted thus denying the Service Cloud 101 from ever decoding PUC 2206 or 2207 without the explicit contribution of the owner PCO.

Once fully ingested and stored in the private user library 1408, VSNE 1206 enables sharing of PUC 1206 or 1207 with other users. Upon positively accepting the receipt of a shared PUC item, the recipient preferably obtains a key pointer directly from the PUC item owner and retrieves its private key 2203 directly from the Third Party Crypto Key Management Service 2202 to preview a watermarked version of the PUC 2208 without ever touching the Service Cloud 101. The same mechanism is preferably used to send the full resolution version of PUC 2209 to the Display Device 105. Once delivered to the recipient, the PUC is preferably managed by recipient like any other digital media content item. However shared PUC viewing and re-sharing rights are preferably defined by the PUC owner, encoded in the PUC Ingestion 2204, and preferably automatically enforced by Social Distribution System 1206A of VSNE 1206. These rights define distribution and viewing conditions such as time period for which the private content is available, the type of device on which the content can be viewed, and redistribution limitations. PUC owner can also cancel viewing and/or re-sharing right collectively or individually at any time. The combination of encryption keys managed by a third party service and encoded sharing constraints limits and restricts distribution of PUC within the social network.

V-CRM Engine (VCRME)

The V-CRM Engine (VCRME) 1207 is a highly secure cloud application that keeps track of all information pertaining to customers and users, registered devices and partners. For customers and users, VCRME 1207 is adapted to keep track of all account information such as name, contact information, usage history, relationships to other customers and users, usage preferences, content and ownership and accessibility and access credentials. VCRME 1207 also keeps track of all registered Display Devices 105, their relationships to customer accounts and authentication information. Finally VCRME 1207 preferably also manages all data allowing partners, including gallerists, independent artists and content suppliers, to access resources, content and devices according to their access privileges.

V-Commerce Engine (VCE)

The V-Commerce Engine (VCE) 1208 preferably enables the entire transaction cycle allowing users to sell, buy or loan digital media content that is managed by the cloud service. VCE 1208 facilitates browsing and search for digital media content items through traditional keyword search and an analog tag search engine that identifies content items by a series of tags that have a value of 1 to 100 thus allowing a user to incorporate less tangible nuances in its search criteria. VCE 1208 works with payment gateways to settle the transaction and ensure that proper payment is completed either through an automated credit card transaction or manual invoicing and reconciliation. VCE 1208 also enforces commercial transaction rules by ensuring that royalties and commissions are registered and all parties are properly notified and credited or debited. Finally VCE 1208 is preferably configured to enforce digital rights of ownership and consuming (viewing) by ensuring, as a minimum:

1) Ownership: ensuring that ownership is properly transferred and recorded and ownership history is properly updated;

2) Uniqueness and Viewing Rights: ensuring that distribution rules such as number of authorized copies, concurrent viewing and duration of viewing set by the originator of the content are enforced;

3) Trading rights: ensuring that trading rules determining whether a digital media content item can be resold, pricing and other commercial terms and conditions are strictly enforced; and 4) Protection: managing mechanisms that protect the authenticity and uniqueness of all digital media content items and trace potential unauthorized access and enforces visible watermarking of all media content that is displayed in the App, and secure transfer, storage, and traceability of all digital media content that is distributed to a Display Device.

V-Digital Media Content Ingestion Engine (VIE)

Figure 15:
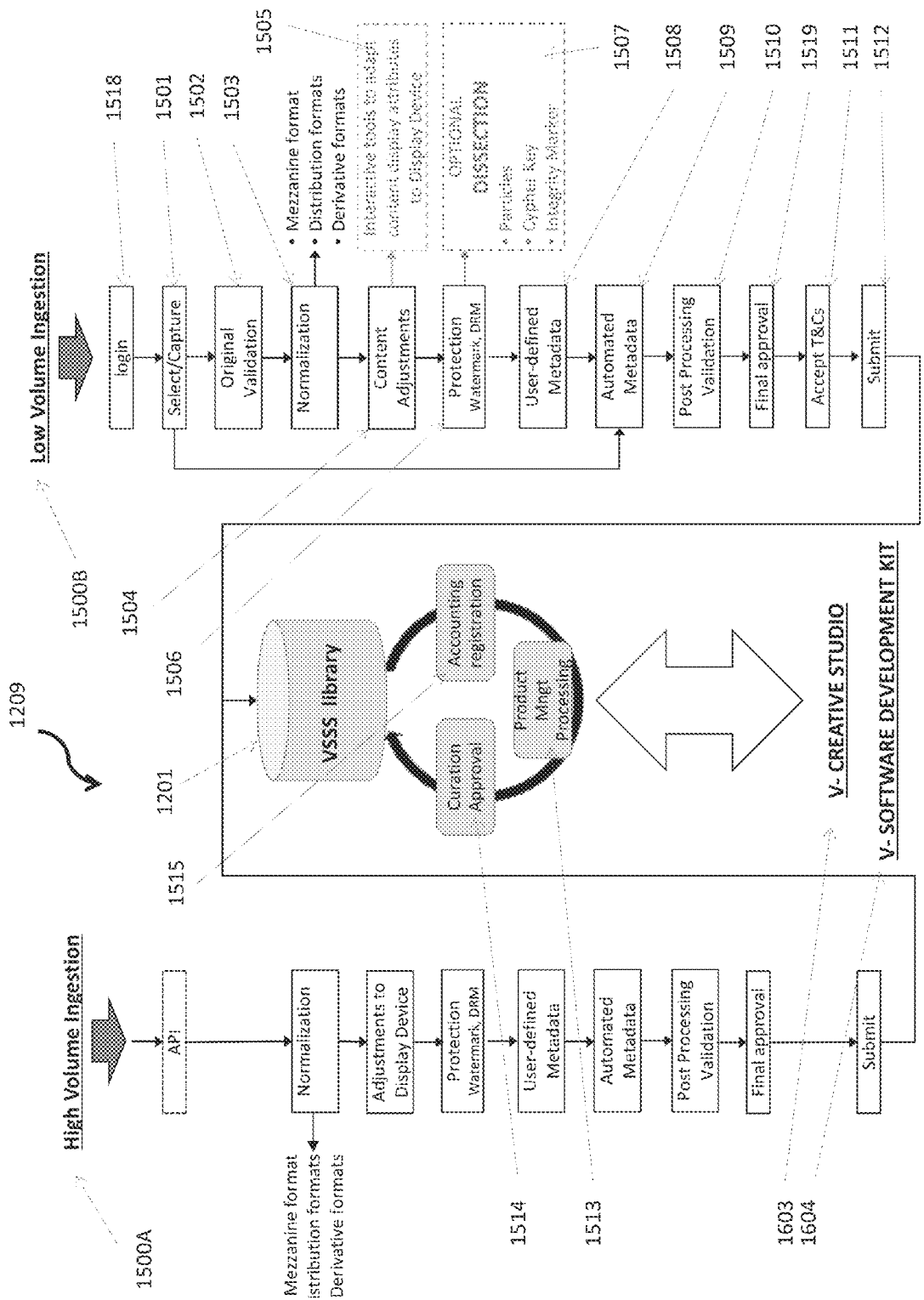
FIG. 15 is a flowchart depicting the ingestion workflow of still images and motion images to the Service Cloud storage presented by the present invention.
Figure 16:
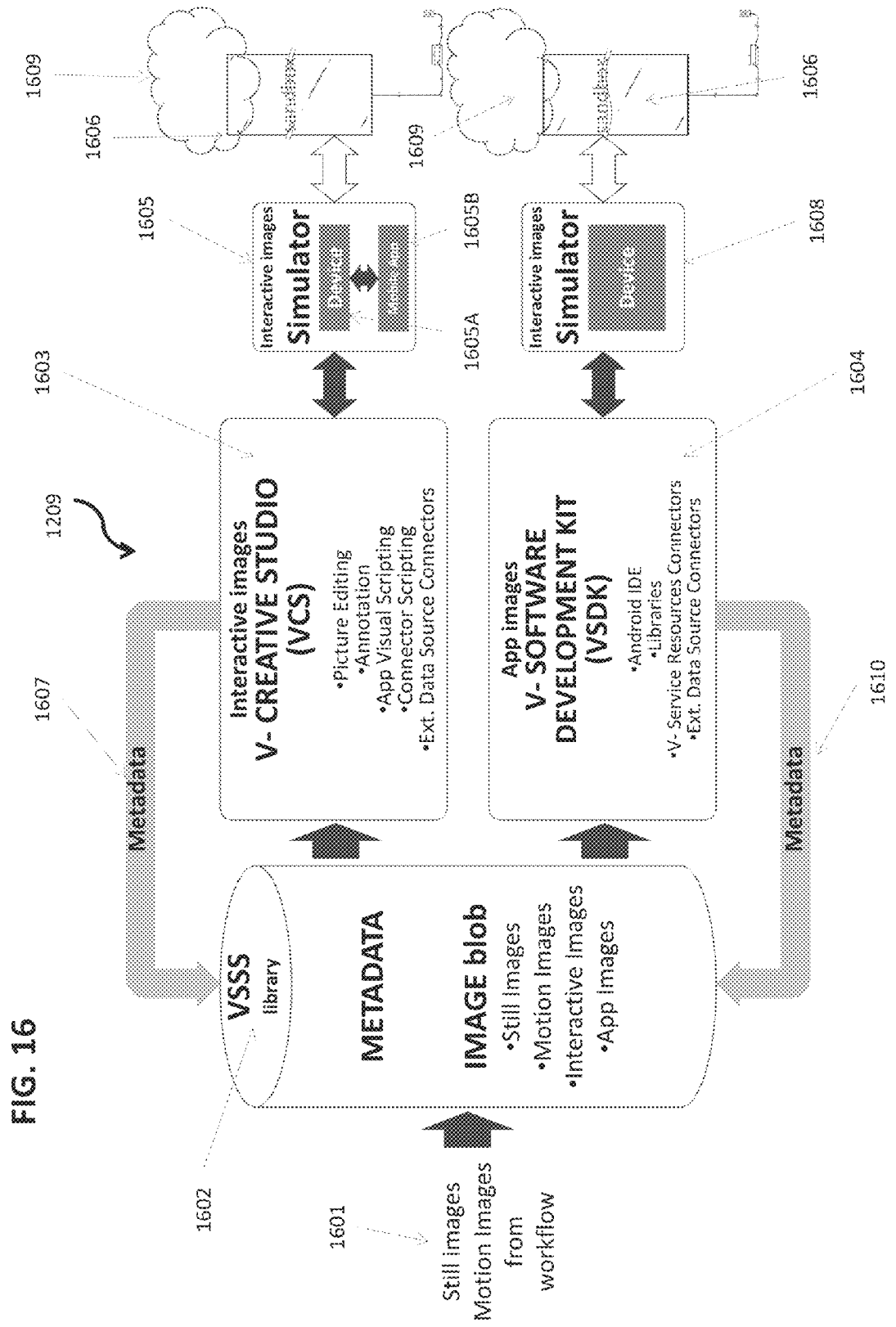
FIG. 16 is a flowchart depicting the creation and storage of interactive and app driven images in the Service Cloud presented by the present invention.

As seen in FIGS. 15 and 16, the V-Digital Media Content Ingestion Engine (VIE) 1209 is an automated workflow engine configured to control importation and adaptation of digital media content of all types (Still Images, Motion Images, Interactive Images, and App Images) into the library 1602 of the V-Secure Storage System (VSSS) 1201. Depending on the type and volume of content to import, VIE 1209 offers two primary mechanisms: web user interface driven import tools for low volume ingest 1500B and an XML-based API for high volume ingest 1500A. VIE 1209 can also provide a user interface to allow an ingestion specialist to complete origination, curation, commercial and technical metadata as well as metadata that is specifically used by the search engine. Finally, VIE 1209 can provide access to a suite of visual editing tools to modify the way a digital media content item is displayed on embodiments of the Display Device of the present invention. Using these tools, an authorized user can interactively adjust contrast, default brightness, color saturation and black/white levels while watching the impact of these changes on a device display in real-time. All data derived from ingested content or created during the ingestion process can preferably be stored in the VSSS 1201. During this process, a number of validation gates are created to allow various authorities to approve artistic, curation, technical and commercial information.

The Ingestion Workflow of the present invention, seen in FIG. 15, preferably uses unique algorithms to maximize the appearance (audio and video) value of content being viewed on a Display Device. It analyses the visual and/or audio content to identify critical viewing elements and optimum sightline, and makes adjustments (such as cropping, scaling, or altering of images, including color enhancement and translation/rotation) to maximize the viewing experience. Each modification can preferably be undone, and a sequential list of recent modifications is preferably available, linked to the media content and saved on the Service Cloud 101.

VIE 1209 provides a web-based interactive authoring tool to support creation of Interactive Images. Using these tools, an authorized user can create Interactive Images by importing Still and Motion Images from a library and adding interactivity using a series of pre-defined interactivity profiles. Each profile defines the trigger and Image reaction. Triggers can be time based, driven from an external data feed or driven from an interactive app that reacts to the presence of an Image. Image reaction can change any aspect of the image or trigger a change in the interactive app. The interactive authoring tool also provides a simulator to test the Interactive Image. Once completed, metadata can be created and validated and the Interactive Image is packaged and stored in a VSSS library 1602.

Using Still and Motion Images 1601 stored in VSSS library 1602, a creator can use the V-Creative Studio (VCS) 1603 and V-Software Development Kit (VSDK) 1604 to create or modify Interactive Images and App Images respectively. The VCS 1603 provides an integrated user interface to access a suite of tools including an (1) interactive visual editor, (2) an annotation and text editing tool, (3) a visual scripting user interface for the interactive Image mobile app, (4) a visual scripting user interface to create new connectors with Display Devices or external data sources and, (5) a toolbox of existing external data source connectors.

The interactive visual editor provides a highly intuitive user interface to select, import and modify still and motion Images, import or create and edit graphics elements, create static and dynamic layouts and collages including overlays and transparencies and synchronize all visual and/or audio elements with external data sources using connectors. The annotation and text editing tool provides a powerful suite of tools to create, morph, and animate visual text elements. The resulting visual and/or audio elements can be used on a Display Device 105 or within the Interactive Image App 1605B depending of the type of interactivity that is required. Interactive Image App 1605B can be added on to the App 108—or be packaged as separate apps linked to the main control App 108—to allow a user to interact with and control interactive images on a Display Device 105. Using one of the default Interactive Image App containers as foundation, the visual scripting tool allows a user to rapidly create scripts using a close derivate of JavaScript adapted to the context of Interactive Images; the script controls the interaction and synchronization between the mobile app and the visual and/or audio content displayed on a Display Device. Finally the same visual script editor can also be used to create new connectors or modify existing connectors from the VSSS library 1602 to bind external data sources and events with the Interactive Image mobile App and related visual content. An Interactive Image Simulator 1605 allows interactive image creators to troubleshoot their Interactive Image creation before performing final tests on a real Display Devices 105 in sandbox mode 1606. "Sandbox Mode" refers to staging a software system in an environment that closely mimics the real production environment for pre-production readiness texting. It is between the product development testing environment and actual production environment. In the context of the present invention, the Sandbox Mode 1606 refers to one or several Display Devices 105 that are connected to a "pre-production" test cloud (sandbox cloud) 1609 to test it in a real environment without the risk of corrupting the actual Service Cloud 101. This "sandbox" cloud 1609 preferably assists with evaluating and, possibly, troubleshooting readiness issues, and can preferably be used to collect information on the interactive or app Image and make sure that meets all of the release criteria. Finally, a creator is asked to provide the metadata 1607 required to complete the registration of a new Interactive Image media content item to VSSS library 1602.

The VSDK 1604 provides similar capabilities for the creation of App Images. The VSDK 1604 includes (1) a complete Android IDE with specific resource libraries, (2) a suite of connectors to handle Display Device 105 resources and (3) a suite of connectors to handle external data sources. As for the VCS 1603, the IDE of the VSDK 1604 allows developer to create or modify existing connectors. VSDK 1604 also incorporates an App simulator 1608 and a sandbox where a real Display Device is tightly linked to VSDK 1604 for rapid evolution and troubleshooting iterations. Finally VSDK 1604 is requested to provide metadata 1610 before a new App Image is stored in VSSS library 1602.

VIE 1209 provides access to the VSDK 1604 to allow App Image creators to develop and test their App Images. VSDK 1604 is largely based on a commercial Android IDE whose libraries and other resources have been modified to limit access to iC-DPC resources only. Additional libraries are also made available to access VCSC 1218 resources including "live data feed" connections.

As seen in FIG. 15, VCSC 1218 incorporates an automated workflow for ingesting digital media content, adapting the content to internal standards, and securely saving it in designated storage space in the Service Cloud. The workflow preferably accepts most standardized media formats commonly in use. The adaptation process normalizes the content to facilitate access by various functions of the Mobile Client App 108 and Display Devices 105, such as browsing or downloading. The workflow preferably provides content creators and ingestion specialists with checkpoints to ensure the quality of the normalized content and traceability to approval authorities.

VIE 1209 preferably supports two types of ingestion process: Low Volume Ingestion 1500B, using an interactive web interface, and High Volume Ingestion 1500A using an XML-based API. After initial access control login 1518, the web interface allows the user to select one or several media files 1501 in a wide range of standard formats to upload to the VIE system where it is queued. All media files are encrypted at the source, before being uploaded and queued in the VCSC 1218. Captured content is first validated 1502 to detect format or content defects and malware and obtain content confirmation from the owner. Then validated original content can be normalized 1503 to create a number of derivatives representations (e.g., thumbnail) and transcoded to internal mezzanine format and distribution format for full resolution display on a Display Device. Mezzanine and distribution content is adjusted 1504 for calibrated white, black, and color saturation value to provide a consistent viewing experience across all Display Device viewing, including aspect ratio, orientation, size, and scale are adjusted to deliver a consistent viewing experience. Artists also have access to interactive tools 1505 that allow them to make final adjustment directly on the Display Device. All ingested media content is protected 1506: lesser resolution media content representations are preferably watermarked while full resolution mezzanine media content is protected through the process of dissecting content into particles 1507 presented in FIG. 17.

All ingested content is managed by a digital rights management system which controls access and keeps a persistent ownership trace of each commercial digital media content item that is ingested into the VCSC 1218 through encoding, encryption and bi-univocal linkage between a content instance, a customer account, and a Display Device. The digital right management system also provides strictly controlled tools to modify and revoke credentials and securely remove all imprints of selected digital media content. VIE 1209 captures and creates a large quantity of metadata to properly describe and index ingested content. Some metadata is captured directly from the ingested file 1501, while other used-defined metadata 1508 is specifically requested.

VIE 1209 can preferably also automatically detect and create metadata 1509 related to the technical specifications of the ingested media content item (e.g., size, resolution, aspect ratio). Once all metadata is created, then VIE 1209 performs a complete consistency and validation scan 1510 before submitting all data for final user approval 1519. User can pause and resume the ingestion workflow at any time without any loss of information.

The final step before submission 1512 of all data to VSSS 1201 is to ask user to accept legal terms and conditions 1511. Digital media content stored in VSSS 1201 can be regularly accessed and modified or augmented by various specialists to perform product management 1513, curation 1514 and accounting 1515 tasks. Content and metadata stored in VSSS 1201 is also accessed by VCS 1603 and VSDK 1604 to create and modify Interactive and App Images.

High Volume Ingestion 1500A is initially captured through an XML-based API to allow for high volume and high speed ingestion directly from content suppliers' own content repository. This ingestion workflow is similar to the Low Volume Ingestion 1500B with the exception of human intervention steps (original validation and interactive adjustment) until final validation in order to streamline the automated ingestion process.

V-External Content Gateway (VCG)

The V-External Content Gateway (VCG) 1210 enables near real-time transfer of authorized digital media content from an origination point outside of the VSC 101 to a Display Device. Under proper commercial arrangement with an external digital media content catalog, a user could browse and purchase a media content item that is not ingested in the Service Cloud and push it to a Display Device in near real-time. VCG 1210 is preferably pre-configured to gain access to the external catalog and process the media content item. By opposition to other digital media content that is managed by the Service Cloud, external media content items are stored in the user library and fully protected by the digital right management system.

Content Service Cloud Architecture.

Figure 13A:
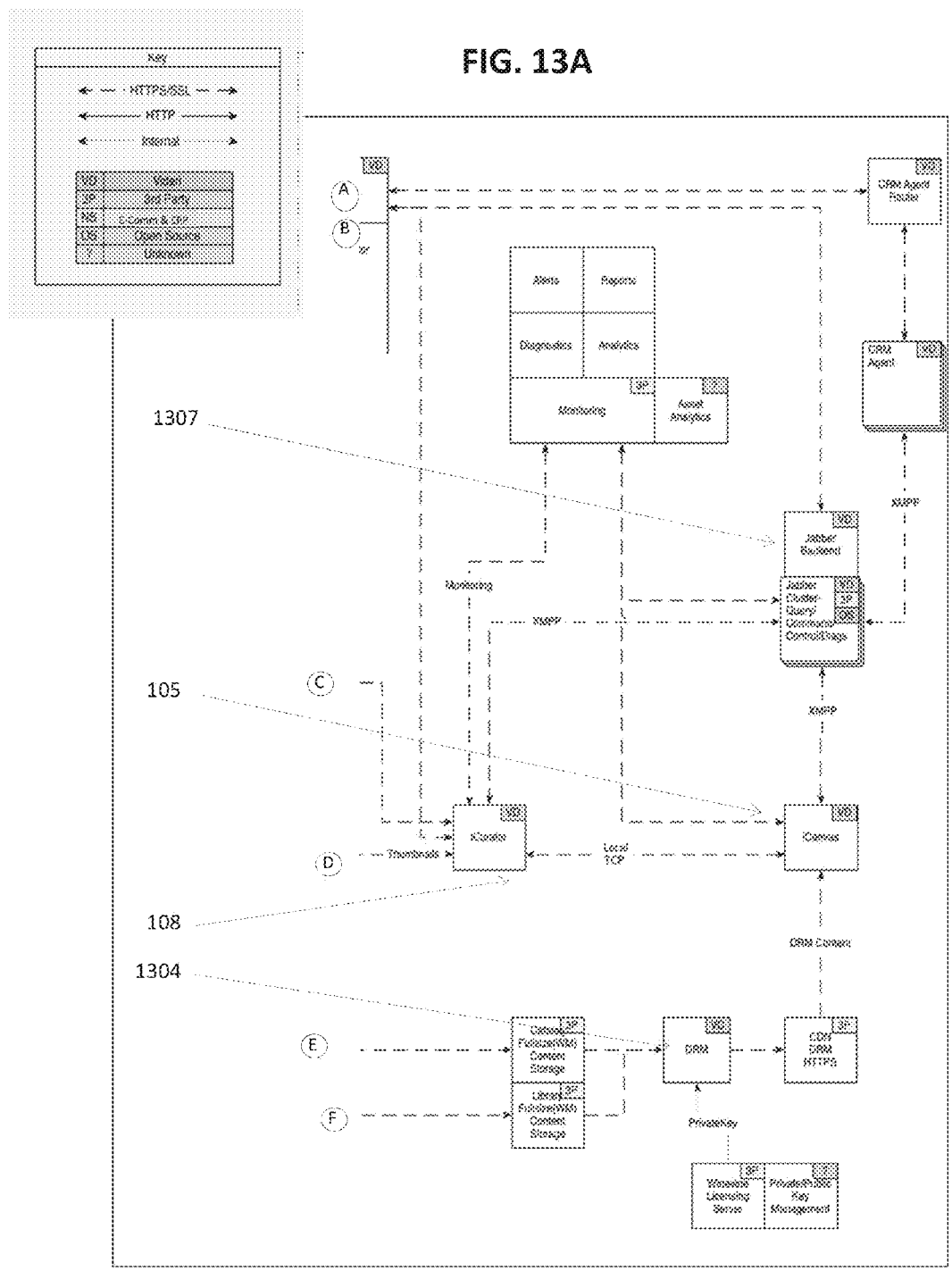
FIG. 13A is a first portion of a block diagram of the detailed architecture of the system of the present invention.
Figure 13B:
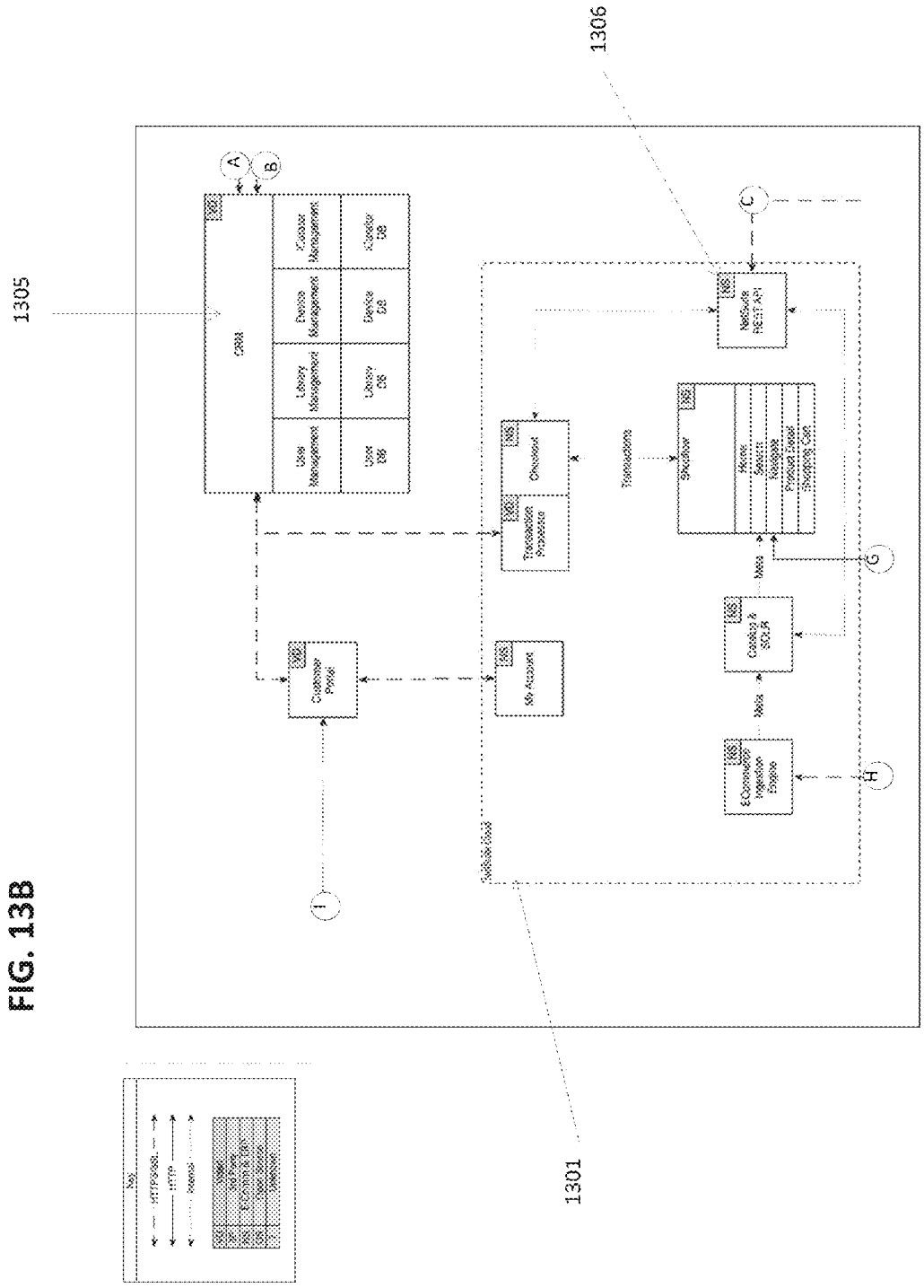
FIG. 13B is a second portion of a block diagram of the detailed architecture of the system of the present invention.
Figure 13C:
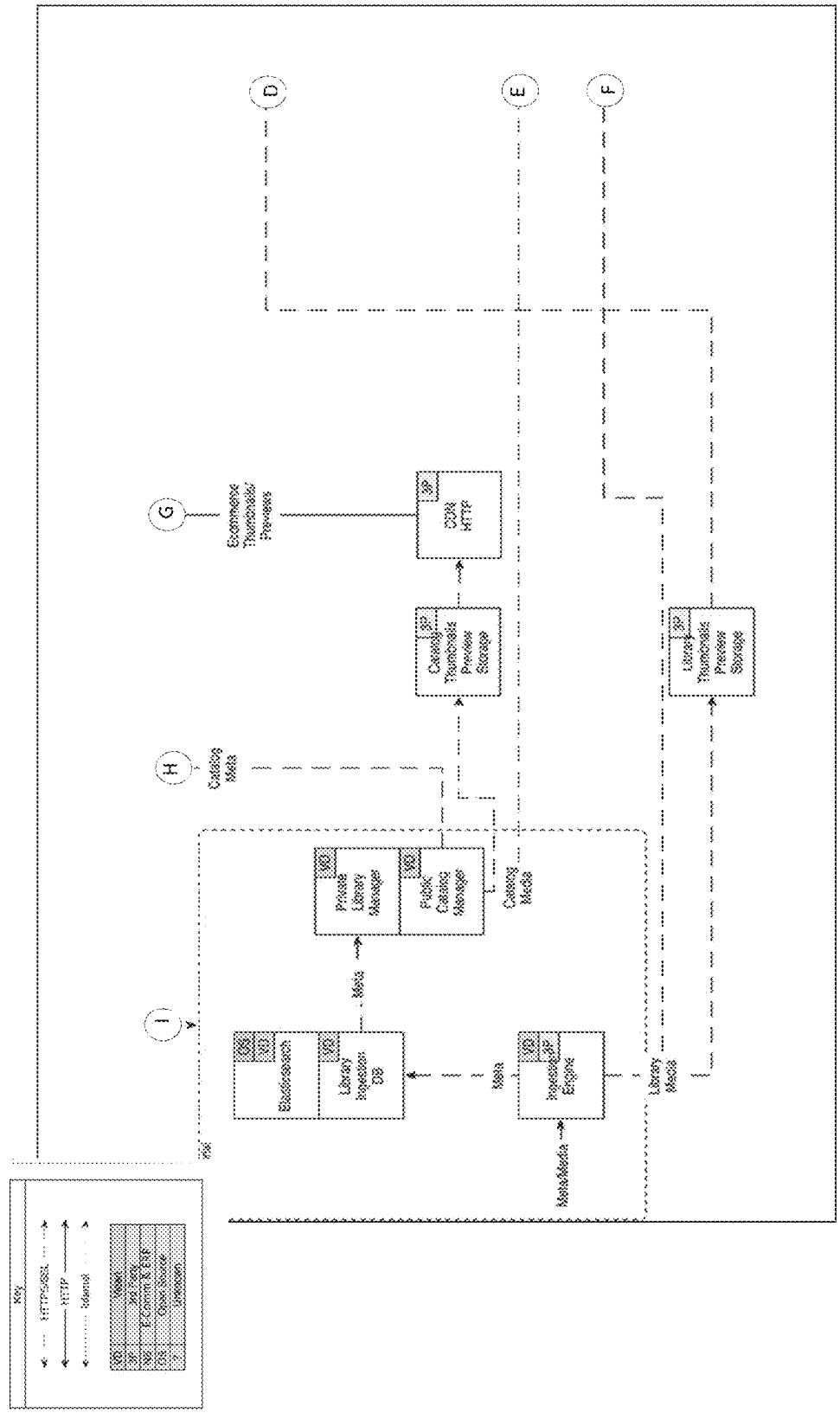
FIG. 13C is a third portion of a block diagram of the detailed architecture of the system of the present invention.

Shown in FIGS. 13A, 13B, and 13C, the Content Service Cloud 1218 uses a combination of storage mechanisms to ensure quick access to data, protect all data and deliver peak performance at all scales. The dashed lines represent communication done between cloud components and endpoints done via SSL; dotted lines represent communication done internally within the cloud; and solid lines represent non-secure http. Additionally, FIGS. 13A, 13B, and 13C are provided with letter labels A-I corresponding to the communication lines connecting the components of each of these Figures together and how the components of each Figure interact with components of the other Figures. Each of the FIGS. 13A, 13B, and 13C represents one of three components of the architecture of the Content Service Cloud 1218 of the present invention.

With an expected growth to millions of assets, a cloud preferably combines highly scalable server capacity and secured storage. Great synergy, performance, and security are preferably achieved by having servers and storage in the same cloud. As a result, scaling horizontally is as easy as adding a server to the cluster. This database is also closely integrated with a full text search engine that can handle full text searching of metadata of millions of assets. The CRM 1305 is a series of http service-based apps with each service having one focus which can keep track of all users, assets, devices, and controllers. Each service will follow the same scalability, security, and access model. With an http load balancer on the front and a cluster of backend virtualized server instances handling individual requests. By keeping the CRM 1305 within the cloud, the core architecture is independent of a third party SaaS e-commerce engine 1301. The App 108 preferably provides a native e-commerce user interface by using a third party SaaS application REST API 1306 which allows App 108 to browse the product catalog and complete the entire purchases cycle. An XMPP protocol is preferably used for communication between App 108 and Display Device 105, which delivers blazingly fast, highly scalable, and secure performance in near real-time. XMPP Servers 1307 ("Jabber Backend") are clusterable to handle scaling, and TLS is supported out of the box. Middleware handles communications between the Cloud CRM 1301 and endpoints (Display Device 105 and App 108). This middleware routes messages from the CRM 1305 (HTTP) and translates to XMPP for delivery to the endpoint (App 108/Display Device 105). For securing digital media content, an industry standard DRM solution 1304 is preferably used to provide hardware based decryption libraries for the iC-DPC crypto core and the ability to perform encryption in VCSC 1218.

Protection of Higher Value Digital Content

Systems and methods exist to deliver a complete solution for durable and secure commerce of higher value digital content that require further protection. Systems and methods are provided that aim to guarantee the value of higher value digital content, which includes limited edition, high value digital posters, paintings, photos, videos, decorations and other visual and/or audio content (including MSO, broadcast, and content); and by extension any digital document, through durability, uniqueness and authenticity, integrity, privacy, and traceability.

Higher value digital content 1810 may be managed, ensured to be durable, authenticated and protected through various mechanisms, including preferably by: (1) using Cypher Keys 1806 to encode the instructions to re-assemble dissected higher value digital content particles 1507; (2) ensuring that content-ready-for-display is identical to reference content through a series of integrity markers 1803; and (3) slicing each particle 1507 of the dissected higher value digital content 1810 into "n" slices 1802 that are dispersed across various storage locations in the Service Cloud 101 using dispersed storage, such that the each particle of higher value digital content 1810 can be recovered using "m" slices out of "n" where n>m.

Figure 17:
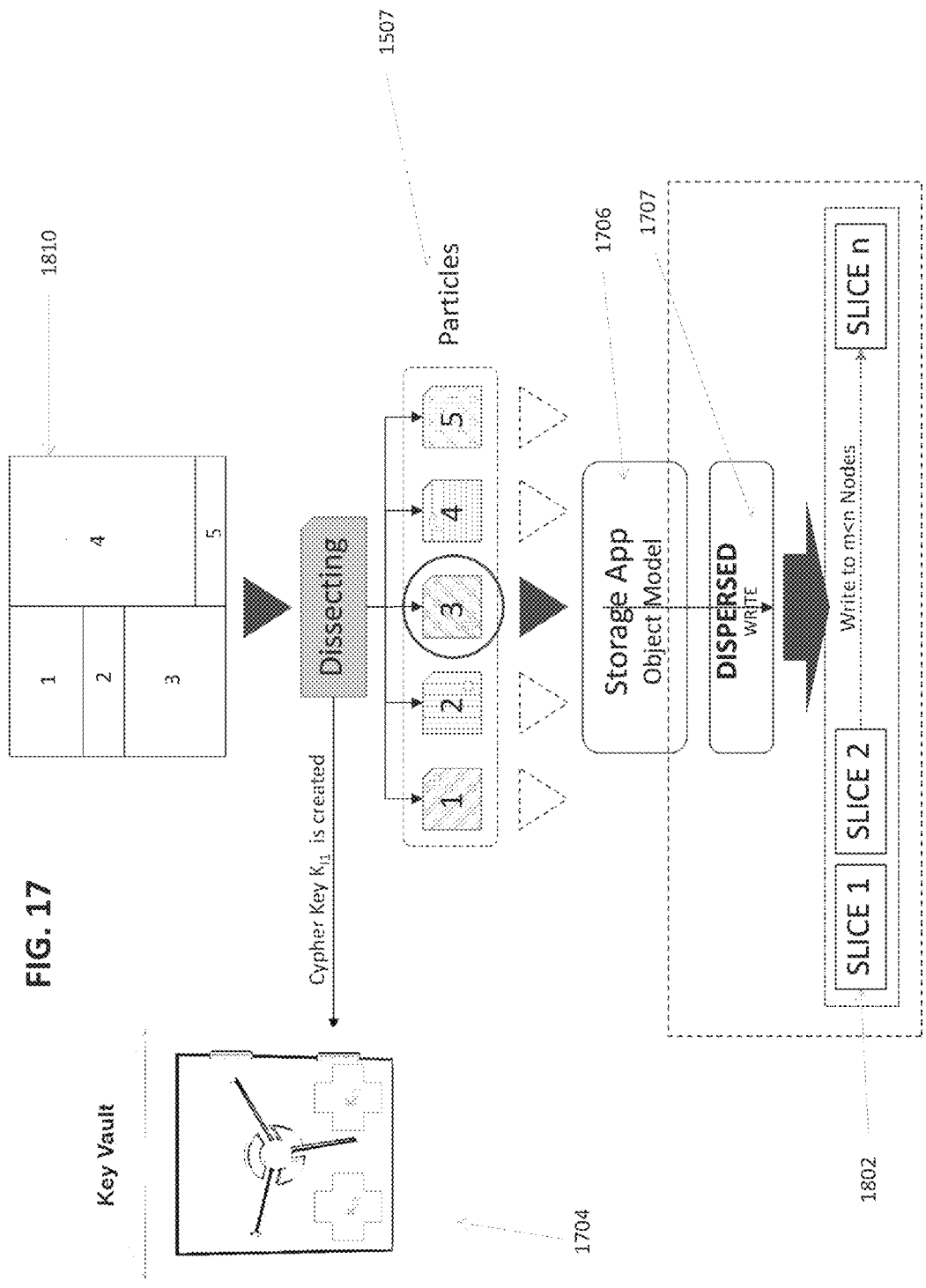
FIG. 17 depicts the means for stronger secure—i.e., a higher level content protection than first level content storage security and protection system depicted in FIG. 7—storage of information disclosed by the present invention by means of dissecting content therein.

FIG. 17 is a block diagram that illustrates the process of ingesting higher value digital content 1810 and dissecting the same for secure encryption and storage. A higher value digital content item 1810 can be analyzed and instantaneously dissected in the VCSC 1218 into "p" particles 1507 while a Cypher Key $K_{f1}$ is created and stored in the secured Key Vault 1704 and its Cypher Key Repository 1405, located in a secure partition of the VCSC 1218. Each particle 1507 preferably incorporates a unique Integrity Marker 1803 that is used to authenticate and validate the integrity of the particle 1507 during its lifecycle. Each particle is then preferably pushed to a Storage App 1706 using a dispersed storage model 1707. Each particle can then be sliced into "n" slices 1802, wherein n>1, that are dispersed across specific locations of the Service Cloud 101. This provides two separate and distinct levels of protection for a piece of higher value digital content 1810. The particles 1507 then preferably require the Cypher Key 1806 for re-assembly of the higher value digital content 1810 from a plurality of slices 1802.

Figure 18:
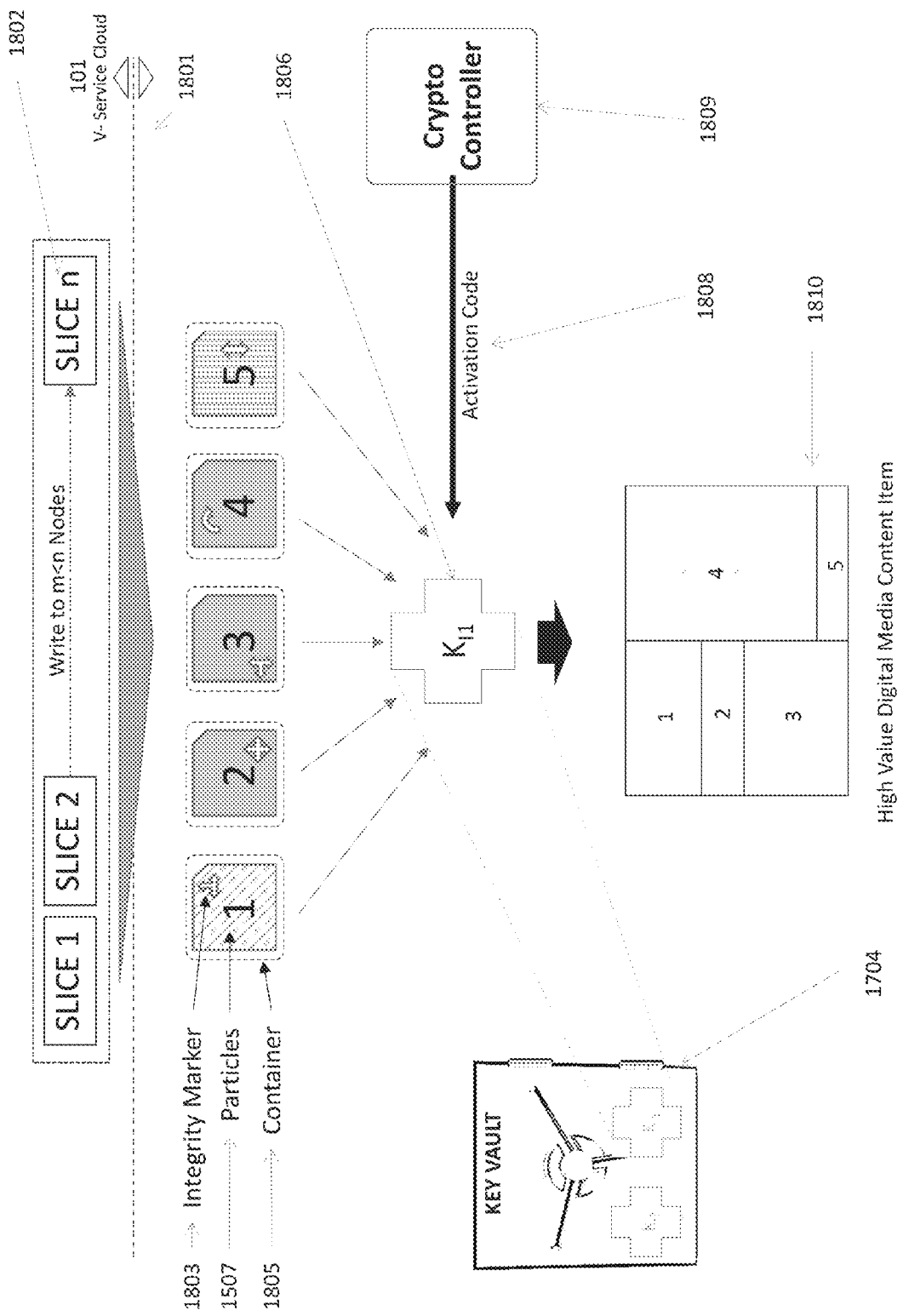
FIG. 18 is a depiction of the secure process disclosed by the present invention for the re-assembly of securely stored information which was encrypted and separated in the process depicted in FIG. 17.

FIG. 18 is a block diagram that illustrates the operations of a Cypher Key for re-assembly of digital content from content particles 1507. The Cypher Key 1806 will be described in further detail shortly. Upon Request 1801 from a Display Device 105 to display a High Value Digital Content item, ViCC 1202, working with the Crypto Controller 1809, pulls slices 1802 stored in dispersed storage in the VCSC 1218 and sends them to a Display Device where particles 1507 are re-assembled and stored in separate secure containers 1805 on the Display Device. Particles' integrity and authenticity can be validated by comparing their integrity marker 1803 with reference markers. At display time, the High Value Digital Content item can be re-constructed from its slices 1802 and particles 1507 using the Cypher Key 1806 pulled from the Key Vault 1704 and activated using the activation code 1808 provided in real-time by the Crypto-Controller 1809. The same process takes place each time the High Value Digital Content item is displayed on a Display Device and preferably occurs almost instantaneously so that there is preferably almost no lag time between a user dragging-and-dropping an image on his Client Control 107 into a representation of a Display Device and that item's appearance on the corresponding Display Device.

The Crypto Controller 1809 is also part of the VPE 1209. The Crypto Controller 1809 is designed as a secured application running in a secured portion of the VCSC 1218 to handle Cypher Key 1806 requests from the various devices. It preferably authenticates the device requesting access to a Cypher Key 1806 using its unique identification code and registration information and manages the primary and recovery Cypher Keys attached to each High Value Digital Content item. The Crypto Controller 1809 also manages pre-formatted files stored in the Key Vault 1704 as well as the asymmetric encryption keys used throughout the system.

From the moment the original content is ingested into the VCSC 1218 until it is viewed on a Display Device, higher value digital content 1810 is dissected into "n" distinct particles that are secured separately during the ingestion process until they are re-assembled on a Display Device using the proper Cypher Key 1806. The number of particles 1507 is a function of the size and morphology of the original higher value digital content 1810. A single file of higher value digital content 1810 is preferably dissected in no less than 5 particles, each of preferably no more than 200 KB. Multiple files of higher value digital content are preferably sliced in no less than "m"×3 particles of preferably no more than 200 KB, where "m" is the number of files. The slicing process ensures that each resulting slice is meaningless by itself and does not represent a legible portion of the higher value digital content 1810.

During the dissection process, an encoded reference marker is introduced in each particle and referenced by the Cypher Key 1806 to re-assemble a complete display representation of a higher value digital content in clear on a Display Device. Preferably, a Cypher Key 1806 is a compact and encrypted hexadecimal sequence describing (1) the method for reassembling content particles, (2) the minimum number of particles required to have a complete reassembly, and (3) the type of cyphering used to protect each particle. Each Cypher Key 1806 is unique and its encoding changes with each key generation. The ingestion process generates as many unique Cypher Keys as there are authorized copies or instances of higher value digital content 1810. For example, if a still picture is to be distributed in 300 copies, then 300 unique Cypher Keys are generated. Each Cypher Key 1806 is preferably uniquely encoded and encrypted to be traceable to its original at any time.

Cypher Keys are initially stored in a Key Vault 1704 that is stored in a secured partition of the Secured Storage System (VSSS) 1201 until the acquirer of a higher value digital content 1810 item downloads the content to its registered device and "consumes" an original Cypher Key. At this point a Recovery Key $K_{r2}$ is generated in case the Display Device is destroyed and there is a need to create a clone. The Recovery Key $K_{r2}$ can be left in the Key Vault 1704 or moved to a new storage location. Content Keys are stored separately from the particles and are encrypted.

Once an original Cypher Key is consumed and downloaded to a device, it is re-encoded with the unique identification of the targeted device to ensure that the higher value digital content 1810 item is now securely locked and traceable to that device. The Cypher Key 1806 is used by the iC-DPC 500 to request a number of particles that is sufficient to re-assemble a complete display representation of the higher value digital content item. Each content particle 1804 can be stored in an encoded and encrypted container 1805 that is uniquely tied to a single device to ensure that the higher value digital content 1810 item is now securely locked and traceable to that device. These containers 1805 cannot be opened in an environment that does not authenticate the hosting device correctly. Containers 1805 preferably incorporate an obfuscation algorithm to completely remove all traces of itself and its content if tempering is detected.

Once a higher value digital content 1810 item is re-assembled on a device, a series of checks is performed periodically to ensure that the display representation is identical in all aspects to the original resulting from the ingestion process. This process is performed using a series of Integrity Markers 1803 that were created during the ingestion process to authenticate the re-assembled display representation of the content item and ensure that its data representation is identical to the referenced original.

Access to higher value digital content 1810 is ensured for long periods of time (preferably in excess of 75 years) through a combination of physical storage location, physical storage technology, logical storage dispersion and software application preventing degradation of digital content integrity through digital erosion (or digital rotting). Each content particle is (1) sliced into "n" slices that are stored using a dispersed object model such that each particle can be recovered using "m" slices out of "n" where n>m; (2) each slice being stored on a physical device leveraging SSD technology and low level bit-rotting prevention technology; (3) SSDs installed at different locations selected for their extreme business continuity capabilities, (4) the dispersed storage management system continuously evaluating the state of each slice to detect bit corruption or rotting and re-creating corrupted or decaying data as needed the information if needed; and (5) the dispersed storage management system continuously monitoring slices and storage devices to optimize slice distribution and preservation.

One or several higher value digital content 1810 items may be displayed on one or several Display Devices 105 linked to the same Customer account owning the content. The App's intuitive user interface hides the complexity of setting up a Display Device to display higher value digital content item(s). Several uses are supported: (1) Single device displaying one higher value digital content item; (2) Multiple devices displaying a single higher value digital content item; (3) Single Device displaying multiple higher value digital content items; and (4) Change of Ownership of higher value digital content.

Single Device Displaying One Higher Value Digital Content Item

The following is an example of the process executed to configure the device to display the higher value digital content once a device ($D_1$) is granted access to a specific instance of a higher value digital content item ($I_1$):

(1) The Crypto Controller 1809 initiates download of the Cypher Key $K_{f1}$ from the Key Vault 1704 that is part of the V-Provisioning Engine (VPE) 1203 to the device $D_1$—the Crypto Controller is a dedicated sub-system to oversee the protection, provisioning, storage, privacy, maintenance, and control of higher value digital content. It is partially "opened," re-encoded with the unique identification of the device, and kept in its Key Vault to lock $I_1$ to the $D_1$ permanently, thereby creating Media Content item $I_{1D1}$.

(2) $K_{f1}$ is deleted from the Key Vault.

(3) Before the Cypher Key is downloaded, a Recovery Key ($K_{f2}$) is generated and activated. It is stored at a location to be dictated by the profile of the customer account owning the higher value digital content instance (default is a separate partition of the Key Vault).

(4) The Display Device uses the information contained in $K_{f1}$ to download required $I_1$ slices.

(5) Once higher value digital content slices are securely stored on $D_1$ then $D_1$ receives the Activation Code 1808 from the Crypto Controller 1809 to complete its Cypher Key. With this Activation Code, $K_{f1}$ is now complete and able to re-assemble the digital content.

(6) The device $D_1$ processes $K_{f1}$ to re-assemble the higher value digital content "just-in-time" for consumption.

If the device is somehow destroyed, then the Recovery Key $K_{f2}$ is used to re-assemble the higher value digital content instance $I_1$ on a new properly authorized and registered Display Device ($D_2$) as follows:

(7) The destroyed $D_1$ device is flagged as "missing" by the Crypto Controller and a notification is sent to the registered account linked to the device to obtain confirmation. $K_{f1}$ is then de-activated.

(8) Upon receiving confirmation, $K_{f1}$ is permanently destroyed and $K_{f2}$ becomes the active Cypher Key.

(9) Once $D_2$ is granted access to the same instance of a higher value digital content item ($I_1$), $D_2$ undertakes steps 1 to 6 (above) initially performed by $D_1$.

(10) A second Recovery Key ($K_{f3}$) is generated and stored at a location to be dictated by the profile of the customer account owning the higher value digital content instance.

Multiple Devices Displaying a Single Higher Value Digital Content Item

The owner of a higher value digital content instance may want to display the same content on more than one device linked to its Customer account. In this case, the Crypto Controller 1809 allows the higher value digital content to be consumed on more than one Display Device at any given time through a carefully designed process, an example of which follows:

(1) The Crypto Controller initiates downloading of the Cypher Key $K_{f1}$ from the Key Vault that is part of the Service Cloud to the first device $D_1$. It is partially "opened," re-encoded with the unique identification of the device, and kept in its Key Vault to lock $I_{1D1}$ to the $D_1$ permanently.

(2) $K_{f1}$ is deleted from the Key Vault.

(3) Before the Cypher Key is downloaded, a Recovery Key ($K_{f2}$) is generated and activated. It is stored at a location to be dictated by the profile of the customer account owning the higher value digital content instance (default is a separate partition of the Key Vault).

(4) The first Display Device $D_1$ uses the information contained in $K_{f1}$ to download required $I_1$ slices.

(5) Once higher value digital content slices are securely stored on $D_1$ then $D_1$ receives the Activation Code 1808 from the Crypto Controller 1809 to complete its Cypher Key. With this Activation Code 1808, $K_{f1}$ is now complete and able to re-assemble the digital content.

(6) The first Display Device $D_1$ processes $K_{f1}$ to re-assemble the higher value digital content "just-in-time" for consumption.

(7) A user decides to consume higher value digital content instance $I_1$ on a second Display Device $D_2$.

(8) $D_1$'s Recovery Key $K_{f2}$ is retrieved by the Crypto Controller 1809 to generate a unique $K_{f1D2}$ Cypher Key. $K_{f2}$ is then returned to its storage location.

(9) $K_{f1D2}$ is downloaded to $D_2$. It is partially "opened," re-encoded with the unique identification of $D_2$, and kept in its Key Vault to permanently lock $I_{1D2}$ to the $D_2$.

(10) $K_{f1D2}$ is deleted from the Key Vault.

(11) Before the Cypher Key is downloaded, a Recovery Key ($K_{f2D2}$) is generated and stored at a location to be dictated by the profile of the customer account owning the higher value digital content instance.

(12) The device uses the information contained in $K_{f2D2}$ to download required $I_1$ slices.

(13) Once higher value digital content slices are securely stored on $D_2$ then $D_2$ receives the Activation Code 1808 from the Crypto Controller 1809 to complete its Cypher Key. With this Activation Code 1808, $K_{f1D2}$ is now complete and able to reassemble the digital content.

(14) The second device processes $K_{f1D2}$ to re-assemble the higher value digital content "just-in-time" for displaying.

Single Device Displaying Multiple Higher Value Digital Content Items

A higher value digital content owner may want to consume more than one higher value digital content on the same device either using a pre-defined or manual control. The following carefully designed process is executed to add higher value digital content instance $J_1$ to device $D_1$ that is already containing content $I_1$:

(1) $D_1$ receives Cypher Key $K_{f1}$ for higher value digital content instance $J_1$.

(2) $D_1$ validates whether both higher value digital content $I_1$ and $J_1$ can be stored concurrently with the information encoded in $K_{f1}$ (i.e., whether there is enough storage space available for both).

(3) If $J_1$ can reside concurrently with $I_1$, then $D_1$ uses the same process as outlined above to securely store $J_1$ on $D_1$. Cypher Keys and content particles are containerized separately on $D_1$.

(4) If $D_1$ can't handle $I_1$ and $J_1$ concurrently, then $I_1$ particles are permanently deleted from $D_1$ to make room for $J_1$. $K_{f1}$ is kept on $D_1$ to accelerate a future request to return to $I_1$. $D_1$ uses the same process as outlined above to securely store $J_1$ on $D_1$. Cypher Keys and particles are containerized separately on $D_1$ Change of Ownership of Higher Value Digital Content To enable commerce of higher value digital content, Display Devices are configured to execute a carefully designed process when an active higher value digital content item changes ownership. Assuming the previous case where Display Device $D_1$ stores both $I_1$ and $J_1$ and the Customer account owning $I_1$ sells its $I_1$ instance to another Customer account, then the following is an example of a process which preferably takes place:

(1) $K_{f1}$ is automatically de-activated (i.e., Activation Code 1808 encoded in $K_{f1}$ is revoked).

(2) $D_1$ is instructed to delete all traces of $I_1$ slices (containerized).

(3) $D_1$ generates a destruction code $DC_{f1}$ from $K_{f1}$ before deleting all traces of $K_{f1}$.

(4) $D_1$ sends $DC_{f1}$ to Crypto Controller 1809 to confirm annihilation of $I_1$ on $D_1$.

Displaying Digital Visual Content for Art Exhibits and Other Commercial Venues

The Display Device 105 of the present invention can also be used to display Controlled Visual Content with or without audio, such as digital arts, digital signage, and other higher value digital visual and/or audio content in the context of art exhibits or other uses where a large number of Display Devices 105 are desired to be centrally managed. Digital art exhibits and similar uses lack a reliable, affordable, secure, and normalized solution for easily deploying higher value digital content 1810 on a number of devices distributed across a closed network. An Exhibit Server 1901 provides a turnkey solution for digital curators, exhibit managers or operator of large public venues seeking a complete solution to display digital content collections. The Exhibit Server 1901 preferably incorporates a number, but not necessarily all, of the functions that are otherwise provided by the Content Service Cloud 1218 in order to remove dependency on a broadband connection and reduce time to display a new digital media content item. It can also exceptionally be used to keep ingested media content items in local storage.

Figure 19:
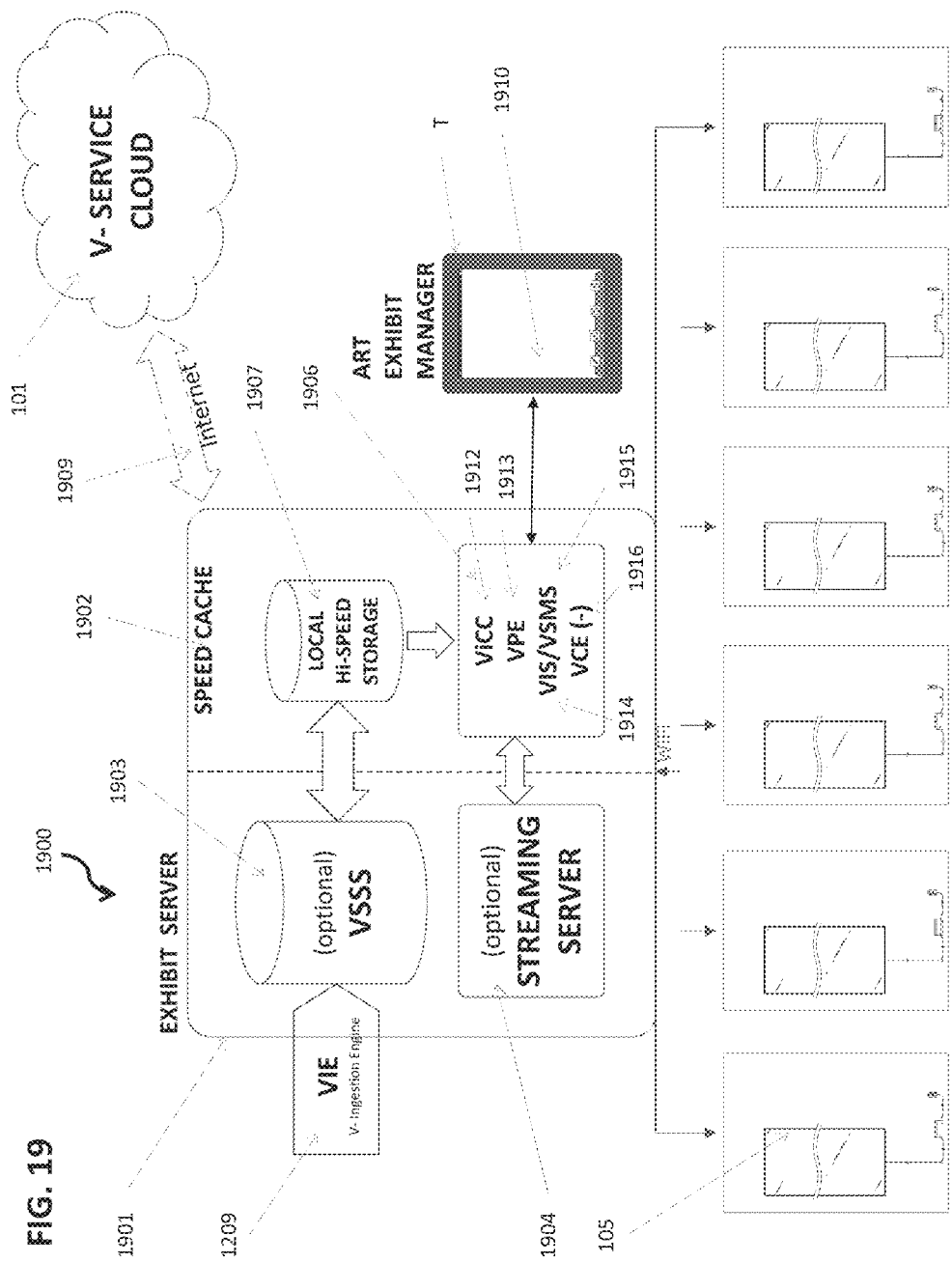
FIG. 19 is a depiction of the on-premise computing and storage system utilized for a digital art exhibit and display of other visual and/or audio content for commercial purpose disclosed by the present invention.

FIG. 19 is a block diagram that illustrates the general architecture of the Art Exhibit and Large Venue System. The Art Exhibit and Large Venue System 1900 includes an Exhibit Server 1901 that is made of the Speed Cache 1902 and optional local VSSS storage 1903, optional Streaming Server 1904 and a number of Display Devices 105 connected through a secured WiFi network. The Speed Cache 1902 is made of a subset 1906 of VCSC 1218 servers and high-speed storage 1907 that work together to deliver content to Display Devices 105 located on a local network faster than if content was pulled directly from the VSC 101 over a public Internet connection 1909. The Speed Cache 1902 of the Exhibit Server 1901 hosts ViCC 1912, VPE 1913, VIS 1914, VSMS 1915, and a reduced version of VCE 1916 locally to provide full display and management capability without a permanent connection 102 to the VCSC 1218. The Art Exhibit System 1901 can also be used to ingest and store content locally using an Ingestion Engine 1209; in this case the optional local VSSS storage 1903 is required. Local VSSS storage 1903 replicates the same topology and equivalent security configuration as the VSSS 1201.

A specialized user interface 1910 to preferably control all aspects of the ingestion, management of displays and management of digital media content is provided and optimized for tablet and standard browsers. It preferably combines individual display controls similar to the App 108 with the capability to monitor and control a large number of displays with functions such as preset push of content to all displays or preset trigger of playlists for each display with one action. It also preferably provides controls of the ingestions process and several monitoring capabilities to rapidly identify and troubleshoot issues.

The Exhibit Server 1901 incorporates a Speed Cache Server 1902 combined with an optional media Streaming Server 1904 to send and to manage higher value digital content 1810 on a large number of devices installed on the closed network where the Speed Cache Server 1902 is installed. A Speed Cache Server 1902 is an intermediary storage solution which preferably accelerates the display process of digital content stored in the cloud on local devices, and is preferably used when Internet connection is too slow or digital art items are too large causing significant delays between a request to display a specific digital art item and the actual viewing on a device. The Speed Cache Server 1902 is designed as a secure server using the same security and protection mechanisms designed for protecting digital media content stored on the Service Cloud, i.e., dissecting media content into particles 1507 using Cypher Keys 1806 to reconstruct higher value digital content 1810 using Integrity Markers 1803 to validate authenticity and integrity and recreating corrupted particles when needed.

The Streaming Server 1904 is used for situations where digital media content is not allowed to be stored on each unit for legal or security reasons or new and very large digital media content items must be presented simultaneously and immediately on one or several units without pre-fetching time. In this case, the Speed Cache 1902 will use an optional Streaming Server 1904 to stream visual and/or audio content in real-time to designated units. The option to use a streaming server instead of the standard upload-and-display model can be configured by an Art Exhibit or Large Venue manager or operator.

The Exhibit Server 1901 is not a persistent storage solution; it preferably works with the Service Cloud 101 that continues to deliver critical services such as the Cypher Key Repository 1405 of the Key Vault 1704, Cypher Key Activation Codes 1808, and general log, traces and history for external audits. Hence a network connection to the Service Cloud 101 is required to obtain Cypher Keys 1806 from the Key Vault 1704 when a new higher value digital content item is desired to be displayed.

The Exhibit Server 1901 also preferably incorporates an ingestion engine to provide the capability to capture new digital media content items and store them locally. The user has the option to keep the ingested digital media and metadata in the Service Cloud 101 or stored in an (optional) local VSSS-like storage unit 1903. However, encryption keys and other security services are still provided by the Service Cloud at all time. The Exhibit Server 1901 provides other services such as catalog, search, playlist editor and usage report generator to facilitate deployment and management of medium to large size digital art exhibit. A specially designed mobile app 1910 connected to the local Exhibit Server facilitates setting-up, configuring, operating, and managing a complete digital art exhibit.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

The invention claimed is:

1. A frame for a mobile device running an application comprising: a frame assembly, comprising: a processor; a media storage memory; a first body; a recess on said first body, configured for receipt of said mobile device in said frame assembly; and a second body, configured to connect to said first body to enclose the mobile device; and a connector, in at least one of said first body and said second body, configured to connect with a corresponding connector of the mobile device; wherein said processor is configured to communicate, through said connector, with a memory and processor of the mobile device; and wherein said connector, when connected to the corresponding connector of the mobile device, is configured to lock the mobile device in said application being run thereon such that only said application may run while said connector is connected to the connector of the mobile device.

2. A frame as claimed in claim 1, wherein said media storage memory is configured to store digital content for display on the mobile device.

3. A frame as claimed in claim 2, further comprising one or more secure registers configured to secure said digital content stored in said media storage memory.

4. A frame as claimed in claim 1, further comprising a locking mechanism, configured to lock said frame assembly on the mobile device.

5. A frame as claimed in claim 1, wherein said connector comprises a male connector plug configured to secure to a female receptacle on the mobile device.

6. A frame as claimed in claim 1, wherein one or more of said first body and said second body comprises a U-shaped, three-sided configuration.

7. A system for displaying digital content, the system comprising: a mobile device, comprising a first memory and a first processor, configured to run at least one application; a frame assembly for said mobile device, comprising: a second processor; a second media storage memory; a first body; a recess on said first body, configured for receipt of said mobile device in said frame assembly; and a second body, configured to connect to said first body to enclose said mobile device; and a connector, in at least one of said first body and said second body, configured to connect with a corresponding connector of said mobile device; wherein said second processor is configured to communicate, through said connector, with said first memory and said first processor of said mobile device; and wherein said connector, when connected to said corresponding connector of said mobile device, is configured to lock said mobile device in said application being run thereon such that only said application may run while said connector is connected to the connector of the mobile device.

8. A system as claimed in claim 7, wherein said media storage memory is adapted to store digital content for display on said mobile device.

9. A system as claimed in claim 7, further comprising one or more secure registers configured to secure said digital content stored in said media storage memory.

10. A system as claimed in claim 7, wherein said application is configured to control a display of digital content on a display screen.

11. A system as claimed in claim 7, further comprising a locking mechanism, configured to lock said frame assembly on said mobile device.

12. A system as claimed in claim 7, wherein said connector comprises a male connector plug and wherein said corresponding connector comprises a female receptacle on said mobile device.

13. A system as claimed in claim 7, wherein one or more of said first body and said second body comprises a U-shaped, three-sided configuration.

14. A system as claimed in claim 8, wherein said digital content comprises one or more of still images, motion images, interactive images, and app images.

15. A system as claimed in claim 14, wherein said digital content comprises one or more of digital art, digital poster, or digital decoration.

16. A frame for a mobile device running an application comprising: a frame assembly, comprising: a processor; a media storage memory; a first body; a recess on said first body, configured for receipt of said mobile device in said frame assembly; and a second body, configured to connect to said first body to enclose the mobile device; and a communication means, in at least one of said first body and said second body; wherein said processor is configured to communicate, through said communication means, with a memory and processor of the mobile device; and wherein said connection means is configured to lock the mobile device in said application being run thereon such that only said application may run while said connector is connected to the connector of the mobile device.

17. A frame as claimed in claim 16, wherein said media storage memory is configured to store digital content for display on the mobile device.

18. A frame as claimed in claim 17, further comprising one or more secure registers configured to secure said digital content stored in said media storage memory.

19. A frame as claimed in claim 17, wherein said digital content comprises one or more of still images, motion images, interactive images, and app images.

20. A frame as claimed in claim 19, wherein said digital content comprises one or more of digital art, digital poster, or digital decoration.

21. A frame as claimed in claim 16, further comprising a locking mechanism, configured to lock said frame assembly on the mobile device.

22. A frame as claimed in claim 16, wherein one or more of said first body and said second body comprises a U-shaped, three-sided configuration.

23. A frame as claimed in claim 16, wherein said communication means comprises radio.

24. A frame as claimed in claim 23, wherein said radio comprises one or more of WiFi, Bluetooth, Near Field Communications, or iBeacon.

25. A frame as claimed in claim 16, wherein said communication means comprises the internet.

* * * * *